(12) United States Patent
Ide et al.

(10) Patent No.: US 6,988,359 B2
(45) Date of Patent: Jan. 24, 2006

(54) EXHAUST GAS CONTROL APPARATUS AND EXHAUST GAS PURIFICATION METHOD FOR INTERNAL COMBUSTION ENGINE

(75) Inventors: Koji Ide, Toyota (JP); Toshinari Nagai, Suntou-gun (JP); Yasuhiro Oi, Numazu (JP); Naoto Kato, Susuno (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 10/464,572

(22) Filed: Jun. 19, 2003

(65) Prior Publication Data

US 2004/0045282 A1   Mar. 11, 2004

(30) Foreign Application Priority Data

Jul. 30, 2002   (JP)   ............................. 2002-194210

(51) Int. Cl.
 *F01N 3/00*   (2006.01)
(52) U.S. Cl. ..................... 60/285; 60/274; 60/276; 60/277; 701/103; 701/109
(58) Field of Classification Search .................. 60/274, 60/276, 277, 285; 701/103, 109
See application file for complete search history.

(56) References Cited

U.S. PATENT DOCUMENTS 5,765,370 A * 6/1998 Hanafusa et al. ............. 60/277

| | | | |
|---|---|---|---|
| 5,966,930 A * | 10/1999 | Hatano et al. | 60/276 |
| 6,502,389 B2 * | 1/2003 | Katayama et al. | 60/285 |
| 6,691,508 B2 * | 2/2004 | Sato et al. | 60/285 |
| 6,751,950 B2 * | 6/2004 | Ikemoto et al. | 60/285 |
| 6,766,640 B2 * | 7/2004 | Ishizuka et al. | 60/285 |

FOREIGN PATENT DOCUMENTS

JP   A 2001-234787   8/2001

* cited by examiner

*Primary Examiner*—Binh Q. Tran
(74) *Attorney, Agent, or Firm*—Oliff & Berridge PLC

(57) ABSTRACT

An exhaust gas control apparatus and an exhaust gas purification method are for an internal combustion engine provided with a first catalyst portion disposed in an exhaust passage of the internal combustion engine, and a second catalyst portion disposed in the exhaust passage downstream of the first catalyst portion. A value that changes according to at least an amount of oxygen stored in the first catalyst portion is obtained as an obtained value. An air-fuel ratio of the internal combustion engine is controlled such that the obtained value matches a target value. A value that changes according to at least an amount of oxygen stored in the second catalyst portion is calculated as a calculated value, based on at least a state of exhaust gas flowing into the second catalyst portion. The target value is changed according to the calculated value. Accordingly, harmful components, such as unburned components and oxides of nitrogen, are able to be effectively purified even if the air-fuel ratio of the internal combustion engine changes abruptly.

17 Claims, 25 Drawing Sheets

DIRECTION OF EXHAUST GAS FLOW

EXHAUST GAS CONTROL APPARATUS AND EXHAUST GAS PURIFICATION METHOD FOR INTERNAL COMBUSTION ENGINE

INCORPORATION BY REFERENCE

The disclosure of Japanese Patent Application No. 2002-194210 filed on Jul. 3, 2002, including the specification, drawings and abstract is incorporated herein by reference in its entirety.

BACKGROUND OF THE INVENTION

1. Field of Invention

The invention relates to an exhaust gas control apparatus for an internal combustion engine provided, for example, with a three-way catalyst in an exhaust passage. The invention also relates to an exhaust gas purification method.

2. Description of Related Art

A three-way catalyst (also referred to simply as "catalyst" in this specification) used to purify exhaust gas from an internal combustion engine has been conventionally arranged in an exhaust passage of the internal combustion engine. This three-way catalyst has an $O_2$ storage function in which it stores oxygen (hereinafter, this function will be referred to as an "oxygen storing function" and the amount of oxygen stored in the catalyst will be referred to as the "amount of stored oxygen"). The three-way catalyst oxidizes unburned components such as HC and CO using oxygen that is stored by the catalyst when the air-fuel ratio of gas that flows into the catalyst is rich, and reduces oxides of nitrogen (NOx) by storing oxygen from the NOx when the air-fuel ratio of the gas that flows into the catalyst is lean. As a result, the three-way catalyst is able to purify harmful components such as unburned components and oxides of nitrogen even when the air-fuel ratio of the internal combustion engine is not at the stoichiometric air-fuel ratio.

Because the operation state of the internal combustion engine is continually changing, the air-fuel ratio of the internal combustion engine continually changes between rich and lean. Meanwhile, the amount of oxygen stored in the catalyst changes between "0" and the maximum storable amount of oxygen. Accordingly, if the air-fuel ratio of the internal combustion engine is rich when the amount of oxygen stored in the catalyst is near "0", then unburned components flow out from the catalyst without being sufficiently oxidized (i.e., there is not enough oxygen stored in the catalyst to sufficiently oxidize them). Conversely, if the air-fuel ratio of the internal combustion engine is lean when the amount of oxygen stored in the catalyst is near the maximum storable amount of oxygen, then oxides of nitrogen flow out from the catalyst without being sufficiently reduced (i.e., there is not enough room in the catalyst to store the oxygen from the NOx). Therefore, it is preferable to control the air-fuel ratio of the internal combustion engine so that the amount of oxygen stored in the catalyst for effectively purifying unburned components and oxides of nitrogen is a predetermined amount.

Meanwhile, in order to both purify exhaust gas immediately after starting the internal combustion engine and further improve exhaust gas control performance after the internal combustion engine has completely warmed up, a construction has recently been employed in which a first catalyst having a relatively small capacity, also referred to as a "start converter", is disposed in the exhaust passage of the internal combustion engine while a second catalyst having a relatively large capacity, also referred to as an "under floor converter", is disposed in the exhaust passage downstream of the first catalyst. In this case, because the first catalyst is disposed closer to the exhaust port of the internal combustion engine than the second catalyst so that hot exhaust gas flows into that first catalyst, it is warmed up quickly after starting the engine and therefore displays good characteristics in purifying the exhaust gas early after startup. On the other hand, the second catalyst requires more time than the first catalyst to warm up, but once it has warmed up, it displays excellent characteristics in purifying the exhaust gas because of its large capacity.

In this way, because unburned components and oxides of nitrogen are able to be effectively purified when the first catalyst and the second catalyst are disposed in series in the exhaust passage of the internal combustion engine, an exhaust gas control apparatus disclosed in Japanese Patent Laid-Open Publication No. 2001-234787 calculates the amount of oxygen stored in the first catalyst and controls the air-fuel ratio of the internal combustion engine so that the calculated amount of oxygen stored in the first catalyst matches a target amount of stored oxygen (e.g., an amount that is approximately half of the maximum storable amount of oxygen of the first catalyst). In addition, the exhaust gas control apparatus reduces the target amount of oxygen stored in the first catalyst when an output from an air-fuel ratio sensor disposed downstream of the second catalyst indicates that the exhaust gas flowing out from the second catalyst is lean, and increases the target amount of oxygen stored in the first catalyst when the output from the air-fuel ratio sensor disposed downstream of the second catalyst indicates that the exhaust gas flowing out from the second catalyst is rich.

Here, when the exhaust gas flowing out from the first catalyst is lean, the amount of oxygen stored in the second catalyst is near the maximum storable amount of oxygen, so there is not much room in the second catalyst to store oxygen. At this time, according to the foregoing apparatus, the target amount of oxygen stored in the first catalyst is reduced and the air-fuel ratio of the internal combustion engine is controlled to be rich. Accordingly, the room in the first catalyst to store oxygen increases. Therefore, the catalyst apparatus, when regarded as including both the first catalyst and the second catalyst, is able to ensure enough room to store oxygen.

On the other hand, when the exhaust gas flowing out from the second catalyst is rich, the amount of oxygen stored in the second catalyst is near "0", so there is not much oxygen in the second catalyst to release. At this time, according to the foregoing apparatus, the target amount of oxygen stored in the first catalyst is increased and the air-fuel ratio of the internal combustion engine is controlled to be lean. Accordingly, the amount of oxygen in the first catalyst that can be released increases. Therefore, the catalyst apparatus is able to ensure that there is enough oxygen in the catalyst so that some can be released.

Accordingly, in the foregoing apparatus, even if the air-fuel ratio of the exhaust gas flowing into the first catalyst (i.e., the air-fuel ratio of the internal combustion engine) temporarily becomes quite lean or rich due to engine acceleration or deceleration, the catalyst apparatus, when regarded as including both the first catalyst and the second catalyst, is able to stably maintain both enough room for oxygen to be stored and enough oxygen so that some can be released, and therefore effectively purify harmful components such as unburned components and oxides of nitrogen.

However, the air-fuel ratio sensor of the foregoing apparatus is disposed in the exhaust passage a predetermined distance downstream of the farthest downstream point of the second catalyst, such that it takes a certain amount of time, depending on the flow rate of the exhaust gas, for the exhaust gas that flows out from the farthest downstream point of the second catalyst to reach the air-fuel ratio sensor. Therefore, when the air-fuel ratio (i.e., characteristics) of the exhaust gas flowing out of the farthest downstream point of the second catalyst changes, there is a certain amount of delay until the exhaust gas having the changed air-fuel ratio reaches the air-fuel ratio sensor. There is also a certain amount of delay between the time the exhaust gas having the changed air-fuel ratio reaches the air-fuel ratio sensor and the time that the air-fuel ratio sensor changes its output to reflect that change in the air-fuel ratio.

In view of these facts, with the apparatus of the aforementioned publication, in particular, when the air-fuel ratio of the internal combustion engine changes abruptly such that the air-fuel ratio (i.e., characteristics) of the exhaust gas flowing out from the second catalyst changes abruptly, there is a delay in the change of the target amount of oxygen stored in the first catalyst because of the inevitable delay in the change of the output from the air-fuel ratio sensor. As a result, the catalyst apparatus may not be able to sufficiently maintain both enough room for oxygen to be stored and enough oxygen so that some can be released, and therefore may not be able to reliably purify harmful components such as unburned components and oxides of nitrogen.

SUMMARY OF THE INVENTION

In view of the foregoing problems, the invention thus provides an exhaust gas control apparatus and exhaust gas purification method for an internal combustion engine, which is able to effectively purify harmful components such as unburned components and oxides of nitrogen even if the air-fuel ratio of the internal combustion engine changes abruptly.

As one exemplary embodiment of the invention, an exhaust gas control apparatus for an internal combustion engine is provided which includes a first catalyst portion disposed in an exhaust passage of the internal combustion engine, a second catalyst portion disposed in the exhaust passage downstream of the first catalyst portion, and a controller. The controller obtains a value that changes according to at least an amount of oxygen stored in the first catalyst portion as an obtained value; controls an air-fuel ratio of the internal combustion engine such that the obtained value substantially matches a target value; calculates a value that changes according to at least an amount of oxygen stored in the second catalyst portion as a calculated value, based on at least a state of exhaust gas flowing into the second catalyst portion; and changes the target value for the obtained value according to the calculated value.

Also, an exhaust gas purification method of an exhaust gas control apparatus for an internal combustion engine, which is provided with a first catalyst portion disposed in an exhaust passage of the internal combustion engine and a second catalyst portion disposed in the exhaust passage downstream of the first catalyst portion, is provided as another exemplary embodiment of the invention. This exhaust gas purification method includes the steps of obtaining a value that changes according to at least an amount of oxygen stored in the first catalyst portion as an obtained value; controlling an air-fuel ratio of the internal combustion engine such that the obtained value substantially matches a target value; calculating a value that changes according to at least an amount of oxygen stored in the second catalyst portion as a calculated value, based on at least a state of exhaust gas flowing into the second catalyst portion; and changing the target value for the obtained value according to the calculated value. The "value that changes according to at least an amount of oxygen stored in the first catalyst portion" that is obtained as the obtained value may be, but is not limited to, a value indicative of the amount of oxygen stored in the first catalyst portion, a value according to the amount of a specific component relating to an oxygen storage and release reaction, which flows out from the first catalyst portion, as described later, or a value obtained either by calculation or physical detection, which is output from an air-fuel ratio sensor disposed in the exhaust passage downstream of the first catalyst portion and upstream of the second catalyst portion.

Here, the "value that changes according to at least an amount of oxygen stored in the second catalyst portion", which is calculated as the calculated value, is, for example, a value indicative of the amount of oxygen stored in the second catalyst portion or a value obtained by calculation, which is in accordance with the amount of a specific component relating to the oxygen storage and release reaction, which flows out from the second catalyst portion, as described later.

According to the exhaust gas control apparatus and exhaust gas purification method as described above, a target value for an obtained value (e.g., a value indicative of the amount of oxygen stored in the first catalyst portion), which is a value that changes according to at least the amount of oxygen stored in the first catalyst portion, changes according to a calculated value (e.g., a value indicative of the amount of oxygen stored in the second catalyst portion), obtained by calculation, which is a value that changes according to at least the amount of oxygen stored in the second catalyst portion that was calculated based on at least a state of the exhaust gas flowing into the second catalyst portion. Then, the air-fuel ratio of the internal combustion engine is controlled so that the obtained value substantially matches the changed target value.

Accordingly, when the air-fuel ratio of the internal combustion engine suddenly becomes quite lean such that the air-fuel ratio of the exhaust gas flowing out of the second catalyst portion suddenly becomes quite lean, for example, the amount of oxygen stored in the second catalyst portion quickly increases according to the sudden change in the air-fuel ratio of the exhaust gas. According to the exhaust gas control apparatus and exhaust gas purification method of this aspect of the invention, the target value for the obtained value can quickly be changed at this time to a value that will reduce the amount of oxygen stored in the first catalyst portion, according to the calculated value that quickly changes by calculation according to at least a change in the amount of oxygen stored in the second catalyst portion. As a result, the air-fuel ratio of the internal combustion engine can be quickly changed to a rich air-fuel ratio.

Also, when the air-fuel ratio of the internal combustion engine suddenly becomes quite rich such that the air-fuel ratio of the exhaust gas flowing out of the second catalyst portion suddenly becomes quite rich, for example, the amount of oxygen stored in the second catalyst portion quickly decreases according to the sudden change in the air-fuel ratio of the exhaust gas. According to the exhaust gas control apparatus and exhaust gas purification method of this aspect of the invention, the target value for the obtained value can quickly be changed at this time to a value that will increase the amount of oxygen stored in the first catalyst portion, according to the calculated value that quickly changes by calculation according to at least a change in the amount of oxygen stored in the second catalyst portion. As a result, the air-fuel ratio of the internal combustion engine can be quickly changed to a lean air-fuel ratio.

In other words, according to the exhaust gas control apparatus and exhaust gas purification method having the characteristics of this aspect of the invention, there is minimum delay in the change in the target amount of oxygen stored in the first catalyst because of the inevitable delay in the change in the output from the air-fuel ratio sensor disposed downstream of the second catalyst, as there is with the related art described above. Further, the value related to the target amount of oxygen stored in the first catalyst portion (i.e., the target value) is able to change faster than with the related art, according to a change in the amount of oxygen stored in the second catalyst portion.

As a result, even if the air-fuel ratio of the internal combustion engine suddenly changes, a delay is less apt to occur in the air-fuel ratio control of the internal combustion engine for controlling the total amount of oxygen stored in the first catalyst portion, and the catalyst apparatus, when regarded as including both the first catalyst portion and the second catalyst portion, is able to reliably maintain both enough room for oxygen to be stored and enough oxygen so that some can be released. Accordingly, the catalyst apparatus is able to more effectively purify harmful components, such as unburned components and oxides of nitrogen, than the related art.

In the exhaust gas control apparatus described above, it is preferable to make the amount of room for oxygen to be stored equivalent to the amount of surplus oxygen that can be released when that catalyst apparatus is regarded as including both the first catalyst portion and the second catalyst portion. Therefore, it is preferable to set the target value indicative of the target amount of oxygen stored in the first catalyst portion to a value indicative of a value that is less than the amount of approximately half the maximum storable amount of oxygen of the first catalyst portion (hereinafter, referred to as "first catalyst portion threshold amount") when the calculated value, which is a value indicative of the amount of oxygen stored in the second catalyst portion, is a value indicative of an amount that exceeds the amount of approximately half the maximum storable amount of oxygen of the second catalyst portion (hereinafter, referred to as "second catalyst portion threshold amount"). It is also preferable to set the target value to a value indicative of an amount larger than the first catalyst portion threshold value when the calculated value is a value indicative of an amount smaller than the second catalyst portion threshold value.

As the catalyst degrades, however, the maximum storable amount of oxygen of the catalyst decreases. Accordingly, when the first catalyst portion threshold amount and the second catalyst portion threshold amount are always maintained at constant amounts, as the first and second catalyst portions degrade, the amount of room in the catalyst apparatus to store oxygen decreases so it is no longer possible to make the amount of room for oxygen to be stored equivalent to the amount of surplus oxygen that can be released in the catalyst apparatus. Accordingly, it is preferable to have a construction which enables the first catalyst portion threshold amount and the second catalyst portion threshold amount to be able to change (i.e., decrease) according to a decrease in the maximum storable amounts of oxygen in the first and second catalyst portions.

BRIEF DESCRIPTION OF THE DRAWINGS

The above mentioned and other objects, features, advantages, technical and industrial significance of this invention will be better understood by reading the following detailed description of preferred embodiments of the invention, when considered in connection with the accompanying drawings, in which.

DETAILED DESCRIPTION OF PREFERRED EMBODIMENTS

In the following description and the accompanying drawings, the present invention will be described in more detail with reference to exemplary embodiments.

(First Exemplary Embodiment)

Figure 1:
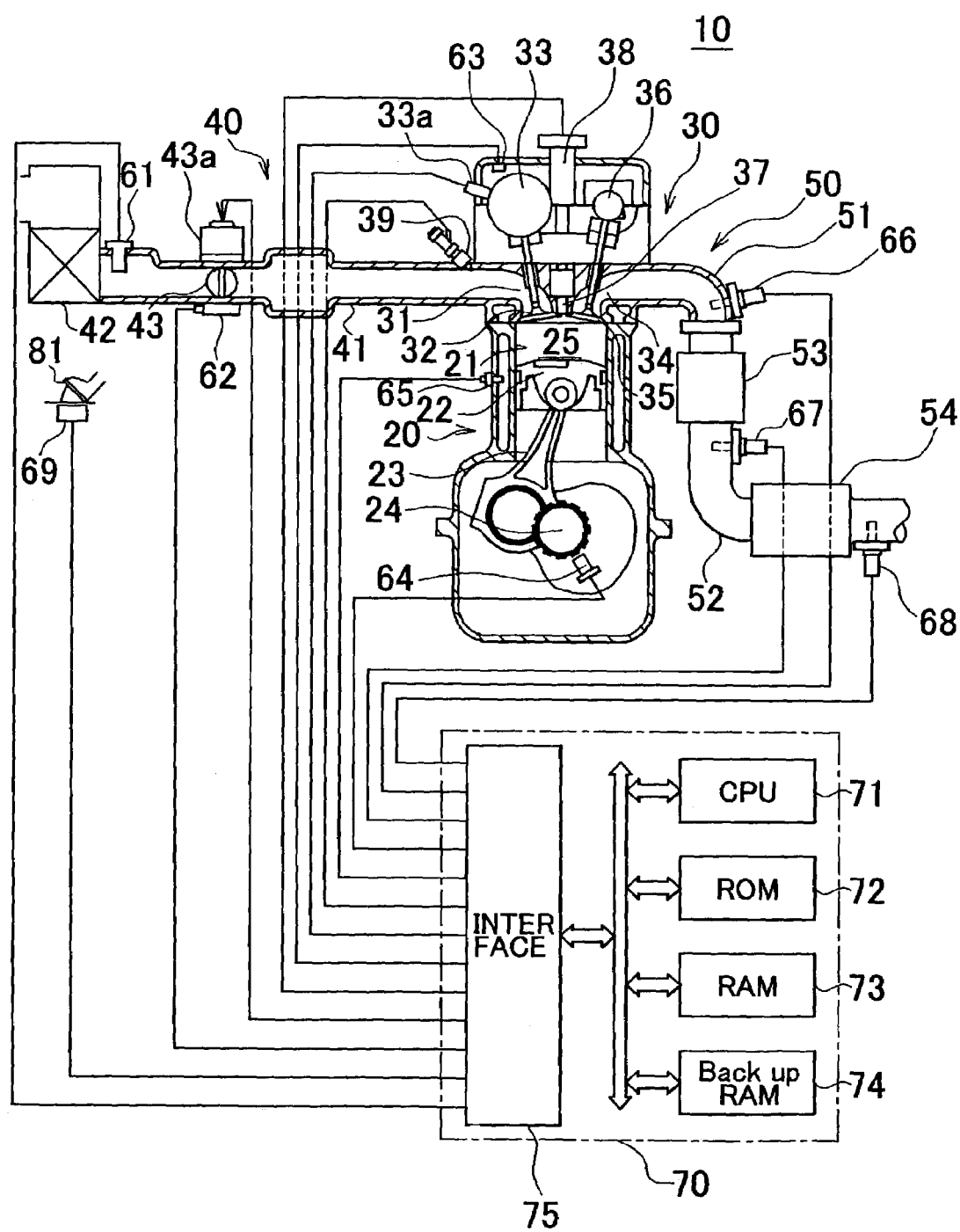
FIG. 1 is a block diagram schematically showing a system in which an exhaust gas control apparatus according to a first exemplary embodiment of the invention has been applied to an internal combustion engine.

First, a first exemplary embodiment will be described. FIG. 1 is a block diagram schematically showing a system in which an exhaust gas control apparatus for an internal combustion engine according to a first exemplary embodiment of the invention has been applied to a spark ignition type multi-cylinder (e.g., four cylinder) internal combustion engine 10.

This internal combustion engine 10 includes a cylinder block portion 20, which includes a cylinder block, a cylinder block lower case, and an oil pan, and the like, a cylinder head portion 30 fixed to the top of the cylinder block portion 20, an intake system 40 for supplying a gasoline mixture to the cylinder block portion 20, and an exhaust system 50 for discharging exhaust gas from the cylinder block portion 20 to the outside.

The cylinder block portion 20 includes a cylinder 21, a piston 22, a con-rod (connecting rod) 23, and a crankshaft 24. The piston 22 moves back and forth inside the cylinder 21. This reciprocating motion of the piston 22 is transmitted via the con-rod 23 to the crankshaft 24 so as to rotate it. The cylinder 21 and the head of the piston 22 together define the cylinder head portion 30 and a combustion chamber 25.

The cylinder head portion 30 is provided with an intake port 31 which is communicated with the combustion chamber 25, an intake valve 32 which opens and closes the intake port 31, a variable intake timing apparatus 33 which includes an intake camshaft that drives the intake valve 32 and which continuously changes the phase angle of that intake camshaft, and an actuator 33a of the variable intake timing apparatus 33. Cylinder head portion 30 also is provided with an exhaust port 34 which is communicated with the combustion chamber 25, an exhaust valve 35 which opens and closes the exhaust port 34, an exhaust camshaft 36 which drives the exhaust valve 35, a spark plug 37, a fuel igniter 38 that includes an ignition coil which generates a high voltage which is applied to the spark plug 37, and a fuel injector (i.e., fuel injecting means) 39 that injects fuel into the intake port 31.

The intake system 40 includes an intake pipe 41 which is communicated with the intake port 31 and which includes an intake manifold which, together with the intake port 31, defines an intake passage, an air filter 42 provided at an end portion of the intake pipe 41, a throttle valve 43 provided in the intake pipe 41, which changes the cross-sectional area of the opening of the intake passage, and a throttle valve actuator 43a, which is a DC motor, which functions as a throttle valve driving means.

The exhaust system 50 includes an exhaust manifold 51 which is communicated with the exhaust port 34, an exhaust pipe 52 connected to the exhaust manifold 51, a first catalyst (also referred to as an upstream three-way catalyst or start converter) 53 disposed upstream in the exhaust pipe 52, and a second catalyst (also referred to as an under floor converter) 54 disposed downstream of the first catalyst 53 in the exhaust pipe 52. The exhaust port 34, the exhaust manifold 51, and the exhaust pipe 52 together make up the exhaust passage. Here, the entire first catalyst 53 corresponds to the first catalyst portion and the entire second catalyst 54 corresponds to the second catalyst portion.

This system includes a thermal airflow meter 61, a throttle position sensor 62, a cam position sensor 63, a crankshaft position sensor 64, a coolant temperature sensor 65, an air-fuel ratio sensor 66 disposed upstream of the first catalyst 53 in the exhaust passage (hereinafter, this sensor will be referred to as "exhaust side upstream air-fuel ratio sensor 66"), an air-fuel ratio sensor 67 disposed downstream of the first catalyst 53 and upstream of the second catalyst 54 in the exhaust passage (hereinafter, this sensor will be referred to as "exhaust side midstream air-fuel ratio sensor 67"), an air-fuel ratio sensor 68 disposed downstream of the second catalyst 54 in the exhaust passage (hereinafter, this sensor will be referred to as "exhaust side downstream air-fuel ratio sensor 68"), and an accelerator opening sensor 69.

Figure 2:
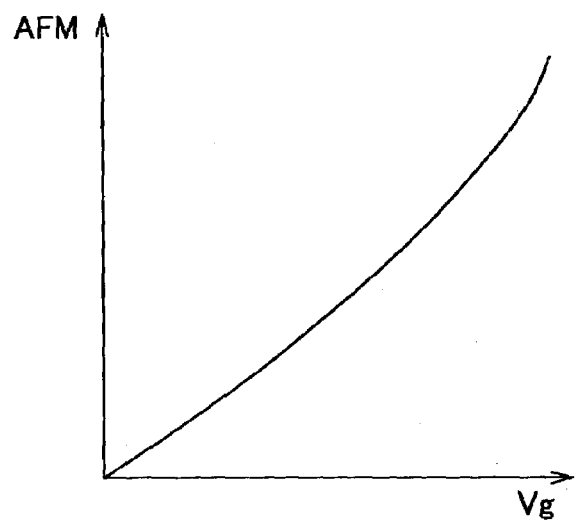
FIG. 2 is a map showing the relationship between an output voltage of an airflow meter shown in FIG. 1 and a measured intake air quantity.

The thermal airflow meter 61 outputs a voltage Vg that corresponds to a mass flow rate of intake air flowing through the intake pipe 41. The relationship between the voltage Vg output by the thermal airflow meter 61 and a measured intake airflow quantity (i.e., flow rate) AFM is as shown in FIG. 2. The throttle position sensor 62 detects an opening amount of the throttle valve 43 and outputs a signal indicative of a throttle valve opening amount TA. The cam position sensor 63 generates a single-pulse signal (i.e., G2 signal) each time the intake camshaft rotates 90 degrees (i.e., each time the crankshaft 24 rotates 180 degrees). The crankshaft position sensor 64 generates a signal having a pulse with a narrow bandwidth each time the crankshaft 24 rotates 10 degrees and a pulse with a broad bandwidth each time the crankshaft 24 rotates 360 degrees. This signal is indicative of an engine speed NE. The coolant temperature sensor 65 detects a coolant temperature THW of the internal combustion engine 10 and outputs a signal indicative thereof.

Figure 3:
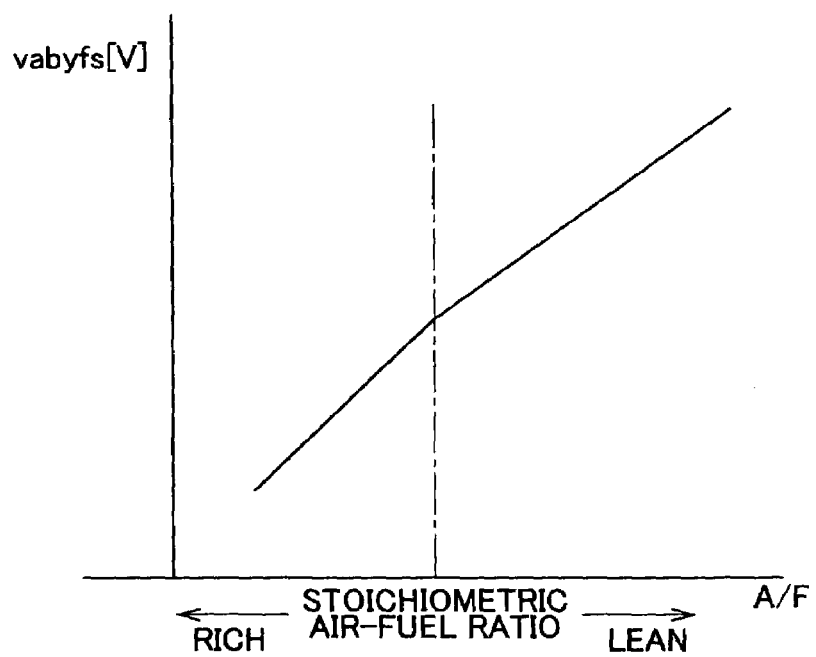
FIG. 3 is a map showing the relationship between an output voltage of an exhaust side upstream air-fuel ratio sensor shown in FIG. 1 and an air-fuel ratio.
Figure 4:
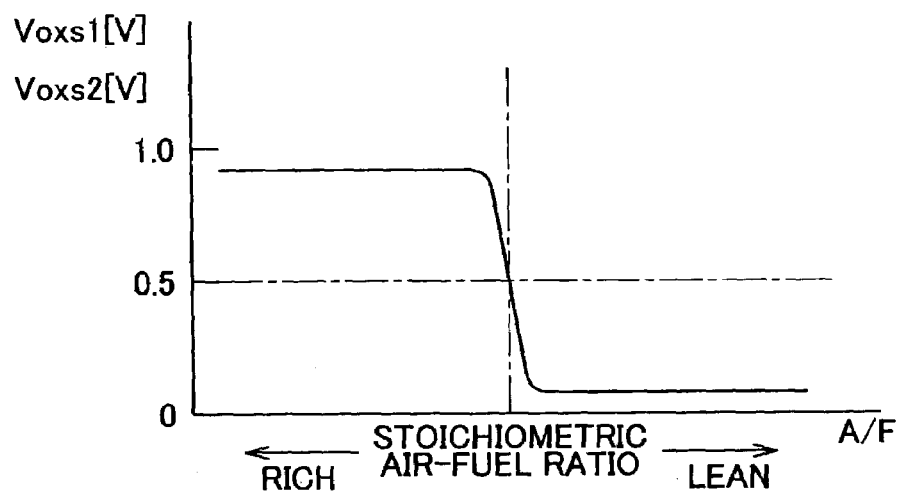
FIG. 4 is a map showing the relationship between output voltages of an exhaust side midstream air-fuel ratio sensor and an exhaust side downstream air-fuel ratio sensor shown in FIG. 1 and an air-fuel ratio.

As shown in FIG. 3, the exhaust side upstream air-fuel ratio sensor 66 outputs a current that corresponds to an air-fuel ratio A/F, and outputs a voltage vabyfs that corresponds with this current. As is evident from the figure, the exhaust side upstream air-fuel ratio sensor 66 is capable of detecting the air-fuel ratio A/F over a broad range with high accuracy. As shown in FIG. 4, the exhaust side midstream air-fuel ratio sensor 67 and the exhaust side downstream air-fuel ratio sensor 68 output voltages Voxs1 and Voxs2, respectively, which change abruptly at the stoichiometric air-fuel ratio. More specifically, when the air-fuel ratio is leaner than the stoichiometric air-fuel ratio, the exhaust side midstream air-fuel ratio sensor 67 and the exhaust side downstream air-fuel ratio sensor 68 output a voltage of about 0.1 (V). When the air-fuel ratio is richer than the stoichiometric air-fuel ratio, the exhaust side midstream air-fuel ratio sensor 67 and the exhaust side downstream air-fuel ratio sensor 68 output a voltage of about 0.9 (V). When the air-fuel ratio is the stoichiometric air-fuel ratio, the exhaust side midstream air-fuel ratio sensor 67 and the exhaust side downstream air-fuel ratio sensor 68 output a voltage of about 0.5 (V). The accelerator opening sensor 69 detects an operation amount Accp of an accelerator pedal 81 operated by a driver and outputs a signal indicative thereof.

The system is further provided with an ECU 70. This ECU 70 is a microcomputer which includes a CPU 71, ROM 72, RAM 73, backup RAM 74, and an interface 75 and the like. In the ROM 72, constants, tables (i.e., lookup tables, maps), and routines (i.e., programs) to be executed by the CPU 71, and the like, are stored beforehand. The RAM 73 temporarily stores data from the CPU 71 when necessary. The backup RAM 74 stores data when power is supplied thereto and retains that stored data when the supply of power is interrupted. The interface 75 includes an AD converter. The CPU 71, ROM 72, RAM 73, and backup RAM 74 are all connected to a bus which is in turn connected to the interface 75. The interface 75 is connected to the sensors 61 to 69 and supplies the signals from those sensors 61 to 69 to the CPU 71. The interface 75 also sends drive signals to the actuator 33a of the variable intake timing apparatus 33, the fuel igniter 38, the fuel injector 39, and the throttle valve actuator 43a in response to commands from the CPU 71.

(Outline of Control Over the Amount of Oxygen Stored)

The first catalyst 53 and the second catalyst 54 function to oxidize unburned components (i.e., HC and CO) and reduce oxides of nitrogen (NOx) when the air-fuel ratio is approximately the stoichiometric air-fuel ratio. Moreover, the first and second catalysts 53 and 54 also have an oxygen storage function in which they store oxygen. This function enables HC, CO, and NOx to be purified even when the air-fuel ratio is not the stoichiometric air-fuel ratio. This type of function is made possible by cerium Ce provided in the first and second catalysts 53 and 54.

More specifically, cerium Ce by itself is unstable, but stabilizes when combined with oxygen to become ceria $CeO_2$. Therefore, when oxygen molecules (including oxygen in oxides of nitrogen) flow into the first and second catalysts 53 and 54 due to the air-fuel ratio being leaner than the stoichiometric air-fuel ratio, the cerium Ce takes this oxygen to become ceria $CeO_2$ (in this specification, this reaction will be referred to as "oxygen storage reaction"). On the other hand, when unburned HC and CO flow into the first and second catalysts 53 and 54 due to the air-fuel ratio being richer than the stoichiometric air-fuel ratio, the unburned HC and CO strip the ceria $CeO_2$ of its oxygen, which results in the ceria $CeO_2$ once again becoming cerium Ce, which is inherently unstable (in this specification, this reaction will be referred to as "oxygen release reaction").

In this way, NOx in the exhaust gas is able to be reduced using the oxygen molecules in the exhaust gas that are stored when the air-fuel ratio is lean and HC and CO in the exhaust gas are able to be oxidized using the oxygen from the ceria $CeO_2$ when the air-fuel ratio is rich. Accordingly, the first and second catalysts 53 and 54 are able to purify HC, CO, and NOx even when the air-fuel ratio is not at the stoichiometric air-fuel ratio.

As described above, in order for the first and second catalysts 53 and 54 to effectively purify HC and CO, the first and second catalysts 53 and 54 must store oxygen (i.e., must have a surplus of stored oxygen that can be released). Further, in order to effectively purify NOx, the first and second catalysts 53 and 54 must have room to store oxygen (i.e., the actual amounts of oxygen stored in each of the first catalyst 53 and the second catalyst 54 must be below the maximum storable amounts of oxygen in the first catalyst 53 and the second catalyst 54, respectively).

On the other hand, the air-fuel ratio of the internal combustion engine changes according to the operating state and the like of the engine, and it is difficult to estimate whether the air-fuel ratio of the internal combustion engine will become rich or lean as it changes. Therefore, in order to inhibit the discharge of HC, CO, and NOx, it is normally preferable to maintain the amounts of stored oxygen in the first and second catalysts 53 and 54 at approximately half the maximum storable amounts of oxygen of the first and second catalysts 53 and 54.

Here, the exhaust gas control apparatus according to this invention calculates (i.e., estimates) the amounts of stored oxygen in the first and second catalysts 53 and 54 and then controls the air-fuel ratio of the internal combustion engine so that the calculated amount of oxygen stored in the first catalyst 53 substantially matches a target amount of oxygen stored in the first catalyst which is set to an amount that is approximately half of the maximum storable amount of oxygen of the first catalyst 53 under normal conditions in which the calculated amount of oxygen stored in the second catalyst 54 is within a predetermined range that includes an amount which is approximately half of the maximum storable amount of oxygen of the second catalyst 54. In this case, the value of the calculated amount of oxygen stored in the second catalyst 54 corresponds to a calculated value which is a value that changes according to at least the amount of oxygen stored in the second catalyst portion. Likewise, the value of the calculated amount of oxygen stored in the first catalyst 53 corresponds to an obtained value which is a value that changes according to at least the amount of oxygen stored in the first catalyst portion.

On the other hand, when the amount of oxygen stored in the second catalyst 54 exceeds the predetermined range, such as when the air-fuel ratio of the exhaust gas flowing into the first catalyst 53 has temporarily become quite lean due to an acceleration or deceleration operation or the like, there is little room in the second catalyst 54 to store any more oxygen. At this time, if the first catalyst 53 has extra room to store oxygen and the first catalyst 53 and the second catalyst 54 together are regarded as a single catalyst apparatus, then the catalyst apparatus as a whole has extra room to store oxygen. This apparatus therefore controls the air-fuel ratio of the internal combustion engine to be rich so that (a) the target amount of oxygen stored in the first catalyst changes (i.e., decreases) so that it is smaller, by a predetermined amount, than approximately half of the maximum storable amount of oxygen of the first catalyst 53, and (b) the amount of oxygen stored in the first catalyst 53 substantially matches the changed target amount of oxygen stored in the first catalyst 53.

Similarly, when the amount of oxygen stored in the second catalyst 54 becomes smaller than the predetermined range, such as when the air-fuel ratio of the exhaust gas flowing into the first catalyst 53 has temporarily become quite rich due to an acceleration or deceleration operation or the like, there is little oxygen in the second catalyst 54 that can be released. If the first catalyst 53 has surplus oxygen that can be released at this time, then the catalyst apparatus as a whole has surplus oxygen that can be released. This apparatus therefore controls the air-fuel ratio of the internal combustion engine to be lean so that (a) the target amount of oxygen stored in the first catalyst changes (i.e., increases) so that it is larger, by a predetermined amount, than approximately half of the maximum storable amount of oxygen of the first catalyst 53, and (b) the amount of oxygen stored in the first catalyst 53 substantially matches the changed first target oxygen storage amount.

In this way, even if the air-fuel ratio of the internal combustion engine changes abruptly, the apparatus controls the air-fuel ratio of the internal combustion engine such that the catalyst apparatus, when regarded as including both the first catalyst 53 and the second catalyst 54, is able to stably maintain both enough room for oxygen to be stored and enough oxygen so that some can be released, regardless of whether or not the conditions are normal.

(A Catalyst Model)

In order to control the air-fuel ratio of the internal combustion engine using the amounts of oxygen stored in the first and second catalysts 53 and 54, it is useful to obtain those amounts. However, because it is not possible to directly measure the amount of oxygen stored, this apparatus obtains the amounts of oxygen stored in the first and second catalysts 53 and 54 by calculation.

When gas of a lean air-fuel ratio flows into the catalyst, a large amount of oxygen is stored on the upstream side in the catalyst. In the same way, when gas of a rich air-fuel ratio flows into the catalyst, the oxygen stored on the upstream side in the catalyst is consumed or released first. As a result, the oxygen stored in the catalyst is not distributed evenly throughout the catalyst in the direction of the flow of the exhaust gas. Therefore, in order to accurately obtain the amount of oxygen stored in the catalyst, it is preferable to make calculations that take the distribution of the stored oxygen into consideration.

Also, the amount of oxygen stored in the catalyst changes according to the amount of the oxygen storage and release reaction generated within the catalyst. This rate depends on the amount of a specific component that is related to the oxygen storage and release reaction in the exhaust gas flowing into or out of the catalyst. Therefore, in order to accurately obtain the amount of oxygen stored in the catalyst, it is preferable to perform calculations that take the amount of the specific component into consideration.

Based on these requirements, the amounts of the specific component and the amounts of the oxygen stored in the first and second catalysts 53 and 54 are calculated by adapting a catalyst model, to be described later, for the first and second catalysts 53 and 54.

(Description of the Catalyst Model and Calculation of the Specific Component and Amount of Stored Oxygen)

Figure 5:
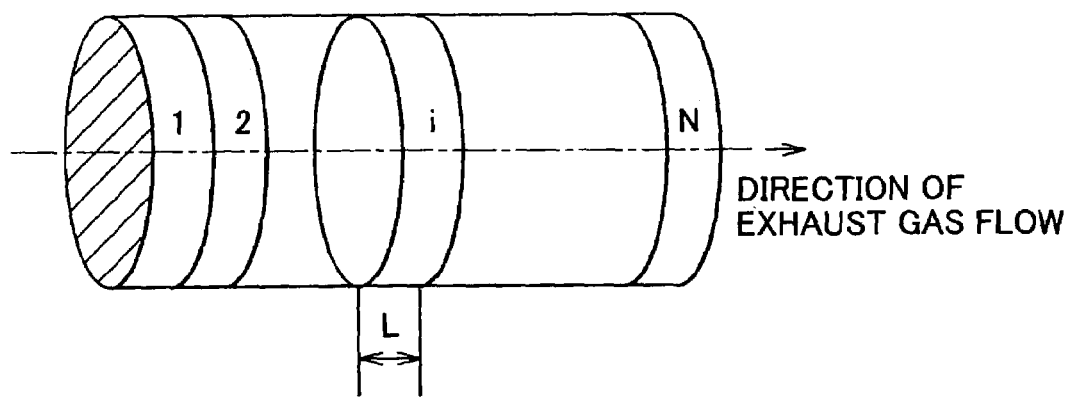
FIG. 5 is a representative view of a catalyst model for the exhaust gas control apparatus according to the first exemplary embodiment of the invention.

Referring to the representative view in FIG. 5, the catalyst model is structured such that a columnar-shaped catalyst having a uniformly shaped cross-section orthogonal to the axis is divided into N number (i.e., a plurality) of regions (called "blocks") by planes orthogonal to the axis. That is, the catalyst represented by this model is divided into N number of blocks in the direction of flow of the exhaust gas. The length in the axial direction of each block is denoted by the reference character L. For the sake of simplifying the description, reference numerals are provided for each block in order starting from the upstream side in the direction of flow of the exhaust gas, as shown in FIG. 5, and a suffix (i) is provided at the end of variables and reference numerals and the like relating to an arbitrary "i"th block. Although the catalyst in this catalyst model is divided into a plurality of blocks, it is also conceivable to have the entire catalyst be a single region (i.e., a single block).

Figure 6:
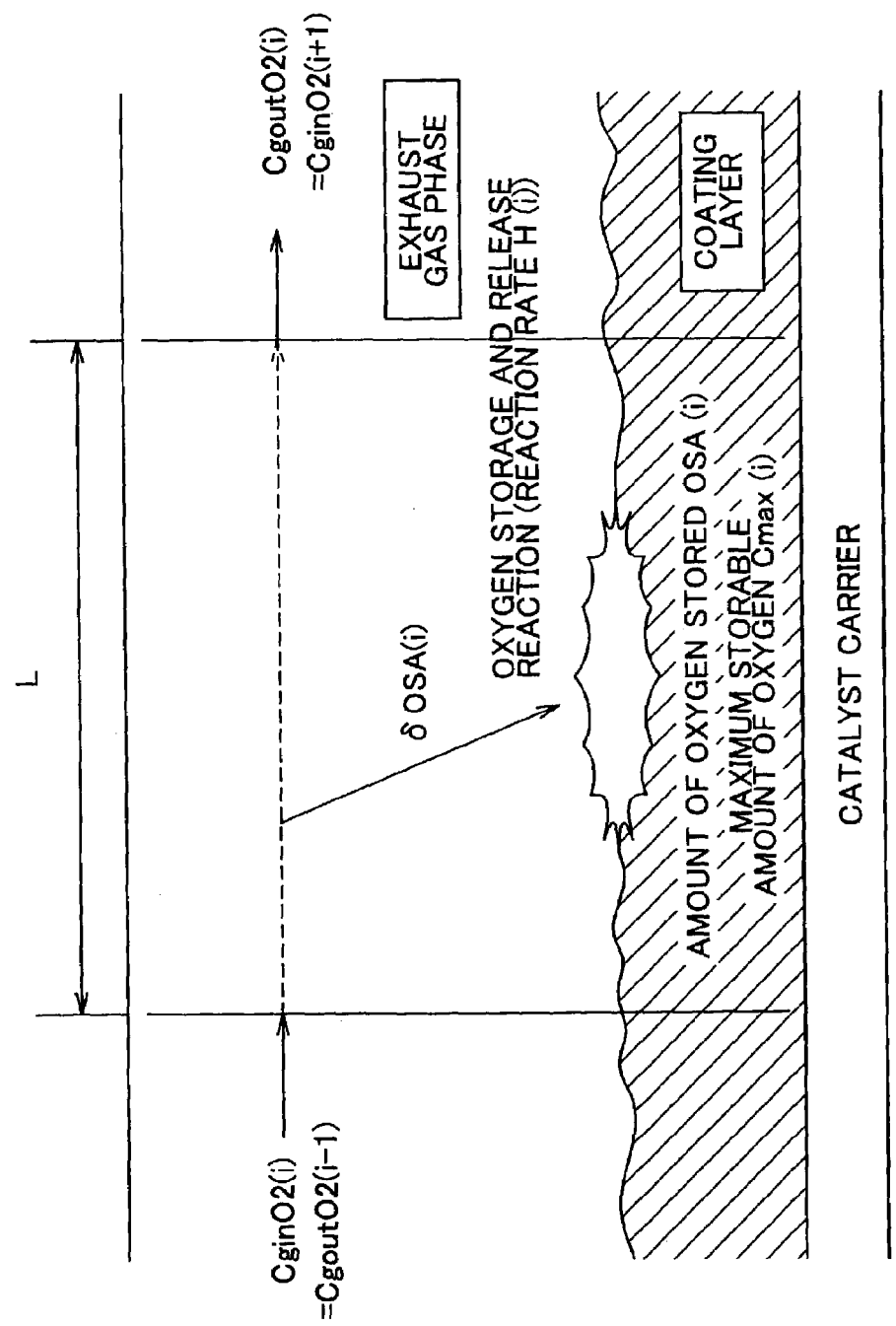
FIG. 6 is a view illustrating the balance of a specific component that relates to an oxygen storage and release reaction in a specific region of the catalyst model shown in FIG. 5.

Looking first at a "I"th block (i) (i.e., specific region) from among the plurality of blocks, as shown in FIG. 6, consideration is given to balancing the specific component relating to the oxygen storage and release reaction in the block (i) in a calculation cycle of the CPU 71. In this catalyst model, it is presumed that the oxidizing and reducing reaction of the catalyst, which is a three way reaction, is instantaneous and finishes completely. This model focuses only on the resultant storage and release reaction of oxygen which is based on an excess or shortage of oxygen. This presumption (i.e., the catalyst model) is both practical and has a high degree of calculation accuracy. An exhaust gas phase shown in FIG. 6 is a space through which the exhaust gas passes, and a coating layer is a layer that carries an active component, which is a precious metal such as platinum (Pt), as well as a component such as ceria ($CeO_2$) or the like.

The specific component may be, for example, components selected from a group consisting of oxygen (molecules) $O_2$, oxides of nitrogen NOx, carbon monoxide CO, and hydrocarbons HC. In this catalyst model, (an excess or shortage of) oxygen (i.e., oxygen molecules and the oxygen in oxides of nitrogen; in this specification, oxygen molecules and oxygen in oxides of nitrogen are simply referred to as "oxygen") in the exhaust gas in a state in which it is presumed that the three way reaction is instantaneous and finishes completely, is selected as the specific component. An oxygen amount CgO2, which is the amount of this oxygen, is calculated so as to become a positive value when there is a surplus of oxygen (i.e., when the exhaust gas contains $O_2$ and NOx), and so as to become a negative value when there is a shortage of oxygen (i.e., when the exhaust gas contains unburned HC and CO).

Also, in the block (i), which is the block being focused on, the oxygen amount CgO2 that flows into the exhaust gas phase of the block (i) per calculation cycle of the CPU 71 will be referred to as "amount of inflowing oxygen CginO2 (i)", and the oxygen amount CgO2 that flows out of the exhaust gas phase of the block (i) per calculation cycle of the CPU 71 will be referred to as "amount of outflowing oxygen CgoutO2(i)". Further, the oxygen amount CgO2 stored in or released from the coating layer of the block (i) per calculation cycle will be referred to as "change in oxygen storage amount δOSA(i)". This change in oxygen storage amount δOSA(i) is calculated to become a positive value when oxygen is stored in the coating layer and a negative value when oxygen is released from the coating layer. Further, the amount of oxygen currently stored in the coating layer of the block (i) is referred to as "amount of stored oxygen OSA(i)", and the current maximum storable amount of oxygen in the coating layer of the block (i) is referred to as "maximum storable amount of oxygen Cmax(i)".

Now, when we consider the balance of the oxygen amount CgO2 in the block (i) shown in FIG. 6 per calculation cycle, of the amount of inflowing oxygen CginO2(i) that has flowed into the exhaust gas phase of the block (i), only the change in the oxygen storage amount δOSA(i) is stored in the coating layer. The rest of the oxygen amount CgO2, i.e., the oxygen amount CgO2 that was not stored by the coating layer, becomes the amount of outflowing oxygen CgoutO2(i). Therefore, the relationship between the amount of inflowing oxygen CginO2(i), the amount of outflowing oxygen CgoutO2(i), and the change in the oxygen storage amount δOSA(i) can be written as in Expression 1 below. The relationship shown in this expression is the basic equation of the catalyst model.

$$C=goutO2(i)=CginO2(i)-\delta OSA(i) \quad \text{[Expression 1]}$$

Next, let us consider the change in the oxygen storage amount δOSA(i). When the amount of inflowing oxygen CginO2(i) is a positive value, it means that there is a surplus of oxygen in the exhaust gas flowing into the exhaust gas phase of the block (i). Because some of the oxygen in the exhaust gas is stored in the coating layer, the change in the oxygen storage amount δOSA(i) becomes a positive value. The amount of the oxygen storage reaction at this time, i.e., the change in the oxygen storage amount δOSA(i), is considered to be proportional to the value of the amount of inflowing oxygen CginO2(i), as well as proportional to the difference between the current maximum storable amount of oxygen Cmax(i) and the current amount of stored oxygen OSA(i). Therefore, when the amount of inflowing oxygen CginO2(i) is a positive value, the change in the oxygen storage amount δOSA(i) can be calculated based on Expressions 2 and 3 below.

$$\delta OSA(i)=H(i)\times CginO2(i) \quad \text{[Expression 2]}$$

$$H(i)=h\times((Cmax(i)-OSA(i))/Cmax(i))(\leq 0H(i)<1) \quad \text{[Expression 3]}$$

In Expressions 2 and 3 above, H(i) is the reaction rate that indicates the ratio of the amount of stored oxygen (δOSA(i)) to the amount of inflowing oxygen CginO2(i) in the block (i). h is the reaction speed coefficient, and in this model, is a positive constant. However, h may also be a positive value that changes according to the temperature of the catalyst (e.g., a positive value that increases uniformly with an increase in the temperature of the catalyst). Also, in Expression 3, the difference between the current maximum storable amount of oxygen Cmax(i) and the current amount of stored oxygen OSA(i), that is, Cmax(i)−OSA(i), indicates how much extra room currently available for oxygen storage. In this way, using this catalyst model, the amount of oxygen stored from the exhaust gas that flows into the catalyst is calculated based on at least the amount of oxygen stored in the catalyst.

Meanwhile, when the amount of inflowing oxygen CginO2(i) is a negative value, it means that there is a shortage of oxygen in the exhaust gas flowing into the exhaust gas phase of the block (i). Because the oxygen is released from the coating layer, the change in the oxygen storage amount δOSA(i) becomes a negative value. The amount of the oxygen storage reaction at this time, i.e., (the absolute value of) the change in the oxygen storage amount δOSA(1), is considered to be proportional to the value of the amount of inflowing oxygen CginO2(i), as well as proportional to the value of the current amount of stored oxygen OSA(i). Therefore, when the amount of inflowing oxygen CginO2(i) is a negative value, the change in the oxygen storage amount δOSA(i) can be calculated based on Expressions 4 and 5 below which show the same relationship as Expression 2.

$$\delta OSA(i)=H(i)\times CginO2(i) \quad \text{[Expression 4]}$$

$$H(i)=h\times(OSA(i)/Cmax(i))(\leq 0H(i)<1) \quad \text{[Expression 5]}$$

In Expressions 4 and 5 above, H(i) is the reaction rate that indicates the ratio of the amount of released oxygen δOSA(i)) to the amount of inflowing oxygen CginO2(i) (a negative value) in the block (i). h is the reaction speed coefficient, and is used in these expressions as it is in Expression 3. Also, the value of the current amount of stored oxygen OSA(i) in Expression 5 indicates the current amount of spare oxygen that can be released in the block (i). In this way, using this catalyst model, the amount of oxygen that can be released from the oxygen stored in the catalyst is calculated based on at least the amount of oxygen stored in the catalyst.

Here, the maximum storable amount of oxygen Cmax(i) in the block (i) used in Expressions 3 and 5 above is obtained beforehand by a method which will be described later. Further, the current amount of stored oxygen OSA(i) in the block (i) used in Expressions 3 and 5 above is an accumulated value of the change in the oxygen storage amount δOSA(i) from the time the initial value was applied until the current point, so it can be calculated based on Expression 6 below.

$$OSA(i)=\Sigma\delta OSA(i)(0\leq OSA(i)\leq Cmax(i)) \quad \text{[Expression 6]}$$

Next, when considering the boundary condition between two adjacent blocks, the outflow plane of the exhaust gas phase of the block on the upstream side is continuous with the inflow plane of the exhaust gas phase of the block on the downstream side, as shown in FIG. 5. Therefore, as shown in FIG. 6, the amount of inflowing oxygen CginO2(i) flowing into the block (i) is the amount of outflowing oxygen CgoutO2(i−1) flowing out from the upstream side block (i−1) adjacent to the block (i). Also, the amount of outflowing oxygen CgoutO2(i) flowing out from the block (i) is the amount of inflowing oxygen CginO2(i+1) flowing into the downstream side block (i+1) adjacent to the block (i). Accordingly, the relationship can be written as shown in Expression 7 below. That is, if the amount of outflowing oxygen CgoutO2(i) of an arbitrary "I"th block (i) is known, then the amount of inflowing oxygen CginO2(i+1) of the downstream side block (i+1) adjacent to the block (i) is known.

$$CginO2(i+1)=CgoutO2(i) \quad \text{[Expression 7]}$$

Accordingly, if the amount of inflowing oxygen CginO2(1) in the block (1) that is farthest upstream is made the boundary condition, then the change in the oxygen storage amount δOSA(1) in the block (1) can be obtained using either Expression 2 or Expression 4. As a result, the amount of stored oxygen OSA(1) in the block (1) can be updated using Expression 6 while the amount of outflowing oxygen CgoutO2(1) in the block (1) can be obtained using Expression 1. Once the amount of outflowing oxygen CgoutO2(1) in the block (1) is obtained, the amount of inflowing oxygen CginO2(2) in block (2) can be obtained using Expression 7. As a result, the change in the oxygen storage amount δOSA(2) in the block (2) can be obtained using either Expression 2 or Expression 4. Accordingly, the amount of stored oxygen OSA(2) in the block (2) can be updated using Expression 6 while the amount of outflowing oxygen CgoutO2(2) in the block (2) can be obtained using Expression 1.

By repeating this kind of procedure, using this catalyst model, once the amount of inflowing oxygen CginO2(1) in the block (1) that is farthest upstream is made the boundary condition each time the calculation cycle of the CPU 71 elapses, then the amount of stored oxygen OSA(i), the amount of inflowing oxygen CginO2(i), and the amount of outflowing oxygen CgoutO2(i) for each block (i) (i=1, 2, ..., N) can be calculated in order starting from the first block (1) that is farthest upstream using Expressions 1 to 7.

As a result, when the distribution of the amount of oxygen stored in the catalyst is accurately calculated and the amounts of stored oxygen OSA(i) in every block of the catalyst are added together, it is possible to accurately calculate the total amount of oxygen stored OSAall in the entire catalyst.

Next, a general equation for obtaining the amount of outflowing oxygen CgoutO2(i) of an arbitrary "I"th block (i) will be obtained. First, when "1" is substituted for "i", Expression 1 can be rewritten as Expression 8 below.

$$C = goutO2(1) = CginO2(1) - \delta OSA(1) \quad \text{[Expression 8]}$$

Also, when "2" is substituted for "i" in Expression 1 and this is combined with Expressions 7 and 8, we get Expression 9 below.

$$CgoutO2(2) = CginO2(1) - \delta OSA(1) - \delta OSA(2) \quad \text{[Expression 9]}$$

Further, when "3" is substituted for "i" in Expression 1 and this is combined with Expressions 7 and 9, we get Expression 10 below.

$$CgoutO2(3) = CginO2(1) - \delta OSA(1) - \delta OSA(2) - \delta OSA(3) \quad \text{[Expression 10]}$$

By repeating this procedure and writing the relationships in Expression 10 in general terms, we get Expression 11 below, which is a general equation for obtaining the amount of outflowing oxygen CgoutO2(i) of an arbitrary "i"th block (i).

$$CgoutO2(i) = CginO2(1) - \delta OSA(1) - \delta OSA(2) - \ldots - \delta OSA(i-1) - \delta OSA(i) \quad \text{[Expression 11]}$$

$$i = 1, 2, \ldots, N$$

Further, from Expressions 1 and 2 (or 4) we get Expression 12 below. By applying the relationship in Expression 7 to Expression 12 and writing that relationship in general terms, we can easily come up with Expression 13 below, which is another general equation for obtaining the amount of outflowing oxygen CgoutO2(i) of an arbitrary "i"th block (V).

$$CgoutO2(i) = CginO2(i) \times (1-H(i)) \quad \text{[Expression 12]}$$

$$CgoutO2(i) = CginO2(1) \times (1-H(1)) \times (1-H(2)) \times \ldots \times (1-H(i-1)) \times 131 \ H(i) \text{[Expression 13]}$$

$$i = 1, 2, \ldots, N$$

(Detailed Application of the Catalyst Model)

Figure 7:
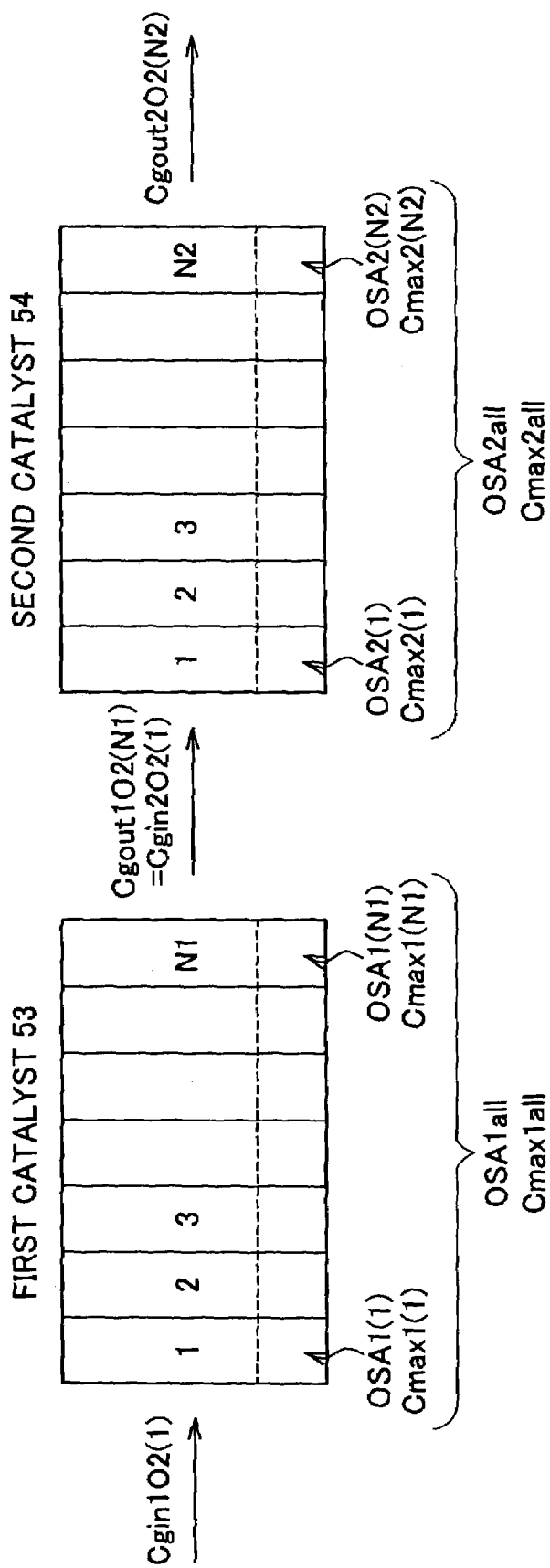
FIG. 7 is a representative view of the catalyst model shown in FIG. 5 being applied to the first and second catalysts.

Next, the catalyst model described above will be applied to both the first and second catalysts 53 and 54, as shown in FIG. 7. The first catalyst 53 which is an object of this catalyst model is divided into N1 number of blocks in the direction of flow of the exhaust gas and the second catalyst 54, which is also an object of the catalyst model, is divided into N2 number of blocks in the direction of flow of the exhaust gas.

Here, the "i"th block of the first catalyst 53 will be referred to as "block 1(i)". The amount of inflowing oxygen in the block 1(i) will be referred to as "amount of inflowing oxygen Cgin1O2(i)". The amount of outflowing oxygen in the block 1(i) will be referred to as "amount of outflowing oxygen egout1O2(i)". The amount of oxygen stored in the block 1(i) will be referred to as "amount of stored oxygen OSA1(i)". The maximum storable amount of oxygen in the block 1(i) will be referred to as "maximum storable amount of oxygen Cmax1(i)". Also, the total amount of oxygen stored in the entire first catalyst 53 that can be obtained by adding the amounts of stored oxygen OSA1(i) in all of the blocks (i=1, 2, . . . , N1) will be referred to as "total amount of oxygen stored OSA1all". The overall maximum storable amount of oxygen of the entire first catalyst 53, which is the sum of the maximum storable amounts of oxygen Cmax1(i) (i=1, 2, . . . , N1) in all of the blocks, will be referred to as "maximum storable amount of oxygen Cmax1all".

Similarly, the "i"th block of the second catalyst 54 will be referred to as "block 2(i)". The amount of inflowing oxygen in the block 2(i) will be referred to as "amount of inflowing oxygen Cgin2O2(i)". The amount of outflowing oxygen in the block 2(i) will be referred to as "amount of outflowing oxygen egout2O2(i)". The amount of oxygen stored in the block 2(i) will be referred to as "amount of stored oxygen OSA2(i)". The maximum storable amount of oxygen in the block 2(i) will be referred to as "maximum storable amount of oxygen Cmax2(i)". Also, the total amount of oxygen stored in the entire second catalyst 54 that can be obtained by adding the amount of stored oxygen OSA2(i) in all of the blocks (i=1, 2, . . . , N2) will be referred to as "total amount of oxygen stored OSA2all". The overall maximum storable amount of oxygen of the entire second catalyst 54, which is the sum of maximum storable amounts of oxygen Cmax2(i) (i=1, 2, . . . , N1) in all of the blocks, will be referred to as "overall maximum storable amount of oxygen Cmax2all".

The maximum storable amount of oxygen Cmax1(i) (i=1, 2, . . . , N1) of each block 1(i) in the first catalyst 53, the overall maximum storable amount of oxygen Cmax1all of the entire first catalyst 53, the maximum storable amount of oxygen Cmax2(i) (i=1, 2, . . . N2) of each block 2(i) in the second catalyst 54, and the overall maximum storable amount of oxygen Cmax2all of the entire second catalyst 54 are all obtained beforehand by a method which will be described later.

With the catalyst model applied to the first catalyst 53 shown in FIG. 7, as was described above, the initial value of the amount of stored oxygen OSA1(i) (i=1, 2, . . . , N1) in each block of the first catalyst 53 is made the initial condition. Further, the amount of inflowing oxygen Cgin1O2(1) in the block 1(1) that is farthest upstream in the first catalyst 53 is made the boundary condition each time the calculation cycle of the CPU 71 elapses. As a result, the amount of stored oxygen OSA1(i), the amount of inflowing oxygen Cgin1O2(i), and the amount of outflowing oxygen Cgout1O2(i) in each block 1(i) (i=1, 2, . . . , N1) of the first catalyst 53 can all be calculated. Similarly, with the catalyst model applied to the second catalyst 54 shown in FIG. 7, as was described above, the initial value of the amount of stored oxygen OSA2(i) (i=1, 2, . . . , N2) in each block of the second catalyst 54 is made the initial condition. Further, the amount of inflowing oxygen Cgin2O2(1) in the block 2(1) that is farthest upstream in the second catalyst 54 is made the boundary condition each time the calculation cycle of the CPU 71 elapses. As a result, the amount of stored oxygen OSA2(i), the amount of inflowing oxygen Cgin2O2 (i), and the amount of outflowing oxygen Cgout2O2(i) in each block 2(i) (i=1, 2, . . . , N2) of the second catalyst 54 can all be calculated. As a result, the total amount of stored oxygen OSA1all (obtained value) of the entire first catalyst 53 can be obtained and the total amount of stored oxygen OSA2all (calculated value) of the entire second catalyst 54 can be calculated.

First, the method for applying the initial valve of the amount of oxygen stored in each block of the first and second catalysts 53 and 54 will be described. When the output Voxs1 of the exhaust side midstream air-fuel ratio sensor 67 is a value that is greater than 0.7 (V), i.e., when the air-fuel ratio downstream of the first catalyst 53 and upstream of the second catalyst 54 is clearly rich, it means that there is no oxygen left in the first catalyst 53 so the unburned HC and CO is unable to be purified. Therefore, this apparatus sets the amount of stored oxygen OSA1(i) (i=1, 2, . . . , N1) in each block of the first catalyst 53 and the total amount of stored oxygen OSA1all in the entire first catalyst 53 to "0".

Similarly, when the output Voxs2 of the exhaust side downstream air-fuel ratio sensor 68 is a value that is greater than 0.7 (V), i.e., when the air-fuel ratio downstream of the second catalyst 54 is clearly rich, the apparatus sets the amount of stored oxygen OSA2(i) (i=1, 2, . . . , N2) in each block of the second catalyst 54 and the total amount of stored oxygen OSA2all in the entire second catalyst 54 to "0". Thus, the initial value "0" of the amount of oxygen stored in each block of both the first and second catalysts 53 and 54 is made the initial condition.

Next, the method for calculating the amount of inflowing oxygen Cgin1O2(1) in the block 1(1) that is farthest upstream in the first catalyst 53 will be described. This apparatus calculates the amount of inflowing oxygen Cgin1O2(1) of each calculation cycle of the CPU 71 based on Expression 14 below.

$$Cgin1O2(1)=0.23\times mfr1\times(abyfs-stoich) \qquad \text{[Expression 14]}$$

In Expression 14 above, the value "0.23" is a weighted ratio of the oxygen in the atmosphere. mfr1 is the sum of fuel injection quantity Fi in a predetermined period of time (calculation cycle tsample). stoich is the stoichiometric air-fuel ratio (e.g., 14.7). abyfs is the air-fuel ratio A/F detected by the exhaust side upstream air-fuel ratio sensor 66 in the predetermined period of time tsample. Alternatively, however, abyfs may be a mean value of the air-fuel ratio A/F detected by the exhaust side upstream air-fuel ratio sensor 66 in the predetermined period of time tsample.

As shown in Expression 14, the difference between the detected air-fuel ratio A/F and the stoichiometric air-fuel ratio (i.e., abyfs–stoich) is multiplied by the sum mfr1 of the fuel injection quantity in the predetermined period of time tsample to get the amount of surplus air in the predetermined period of time tsample. This amount of surplus air is then multiplied by the weighted ratio of the oxygen to get the amount of surplus oxygen in the predetermined period of time tsample, i.e., the amount of inflowing oxygen Cgin1O2 (1). The amount of inflowing oxygen Cgin1O2(1) calculated in this way is calculated to be a positive value when there is a surplus of oxygen, and calculated to be a negative value when there is a shortage of oxygen. Accordingly, the amount of inflowing oxygen Cgin1O2(1) in the block 1(1) that is farthest upstream in the first catalyst 53 is made the boundary condition in each calculation cycle of the CPU 71.

Next, the method for calculating the amount of inflowing oxygen Cgin2O2(1) in the block 2(1) that is farthest upstream in the second catalyst 54 will be described. The exhaust gas flowing out from the block 1(N1) that is farthest downstream in the first catalyst 53 passes through the exhaust pipe 52 and flows into the block 2(1) that is farthest upstream in the second catalyst 54 without any other gas entering from outside and without any of the gas being released to the outside (i.e., in the exact state that is was when it flowed out from the block 1(N1)). Accordingly, the amount of outflowing oxygen Cgout1O2(N1) flowing out from the block 1(N1) that is farthest downstream in the first catalyst 53 and the amount of inflowing oxygen Cgin2O2(1) in the block 2(1) that is farthest upstream in the second catalyst 54 are the same value. Therefore, this apparatus also uses the value of the amount of outflowing oxygen Cgout1O2(N1) calculated in each calculation cycle of the CPU 71 as the amount of inflowing oxygen Cgin2O2(1). In this way, the amount of inflowing oxygen Cgin2O2(i) in the block 2(1) that is farthest upstream in the second catalyst 54 is made the boundary condition in each calculation cycle of the CPU 71.

Thus, in each calculation cycle of the CPU 71, the apparatus calculates the amount of stored oxygen OSA1(i), the amount of inflowing oxygen Cgin1O2(i), and the amount of outflowing oxygen Cgout1O2(i) in each block 1(i) (i=1, 2, . . . , N1) of the first catalyst 53, as well as the amount of stored oxygen OSA2(i), the amount of inflowing oxygen Cgin2O2(i), and the amount of outflowing oxygen Cgout2O2(i) in each block 2(i) (i=1, 2, . . . , N2) of the second catalyst 54. In addition, the apparatus also calculates, in each calculation cycle of the CPU 71, the total amount of stored oxygen OSA1all in the entire first catalyst 53 and the total amount of oxygen stored OSA2all in the entire second catalyst 54.

(Detailed Method of Setting the Target Amount of Oxygen Stored in the First Catalyst and Controlling the Amount of Stored Oxygen)

Figure 8:
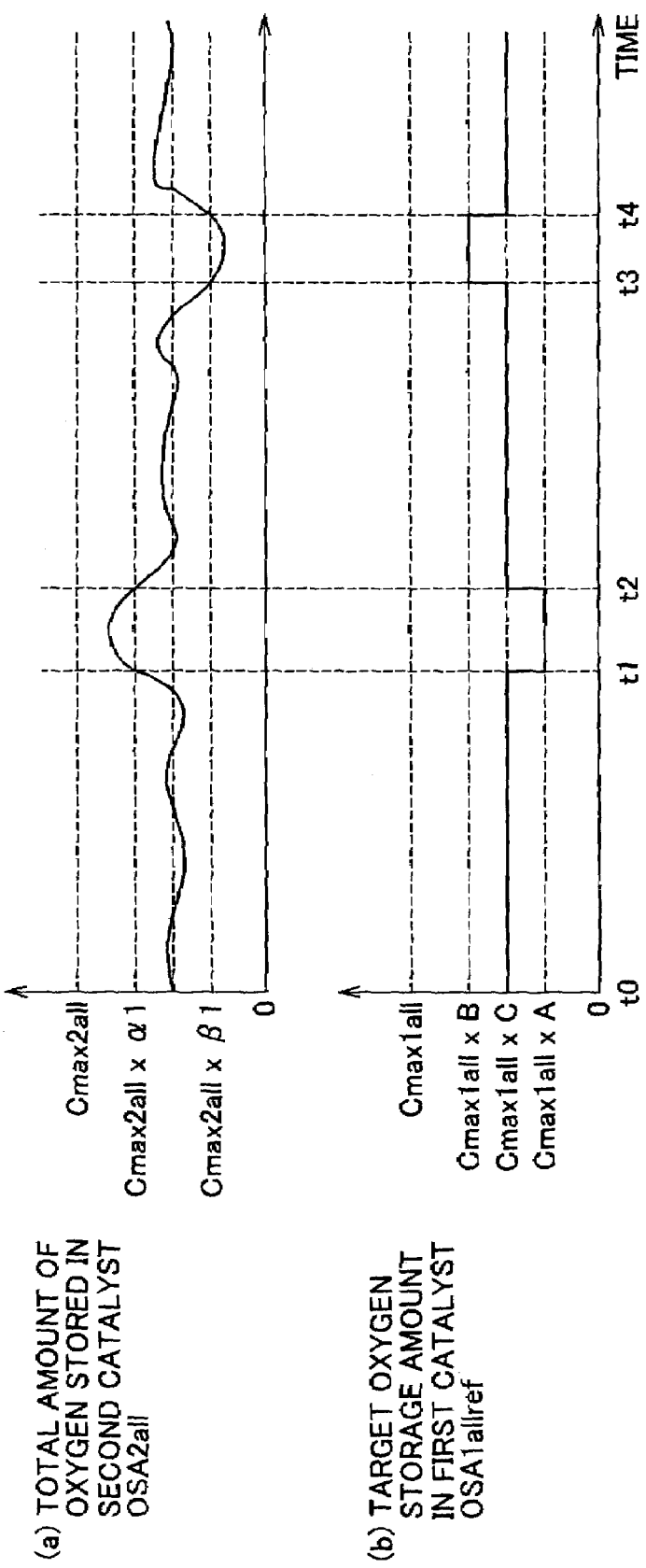
FIG. 8 is a time chart showing a change in the amount of oxygen stored in the second catalyst and the target amount of oxygen stored in the first catalyst when the amount of oxygen stored in the first catalyst is controlled by the exhaust gas control apparatus shown in FIG. 1.

FIG. 8 is a time chart showing one example of a detailed method for controlling the amount of oxygen stored in the first catalyst 53 with this apparatus. First, in the time chart, in the period between time t0 and time t1, the value of the total amount of oxygen stored OSA2all in the entire second catalyst 54, which is calculated according to the catalyst model, is assumed to be both greater than the product of a coefficient β1 (e.g., β1=0.3) multiplied by the value of the overall maximum storable amount of oxygen Cmax2all of the second catalyst 54, which is obtained beforehand by a method to be described later, and less than the product of a coefficient α1 (e.g., α1=0.7) multiplied by the value of the maximum storable amount of oxygen Cmax2all, as shown in FIG. 8(*a*).

In this case, the apparatus sets a target amount of oxygen stored in the first catalyst OSAallref to equal the product of a coefficient C (C=0.5) multiplied by the value of the maximum storable amount of oxygen Cmax1all of the entire first catalyst 53, which is obtained beforehand by a method to be described later, as shown in FIG. 8(*b*). The apparatus then performs feedback control on the air-fuel ratio of the internal combustion engine so that the value of the total amount of oxygen stored OSA1all of the first catalyst 53, which was calculated according to the catalyst model, substantially matches the value (Cmax1all×C) of the target amount of oxygen stored in the first catalyst OSAallref. Accordingly, the total amount of oxygen stored OSA1all of the first catalyst 53, which was calculated according to the catalyst model, is controlled so as to be approximately half of the maximum storable amount of oxygen Cmax1all of the entire first catalyst 53, which is obtained beforehand. Similarly, the overall maximum storable amount of oxygen Cmax2all of the entire second catalyst 54, which was calculated according to the catalyst model, is controlled so as to be approximately half of the maximum storable amount of oxygen Cmax2all of the entire second catalyst 54, which is obtained beforehand.

Right before the time t1, the air-fuel ratio of the exhaust gas flowing into the first catalyst 53 temporarily becomes quite lean due, for example, to sudden acceleration or deceleration of the internal combustion engine so the value of the total amount of oxygen stored OSA1all of the entire first catalyst 53, as well as the value of the total amount of oxygen stored OSA2all of the second catalyst 54, which is shown in FIG. 8(*a*), starts to increase. At time t1, the value of the total amount of oxygen stored OSA2all exceeds the product of the coefficient al multiplied by the value of the overall maximum storable amount of oxygen Cmax2all of the entire second catalyst 54. At this time, the apparatus sets the target amount of oxygen stored in the first catalyst OSAallref to equal the product of a coefficient A (e.g., A=0.3) multiplied by the value of the overall maximum storable amount of oxygen Cmax1all of the entire first catalyst 53, and performs feedback control on the air-fuel ratio of the internal combustion engine so that the value of the total amount of oxygen stored OSA1all of the entire first catalyst 53 substantially matches the value (Cmax1all×A) of the target amount of oxygen stored in the first catalyst OSAallref, as shown in FIG. 8(b). Accordingly, the air-fuel ratio of the internal combustion engine is controlled to become rich so the value of the total amount of oxygen stored OSA1all of the entire first catalyst 53, as well as the value of the total amount of oxygen stored OSA2all of the entire second catalyst 54, which is shown in FIG. 8(a), starts to decrease.

Then at time t2, the value of the total amount of oxygen stored OSA2all of the entire second catalyst 54 returns to within the range above the product of the coefficient β1 multiplied by the value of the total amount of oxygen stored OSA2all of the entire second catalyst 54 and below the product of the coefficient α1 multiplied by the value of the overall maximum storable amount of oxygen Cmax2all, as shown in FIG. 8(a). At this time, the apparatus again sets the target amount of oxygen stored in the first catalyst OSAallref to equal the product of the coefficient C multiplied by a value of the maximum storable amount of oxygen Cmax1all of the entire first catalyst 53, and performs feedback control similar to that performed during the period between time t0 and t1 on the air-fuel ratio of the internal combustion engine so that the value of the total amount of oxygen stored OSA1all of the entire first catalyst 53 substantially matches the value (Cmax1all×C) of the target amount of oxygen stored in the first catalyst OSAallref, as shown in FIG. 8(b).

Then, right before the time t3, the air-fuel ratio of the exhaust gas flowing into the first catalyst 53 temporarily becomes quite rich due to, for example, sudden acceleration or deceleration of the internal combustion engine so the value of the total amount of oxygen stored OSA1all of the entire first catalyst 53, as well as the value of the total amount of oxygen stored OSA2all of the entire second catalyst 54, which is shown in FIG. 8(a), starts to decrease. At time t3, the value of the total amount of oxygen stored OSA2all becomes less than the product of the coefficient β1 multiplied by the value of the overall maximum storable amount of oxygen Cmax2all of the entire second catalyst 54. At this time, the apparatus sets the target amount of oxygen stored in the first catalyst OSAallref to equal the product of a coefficient B (e.g., B=0.7) multiplied by the value of the overall maximum storable amount of oxygen Cmax1all of the entire first catalyst 53, and performs feedback control on the air-fuel ratio of the internal combustion engine so that the value of the total amount of oxygen stored OSA1all of the entire first catalyst 53 substantially matches the value (Cmax1all×B) of the target amount of oxygen stored in the first catalyst OSAallref, as shown in FIG. 8(b). Accordingly, the air-fuel ratio of the internal combustion engine is controlled to become lean so the value of the total amount of oxygen stored OSA1all of the entire first catalyst 53, as well as the value of the total amount of oxygen stored OSA2all of the entire second catalyst 54, which is shown in FIG. 8(a), starts to increase.

After time t4, the value of the total amount of oxygen stored OSA2all of the entire second catalyst 54 returns to within the range above the product of the coefficient β1 multiplied by the value of the overall maximum storable amount of oxygen Cmax2all of the entire second catalyst 54 and below the product of the coefficient α1 multiplied by the value of the overall maximum storable amount of oxygen Cmax2all, as shown in FIG. 8(a). Accordingly, the apparatus again sets the target amount of oxygen stored in the first catalyst OSAallref to equal the product of the coefficient C multiplied by the value of the maximum storable amount of oxygen Cmax1all of the entire first catalyst 53, and performs feedback control on the air-fuel ratio of the internal combustion engine so that the value of the total amount of oxygen stored OSA1all of the entire first catalyst 53 substantially matches the value (Cmax1all×C) of the target amount of oxygen stored in the first catalyst OSAallref, as shown in FIG. 8(b).

In this way, the apparatus controls the air-fuel ratio of the internal combustion engine so that the catalyst apparatus, when regarded as including both the first catalyst 53 and the second catalyst 54, is able to stably maintain both enough room for oxygen to be stored and enough oxygen so that some can be released even when the air-fuel ratio of the internal combustion engine changes abruptly, as previously described.

(Calculation of the Overall Maximum Storable Amount of Oxygen)

Next, a method for calculating the overall maximum storable amount of oxygen used in the aforementioned catalyst model will be described with reference to FIG. 9. This apparatus calculates the overall maximum storable amount of oxygen Cmax1all of the entire first catalyst 53 based on at least the output of the exhaust side midstream air-fuel ratio sensor 67, and the overall maximum storable amount of oxygen Cmax2all of the entire second catalyst 54 based on at least the output of the exhaust side downstream air-fuel ratio sensor 68, according to the method shown by the solid line in the time chart in FIG. 9.

That is, the air-fuel ratio of the gas upstream of the first catalyst 53 (this air-fuel ratio is also referred to simply as "exhaust side upstream air-fuel ratio") is first controlled at time t1 to be leaner, by a predetermined amount, than the stoichiometric air-fuel ratio.

Accordingly, because gas having a lean air-fuel ratio flows into the first catalyst 53, the amount of oxygen stored in the first catalyst 53 gradually increases until it reaches the overall maximum storable amount of oxygen Cmax1all at time t2, as shown in FIG. 9(c). As a result, gas (gas having a lean air-fuel ratio) which includes oxygen starts to flow out from the first catalyst 53 at time t2 such that the output Voxs1 of the exhaust side midstream air-fuel ratio sensor 67 changes from a value indicative of a rich air-fuel ratio (hereinafter referred to as a "rich value") to a value indicative of a lean air-fuel ratio (hereinafter referred to as a "lean value"), as shown in FIG. 9(b). The operation between time t1 and time t2 is referred to as an operation in a first mode (Mode=1).

At time t2, the apparatus continues to control the exhaust side midstream air-fuel ratio to the predetermined lean air-fuel ratio even after the output Voxs1 of the exhaust side midstream air-fuel ratio sensor 67 has changed from a rich value to a lean value (see FIG. 9(a)). Accordingly, gas having a lean air-fuel ratio continues to flow into the first catalyst 53. In addition, because the first catalyst 53 is completely saturated with oxygen (i.e., there is no more room in the first catalyst 53 to store any more oxygen), gas that includes oxygen continues to flow out from the first catalyst 53.

As a result, after time t2, the amount of oxygen stored in the second catalyst 54 gradually increases until it reaches the overall maximum storable amount of oxygen Cmax2all at time t3, as shown in FIG. 9(e). As a result, at time t3 gas that includes oxygen starts to flow out from the second catalyst 54 so the output Voxs2 of the exhaust side downstream air-fuel ratio sensor 68 changes from a rich value to a lean value, as shown in FIG. 9(d). The operation between time t2 and time t3 is referred to as an operation in a second mode (Mode=2).

As described above, in the first and second modes (Mode=1, Mode=2), the air-fuel ratio upstream of the first catalyst 53 is controlled to be leaner than the stoichiometric air-fuel ratio so that both the first and second catalysts 53 and 54 store as much oxygen as possible.

At time t3, when the output Voxs2 of the exhaust side downstream air-fuel ratio sensor 68 changes from a rich value to a lean value, the apparatus controls the exhaust side upstream air-fuel ratio to be richer, by a predetermined amount, than the stoichiometric air-fuel ratio, as shown in FIG. 9(a). Accordingly, because gas having a rich air-fuel ratio flows into the first catalyst 53, the oxygen in the first catalyst 53 is used to oxidize the unburned HC and CO flowing into the first catalyst 53. Accordingly, the amount of oxygen stored in the first catalyst 53 decreases from the overall maximum storable amount of oxygen Cmax1all. Then at time t4, the amount of oxygen stored in the first catalyst 53 becomes "0" so gas having a rich air-fuel ratio starts to flow out from the first catalyst 53, which results in the output Voxs1 of the exhaust side midstream air-fuel ratio sensor 67 changing from a lean value to a rich value. The operation between time t3 and time t4 is referred to as an operation in a third mode (Mode=3).

Between time t3 and time t4, this apparatus detects the overall maximum storable amount of oxygen Cmax1all of the entire first catalyst 53 as follows. That is, from time t3, at which time the exhaust side upstream air-fuel ratio is set to a predetermined rich air-fuel ratio, until time t4, at which time the output Voxs1 of the exhaust side midstream air-fuel ratio sensor 67 changes to a rich value, the apparatus calculates the amount of change in the amount of oxygen stored ΔO2 based on Expression 15, which is similar to Expression 14 above, and Expression 16, both shown below. The apparatus then adds those calculated values and calculates the accumulated value at time t4 as the overall maximum storable amount of oxygen Cmax1all.

$$\Delta O2 = 0.23 \times mfr \times (stoich - abyfs)$$ [Expression 15]

$$Cmax1all = \Sigma \Delta O2 \text{ (interval } t=t3 \text{ to } t4)$$ [Expression 16]

In Expression 15, mfr is the sum of the fuel injection quantity Fi in the predetermined period of time (calculation cycle tsample), similar to mfr1 in Expression 14. As shown in Expression 15 the difference between the stoichiometric air-fuel ratio and the detected air-fuel ratio A/F (i.e., stoich−abyfs) is multiplied by the sum mfr of the injection quantity in the predetermined period of time tsample to get the amount of shortage of air in the predetermined period of time tsample, which is similar to Expression 14. This amount of shortage of air is then multiplied by the weighted ratio of the oxygen to get the amount of change in the amount of stored oxygen (i.e., the amount of stored oxygen consumed) ΔO2 in the predetermined period of time tsample. Then, as shown in Expression 16, the amount of change in the amount of stored oxygen ΔO2 is added up over time t3 to time t4 to estimate and calculate the amount of oxygen consumed between the time when the first catalyst 53 is completely saturated with oxygen and the time when all of that oxygen has been consumed, i.e., to estimate and calculate the overall maximum storable amount of oxygen Cmax1all. In this way, according to the exemplary embodiment, the overall maximum storable amount of oxygen Cmax1all is calculated using the change in the output Voxs1 of the exhaust side midstream air-fuel ratio sensor 67 and the fact that the exhaust side upstream air-fuel ratio is controlled to be a predetermined rich air-fuel ratio (i.e., using the output vabyfs of the exhaust side upstream air-fuel ratio sensor 66).

At timing t4, the apparatus continues to control the exhaust side upstream air-fuel ratio to a predetermined rich air-fuel ratio even after the output Voxs2 of the exhaust side downstream air-fuel ratio sensor 68 has changed from a lean value to a rich value. At this time, the amount of oxygen stored in the first catalyst 53 is "0" so gas having a rich air-fuel ratio flows into the second catalyst 54. As a result, the oxygen stored in the second catalyst 54 is used to oxidize the unburned HC and CO flowing into the second catalyst 54 so the amount of oxygen stored in the second catalyst 54 decreases from the overall maximum storable amount of oxygen Cmax2all until it reaches "0" at time t5. As a result, at time t5, gas having a rich air-fuel ratio starts to flow out from the second catalyst 54 so the output Voxs2 of the exhaust side downstream air-fuel ratio sensor 68 changes from a lean value to a rich value. The operation between time t4 and time t5 is referred to as an operation in a fourth mode (Mode=4).

That is, the air-fuel ratio upstream of the first catalyst 53 is controlled to be richer, by a predetermined amount, than the stoichiometric air-fuel ratio between time t3 and time t5 so that all of the oxygen stored in the first catalyst 53 is released between time t3 and time t4, and all of the oxygen stored in the second catalyst 54 is released between time t4 and time t5.

The apparatus calculates the overall maximum storable amount of oxygen Cmax2all of the entire second catalyst 54 by performing the calculations shown in Expressions 17 and 18 below. These calculations are similar to those performed when obtaining the overall maximum storable amount of oxygen Cmax1all above. In this way, according to this exemplary embodiment, the overall maximum storable amount of oxygen Cmax2all is calculated using the change in the output Voxs2 of the exhaust side downstream air-fuel ratio sensor 68 and the fact that the exhaust side upstream air-fuel ratio is controlled to be a predetermined rich air-fuel ratio (i.e., using the output vabyfs of the exhaust side upstream air-fuel ratio sensor 66).

$$\Delta O2 = 0.23 = \times mfr \times (stoich - abyfs)$$ [Expression 17]

$$Cmax2all = \Sigma \Delta O2 \text{ (interval } t=t4 \text{ to } t5)$$ [Expression 18]

Figure 10:
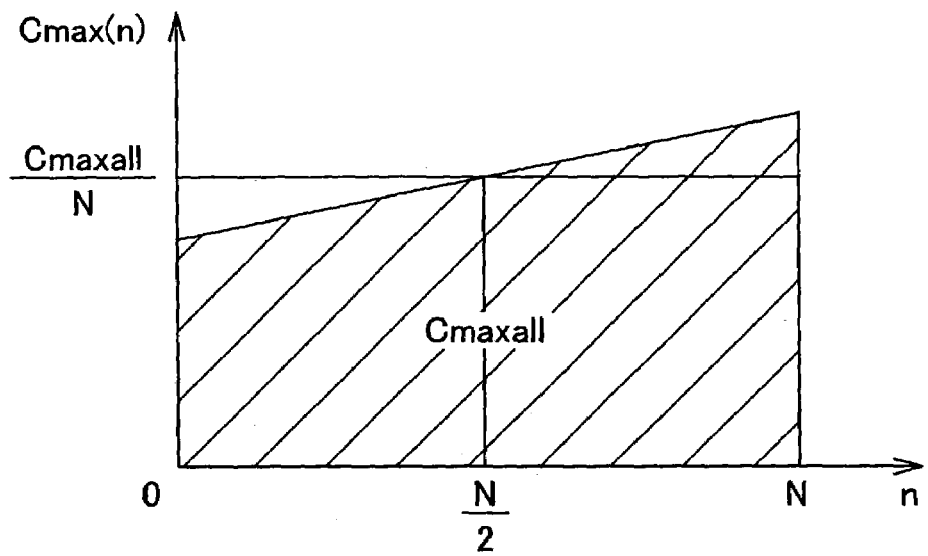
FIG. 10 is a map for obtaining the distribution of the maximum storable amount of oxygen in each block of each catalyst from the overall maximum storable amount of oxygen of the entire catalyst represented by the catalyst model in FIG. 5.

Next, the apparatus obtains the distribution of the maximum storable amount of oxygen for each block of the first catalyst from the value of the calculated overall maximum storable amount of oxygen Cmax1all of the entire first catalyst 53, as well as the distribution of the maximum storable amount of oxygen for each block of the second catalyst from the value of the calculated overall maximum storable amount of oxygen Cmax2all of the entire second catalyst 54, based on FIG. 10. FIG. 10 is a distribution map of the maximum storable amount of oxygen. This distribution map is used to obtain the distribution of the maximum storable amount of oxygen of each block of the catalyst from the value of the overall maximum storable amount of oxygen of the entire catalyst represented by the catalyst model shown in FIG. 5. The area of the portion shown by the slanted lines in FIG. 10 corresponds to the value of the overall maximum storable amount of oxygen Cmaxall of the entire catalyst.

As shown in FIG. 10, the maximum storable amount of oxygen Cmax(n) (n=1, . . . , N) of each block in the catalyst is set such that the sum total of the maximum storable amounts of oxygen Cmax(n) equals the value of the overall maximum storable amount of oxygen Cmax1all of the entire catalyst. The maximum storable amount of oxygen Cmax(n) (n=1, . . . , N) of each block in the catalyst is also set so as to increase linearly at a predetermined gradient from the upstream side block to the downstream side block. This is because the maximum storable amount of oxygen in the upstream portion of the catalyst tends to be reduced by poisoning from lead and sulfur or the like in the exhaust gas that flows into the catalyst, more than the maximum storable amount of oxygen in the downstream portion of the catalyst.

More specifically, the overall maximum storable amount of oxygen Cmax1(i) (i=1, . . . , N1) in each block 1(i) of the first catalyst 53 and the maximum storable amount of oxygen Cmax2(i) (i=1, . . . , N2) in each block 2(i) of the second catalyst 54 are calculated using Expressions 19 and 20, respectively, which are based on the distribution map of the maximum storable amount of oxygen shown in FIG. 10.

$$\text{Cmax1}(i) = A1 \times (i - (N1/2)) + (\text{Cmax1all}/N1)\ (i=1, \ldots, N1) \quad \text{[Expression 19]}$$

$$\text{Cmax2}(i) = A2 \times (i - (N2/2)) + (\text{Cmax2all}/N2)\ (i=1, \ldots, N2) \quad \text{[Expression 20]}$$

In Expressions 19 and 20 above, A1 and A2 are both positive constants which determine the gradient of the distribution of the maximum storable amount of oxygen of each block. A1 and A2 may be the same value or different values. Each maximum storable amount of oxygen of each block may be set so as to increase from the upstream side block to the downstream side block, e.g., may be set so as to increase nonlinearly. In this way, the maximum storable amount of oxygen in each block 1 of the first catalyst 53 and the overall maximum storable amount of oxygen of the entire first catalyst 53 can be calculated, and the maximum storable amount of oxygen in each block 2 of the second catalyst 54 and the overall maximum storable amount of oxygen of the entire second catalyst 54 can be calculated.

<Actual Operation>

Next, the actual operation of the exhaust gas control apparatus according to an embodiment of the invention constructed as described above will be described with reference to FIGS. 11 to 24 which are flowcharts of routines (i.e., programs) executed by the CPU 71 of the ECU 70.

Figure 11:
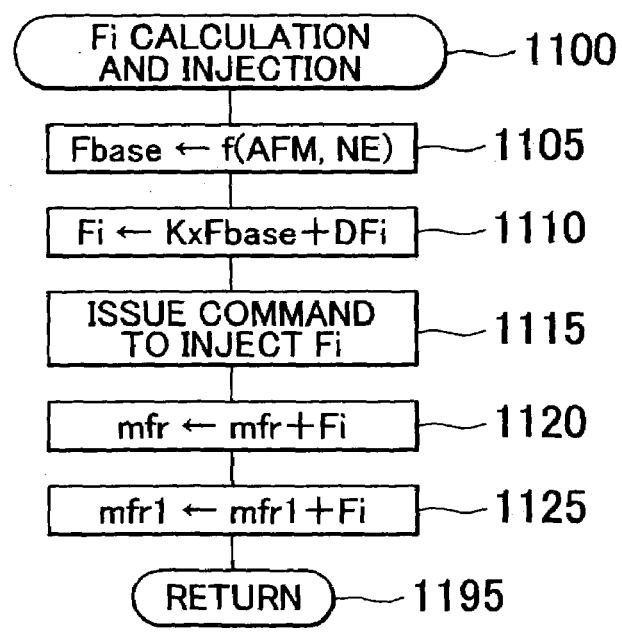
FIG. 11 is a flowchart showing a routine for calculating a fuel injection quantity, which is executed by a CPU shown in FIG. 1.

The CPU 71 repeatedly executes a routine for calculating the final fuel injection quantity Fi shown in FIG. 11 and issuing a command for a fuel injection every time the crank angle for each cylinder becomes a predetermined crank angle prior to top dead center on each intake stroke (e.g., a crank angle of BTDC 90 degrees). Accordingly, when the crank angle for an arbitrary cylinder becomes the predetermined crank angle, the CPU 71 starts the routine at step 1100 and proceeds to step 1105, where a base fuel injection quantity Fbase for making the air-fuel ratio of the internal combustion engine the stoichiometric air-fuel ratio is obtained from a map based on the intake air quantity AFM, measured by the air flow meter 61, and the engine speed NE.

Next, the CPU 71 proceeds on to step 1110, where the value of an air-fuel ratio feedback correction quantity DFi, to be described later, is added to the product of a coefficient K multiplied by the base fuel injection quantity Fbase is set as the final fuel injection quantity Fi. The value of this coefficient K is normally "1.00", but is set to a predetermined value other than "1.00" when the air-fuel ratio is forcibly changed in order to calculate the overall maximum storable amount of oxygen Cmax1all of the entire first catalyst 53 and the overall maximum storable amount of oxygen Cmax2all of the entire second catalyst 54.

Next, the CPU 71 proceeds on to step 1115, where the CPU 71 issues a command to the fuel injector 39 to inject fuel of the final fuel injection quantity Fi. Then, the CPU 71 proceeds on to step 1120, where it sets the sum of the final fuel injection quantity Fi and the fuel injection quantity value mfr at that time as the new fuel injection quantity sum value mfr. Then, the CPU 71 proceeds on to step 1125, where it sets the value of the final fuel injection quantity Fi and the fuel injection quantity sum mfr1 at that time as the new fuel injection quantity sum value mfr1. The fuel injection quantity sum value mfr and the fuel injection quantity sum value mfr1 are used when calculating the amount of stored oxygen, which will be described later, and the like. The CPU 71 then proceeds on to step 1195 where the routine ends. In this way, fuel of the final fuel injection quantity Fi that has been corrected by feedback is injected into the cylinder at the beginning of the intake stroke.

Next, the calculation for the air-fuel ratio feedback correction quantity DFi will be described. The CPU 71 repeatedly executes the routine shown in FIG. 12 at predetermined constant intervals of time. Accordingly, at a predetermined timing, the CPU 71 starts the routine with step S1200 and proceeds on to step 1205, where it is determined whether feedback control conditions have been fulfilled. The air-fuel ratio feedback control conditions are fulfilled when, for example, (i) the coolant temperature THW of the internal combustion engine is equal to, or greater than, a first predetermined temperature, (ii) an intake air quantity (load) per one rotation of the crankshaft is equal to, or less than, a predetermined value, (iii) the exhaust side upstream air-fuel ratio sensor 66 is operating normally, and (iv) the value of a flag XHAN indicating that control for obtaining the overall maximum storable amount of oxygen is currently being performed is "0". Hereinafter, this flag XHAN, to be described later, will be referred to as "control flag XHAN". When the value of the control flag XHAN is "1", it indicates that air-fuel ratio control is being performed to forcibly change the air-fuel ratio in order to calculate the overall maximum storable amount of oxygen. Hereinafter, this air-fuel ratio control will be referred to as "maximum amount obtaining control". When the value of the control flag XHAN is "0", it indicates that air-fuel ratio control to calculate the overall maximum storable amount of oxygen is not being performed.

When the air-fuel ratio feedback control conditions are fulfilled, the CPU 71 makes a "YES" determination in step 1205 and proceeds on to step S1210, where it obtains the current exhaust side upstream control air-fuel ratio abyfs of the first catalyst 53 by converting the sum of the current output vabyfs of the exhaust side upstream air-fuel ratio sensor 66 and an overall maximum storable amount of oxygen correction quantity vafsfb, to be described later, (i.e., by converting vabyfs+vafsfb) based on the map shown in FIG. 3.

Next, the CPU 71 proceeds on to step 1215, where it obtains an in-cylinder fuel supply quantity Fc (k–N) before an N stroke from the current point by dividing an in-cylinder intake air quantity Mc (k–N), which is the intake air quantity of a cylinder at the beginning of the intake stroke before the N stroke (an "N"th intake stroke) from the current point, by the obtained exhaust side upstream control air-fuel ratio abyfs. The value N is a value that differs depending on factors such as the displacement of the internal combustion engine and the distance from the combustion chamber 25 to the exhaust side upstream air-fuel ratio sensor 66.

In this way, the in-cylinder intake air quantity Mc (k−N) before the N stroke from the current point is divided by the exhaust side upstream control air-fuel ratio abyfs in order to obtain the in-cylinder fuel supply quantity Fc (k−N) before the N stroke from the current point because it takes time corresponding to the N stroke until the air-fuel mixture burned in the combustion chamber 25 reaches the exhaust side upstream air-fuel ratio sensor 66. The in-cylinder intake air quantity Mc is obtained for each intake stroke of each cylinder based on the current output AFM of the airflow meter 61 and the engine speed NE at that time (e.g., obtained by dividing the value used in a first order lag process in the output AFM of the airflow meter 61 by the engine speed NE), and stored in the RAM 73 for each intake stroke.

Next, the CPU 71 proceeds on to step 1220, where it obtains a target in-cylinder fuel supply quantity Fcr (k−N) before the N stroke from the current point by dividing the in-cylinder intake air quantity Mc (k−N) before the N stroke from the current point by a target air-fuel ratio abyfr (k−N) (the stoichiometric air-fuel ratio, in this example) at a point before the N stroke from the current point. Then, the CPU 71 proceeds on to step 1225, where it sets the difference of the target in-cylinder fuel supply quantity Fcr (k−N) minus the in-cylinder fuel supply quantity Fc (k−N) as an in-cylinder fuel supply quantity difference DFc. That is, the in-cylinder fuel supply quantity difference DFc is a value indicative of the amount of surplus or shortage of fuel supplied to the cylinder at the time before the N stroke. Next, the CPU 71 proceeds on to step 1230, where it obtains the air-fuel ratio feedback correction quantity DFi based on Expression 21 below.

$$DFi=(Gp \times DFc + Gi \times SDFc) \times KFB \qquad \text{[Expression 21]}$$

In Expression 21 above, Gp is a preset proportional gain and Gi is a preset integral gain. It is preferable that the coefficient KFB in Expression 21 be able to change depending on the engine speed NE and the in-cylinder intake air quantity Mc and the like, but in this explanation it will be made "1". Also, the value SDFc is an integral value of the in-cylinder fuel supply quantity difference DFc, and is updated in the next step, step 1235. That is, in step 1235 the CPU 71 obtains a new integral value SDFc of the in-cylinder fuel supply quantity difference by adding the in-cylinder fuel supply quantity difference DFc obtained in step 1225 to the integral value SDFc of the in-cylinder fuel supply quantity difference DFc at that time. Then the routine ends in step S1295.

Accordingly, the air-fuel ratio feedback correction quantity DFi is obtained by proportional integral control, and this air-fuel ratio feedback correction quantity DFi is reflected in the fuel injection quantity by steps 1110 and 1115 in FIG. 11, so as to compensate for the surplus or shortage in the fuel supply quantity before the N stroke so the mean value of the air-fuel ratio is made to be substantially the same as the target air-fuel ratio abyfr.

On the other hand, if the air-fuel ratio feedback control conditions are not fulfilled when the determination is made in step 1205, the CPU makes a "NO" determination in step 1205 and proceeds on to step 1240, where it sets the air-fuel ratio feedback correction quantity DFi to "0". The CPU 71 then proceeds on to step 1295 and the routine ends. In this way, when the air-fuel ratio feedback control conditions are not fulfilled (also including when the maximum amount obtaining control is being performed), the air-fuel ratio feedback correction quantity DFi is set to "0", regardless of the output vabyfs of the exhaust side upstream air-fuel ratio sensor exhaust side upstream air-fuel ratio sensor 66 or the overall maximum storable amount of oxygen correction quantity vafsfb, so that the air-fuel ratio (i.e., the fuel injection ratio) is not corrected. Accordingly, feedback control of the air-fuel ratio according to the total amount of oxygen stored OSA1all of the entire first catalyst 53 is effectively stopped.

Next, correction of the total amount of oxygen stored OSA1all will be described. This total amount of oxygen stored OSA1all is used to obtain the control amount vafsfb (i.e., the overall maximum storable amount of oxygen correction quantity) for making the total amount of oxygen stored OSA1all of the entire first catalyst 53 the same as the target amount of oxygen stored in the first catalyst OSAall-ref. The CPU 71 executes the routine shown in FIG. 13 at predetermined intervals of time. Accordingly, at a predetermined timing, the CPU 71 starts the routine with step 1300 and proceeds on to step 1305, where it obtains a difference in the total amount of oxygen stored DOSA1all by subtracting the target amount of oxygen stored in the first catalyst OSA1allref from the total amount of oxygen stored OSA1all of the entire first catalyst 53. The method for obtaining the total amount of oxygen stored OSA1all and setting and changing of the target amount of oxygen stored in the first catalyst OSA1allref will be described later. Next, the CPU 71 proceeds on to step 1310, where it obtains the overall maximum storable amount of oxygen correction quantity vafsfb based on Expression 22 below.

$$vafsfb=Kp \times DOSA1all + Ki \times SDOSA1all \qquad \text{[Expression 22]}$$

In Expression 22 above, Kp is a preset proportional gain and Ki is a preset integral gain. Also, SDOSA1all is an integral value of the difference in the total amount of oxygen stored DOSA1all, and is updated in the next step, step 1315. That is, the CPU 71 proceeds on to step 1315, where it obtains a new integral value SDOSA1all of the difference in the total amount of oxygen stored by adding the difference in the total amount of oxygen stored DOSA1all obtained in step 1310 and the integral value SDOSA1all of the difference in the total amount of oxygen stored at that point. The CPU 71 then proceeds on to step 1395 where the routine ends.

Figure 12:
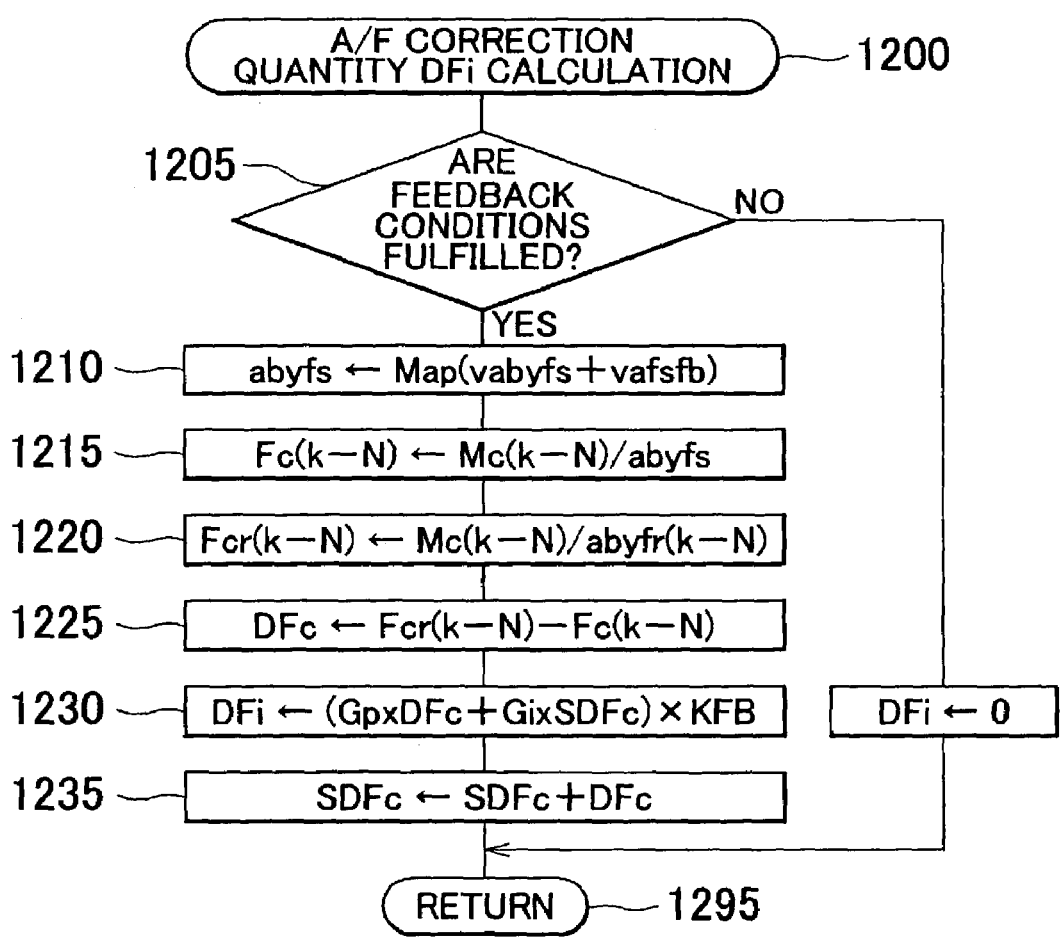
FIG. 12 is a flowchart showing a routine for calculating an air-fuel ratio feedback correction quantity, which is executed by the CPU shown in FIG. 1.

In this way the overall maximum storable amount of oxygen correction quantity vafsfb is obtained and added to the actual output of the exhaust side upstream air-fuel ratio sensor 66 in step 1210 in FIG. 12. That sum (i.e., vabyfs+vafsfb) is then converted into the exhaust side upstream control air-fuel ratio abyfs based on the map shown in FIG. 3. In other words, the exhaust side upstream control air-fuel ratio abyfs used in executing the air-fuel ratio control to maintain the total amount of oxygen stored OSA1all of the entire first catalyst 53 at the target amount of oxygen stored in the first catalyst OSA1allref is obtained as an air-fuel ratio that differs from the air-fuel ratio that is actually detected by the exhaust side upstream air-fuel ratio sensor 66 by an amount that corresponds to the overall maximum storable amount of oxygen correction quantity vafsfb. As a result, the in-cylinder fuel supply quantity Fc (k−N) calculated in step 1215 in FIG. 12 changes according to the total amount of oxygen stored OSA1all, so the air-fuel ratio feedback correction quantity DFi changes according to the total amount of oxygen stored OSA1all in steps 1225 and 1230. That is, the air-fuel ratio of the internal combustion engine is controlled so that the calculated total amount of oxygen stored OSA1all becomes equal to the target amount of oxygen stored in the first catalyst OSA1allref.

For example, when the calculated total amount of oxygen stored OSA1all of the entire first catalyst 53 is larger than the target amount of oxygen stored in the first catalyst OSA1allref, the difference in the total amount of oxygen stored DOSA1all obtained in step 1305 is a positive value. As a result, the overall maximum storable amount of oxygen correction quantity vafsfb obtained in step 1310 is a positive value. Accordingly, the abyfs obtained in step 1210 is obtained as a leaner value (i.e., a larger value) than the air-fuel ratio actually detected by the exhaust side upstream air-fuel ratio sensor 66. Therefore, the in-cylinder fuel supply quantity Fc (k–N) obtained in step 1215 becomes a small value so the in-cylinder fuel supply quantity difference DFc is obtained as a large value. As a result, the air-fuel ratio feedback correction quantity DFi is a large positive value, so the final fuel injection quantity Fi obtained in step 1110 in FIG. 11 becomes larger than the base fuel injection quantity Fbase. Accordingly, the air-fuel ratio of the internal combustion engine becomes rich so the total amount of oxygen stored OSA1all of the entire first catalyst 53 decreases.

Conversely, when the calculated total amount of oxygen stored OSA1all of the entire first catalyst 53 is smaller than the target amount of oxygen stored in the first catalyst OSA1allref, the difference in the total amount of oxygen stored DOSA1all obtained in step 1305 is a negative value. As a result, the overall maximum storable amount of oxygen correction quantity vafsfb obtained in step 1310 is a negative value. Accordingly, the abyfs obtained in step 1210 is obtained as a richer value (i.e., a smaller value) than the air-fuel ratio actually detected by the exhaust side upstream air-fuel ratio sensor 66. Therefore, the in-cylinder fuel supply quantity Fc (k–N) obtained in step 1215 becomes a relatively large value so the in-cylinder fuel supply quantity difference DFc is obtained as a negative value, so the air-fuel ratio feedback correction quantity DFi is also a negative value. As a result, the final fuel injection quantity Fi obtained in step 1110 in FIG. 11 becomes smaller than the base fuel injection quantity Fbase. Accordingly, the air-fuel ratio of the internal combustion engine becomes lean so the total amount of oxygen stored OSA1all of the entire first catalyst 53 increases.

Next, the control for obtaining the overall maximum storable amount of oxygen (i.e., the maximum amount obtaining control) for forcibly changing the air-fuel ratio in order to calculate the maximum storable amount of oxygen will be described. The CPU 71 executes each of the routines shown in the flowcharts of FIGS. 14 to 20 at predetermined intervals of time.

Accordingly, at a predetermined timing, the CPU 71 starts the routine with step 1400 and proceeds on to step 1405, where it determines whether the value of the control flag XHAN (i.e., flag XHAN indicating that control for obtaining the overall maximum storable amount of oxygen is currently being performed) is "0". When control for obtaining the overall maximum storable amount of oxygen is not currently being performed and the air-fuel ratio feedback control conditions have not been fulfilled, the value of the control flag XHAN is "0". Accordingly the CPU 71 makes a "YES" determination in step 1405, after which it proceeds on to step 1410, where it sets the coefficient K used in the step 1110 in FIG. 11, described earlier, to "1.00".

Next, the CPU 71 determines in step 1415 whether the determining conditions for starting the maximum amount obtaining control have been fulfilled. The determining conditions for starting the maximum amount obtaining control are fulfilled when the coolant temperature THW is equal to, or greater than, a predetermined temperature, the vehicle speed obtained by a vehicle sensor, not shown, is equal to, or greater than, a predetermined high vehicle speed, an amount of change in the throttle value opening amount TA per unit of time is equal to, or less than, a predetermined amount, and the internal combustion engine is in a steady running state. To these conditions may further be added any one or more of the following conditions: a predetermined period of time or longer has passed since the time the last maximum amount obtaining control ended; the vehicle has been driven a predetermined distance or more since the last maximum amount obtaining control ended; the internal combustion engine 10 has been run a predetermined period of time or longer since the time the last maximum amount obtaining control ended. At this stage, because the determining conditions for starting the maximum amount obtaining control have not been fulfilled, the CPU 71 makes a determination of "NO" in step 1415, after which it proceeds on to step 1495 where the routine ends.

Figure 9:
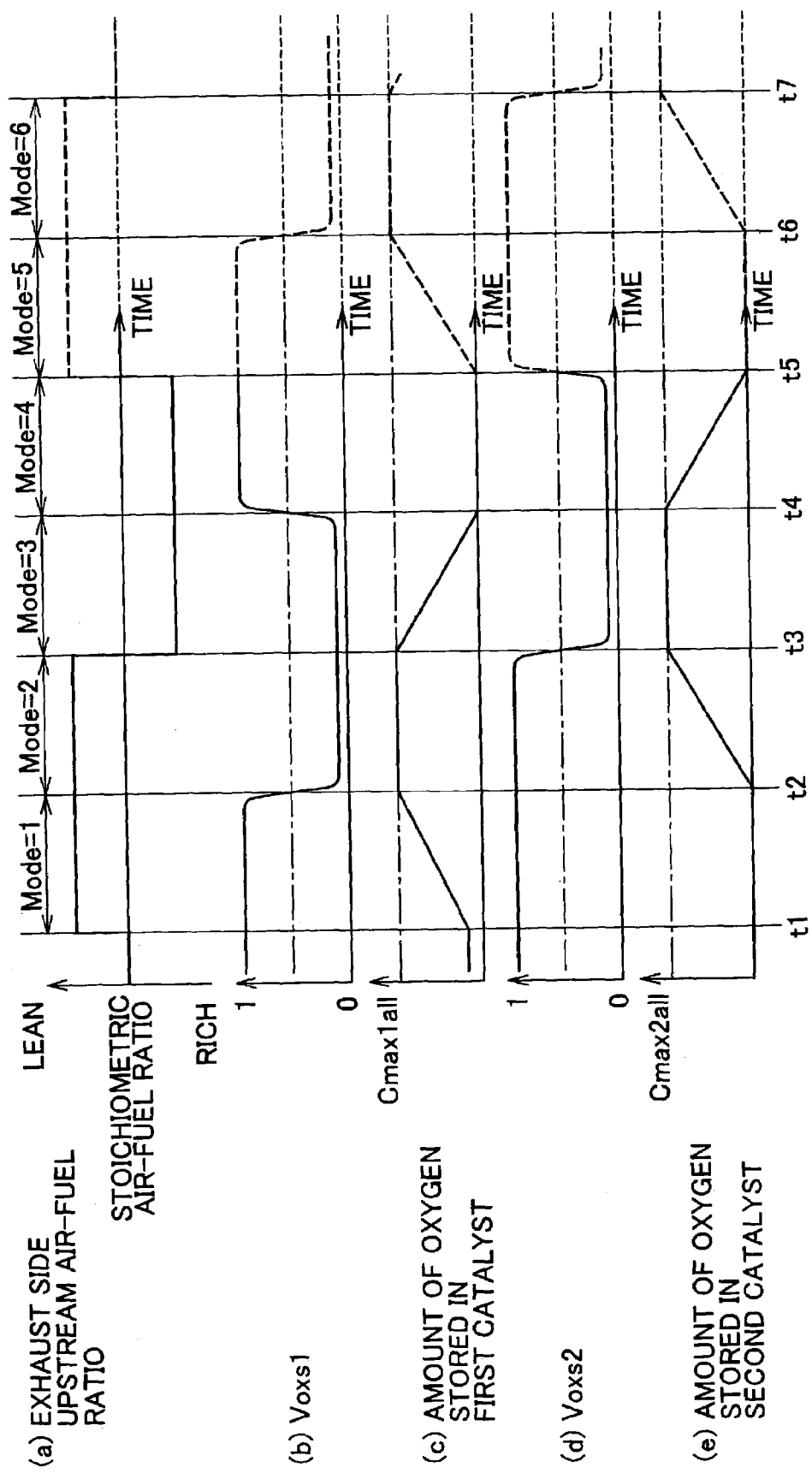
FIG. 9 is a time chart showing changes in the air-fuel ratio upstream of the first catalyst, the output from each of the air-fuel ratio sensors, and the amount of stored oxygen in each catalyst when the maximum storable amount of oxygen of each catalyst is obtained by the exhaust gas control apparatus shown in FIG. 1.

Next, when the maximum amount obtaining control is not currently being performed at this point, as shown at time t1 in FIG. 9 described above, but the determining conditions for starting the maximum amount obtaining control have been fulfilled, the CPU 71 makes a determination of "YES" in step 1405 and proceeds on to step 1410, where it sets the value of the coefficient K to "1.00" in step 1410. Then, because the determining conditions for starting the maximum amount obtaining control are fulfilled, the CPU 71 makes a determination of "YES" in step 1415 and proceeds on to step 1420, where it sets the value of the control flag XHAN to "1".

Then the CPU 71 proceeds on to step 1425, where it sets the value of the mode to "1" in order to shift the mode to the first mode. The CPU 71 then sets the value of the coefficient K to 0.98 in step 1430 and then proceeds on to step 1495 where the routine ends. Accordingly, because the air-fuel ratio feedback control conditions are no longer fulfilled, the CPU 71 makes a determination of "NO" in step 1205 and proceeds on to step 1240, where it sets the value of the air-fuel ratio feedback correction quantity DFi to "0". As a result, by executing the process in step 1110 in FIG. 11, a value which is 0.98 times the base fuel injection quantity Fbase is calculated as the final fuel injection quantity Fi, and fuel of this final fuel injection quantity Fi is then injected so the air-fuel ratio of the internal combustion engine is controlled to be leaner, by a predetermined amount, than the stoichiometric air-fuel ratio.

Figure 14:
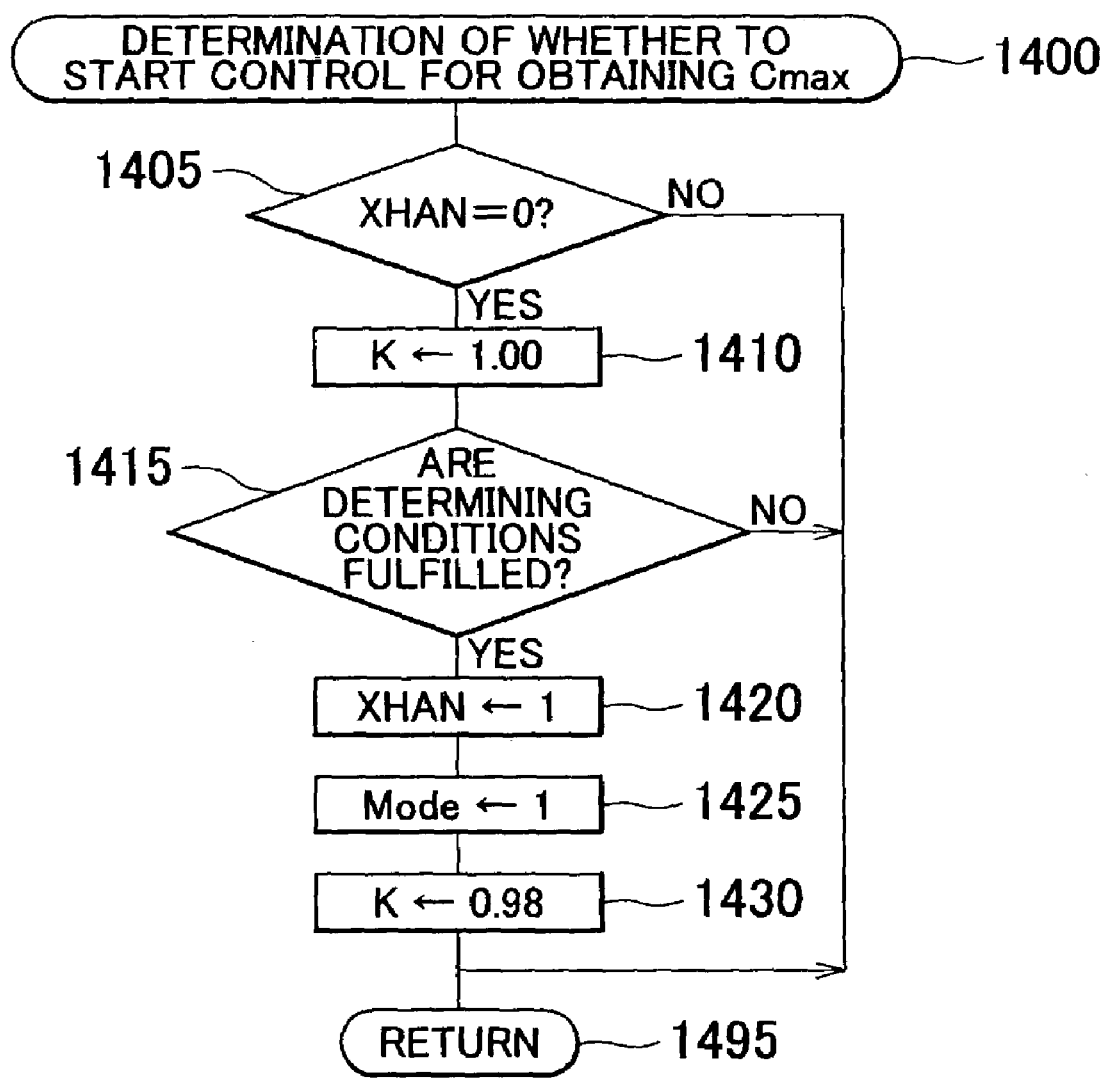
FIG. 14 is a flowchart showing a routine for determining whether to start control for obtaining the maximum storable amount of oxygen, which is executed by the CPU shown in FIG. 1.

Thereafter, the CPU 71 repeatedly executes the processes in the routine in FIG. 14 from step 1400, but because the value of the control flag XHAN is "1", the CPU 71 makes a "NO" determination in step 1405 and proceeds directly to step 1495 where the routine ends.

Figure 15:
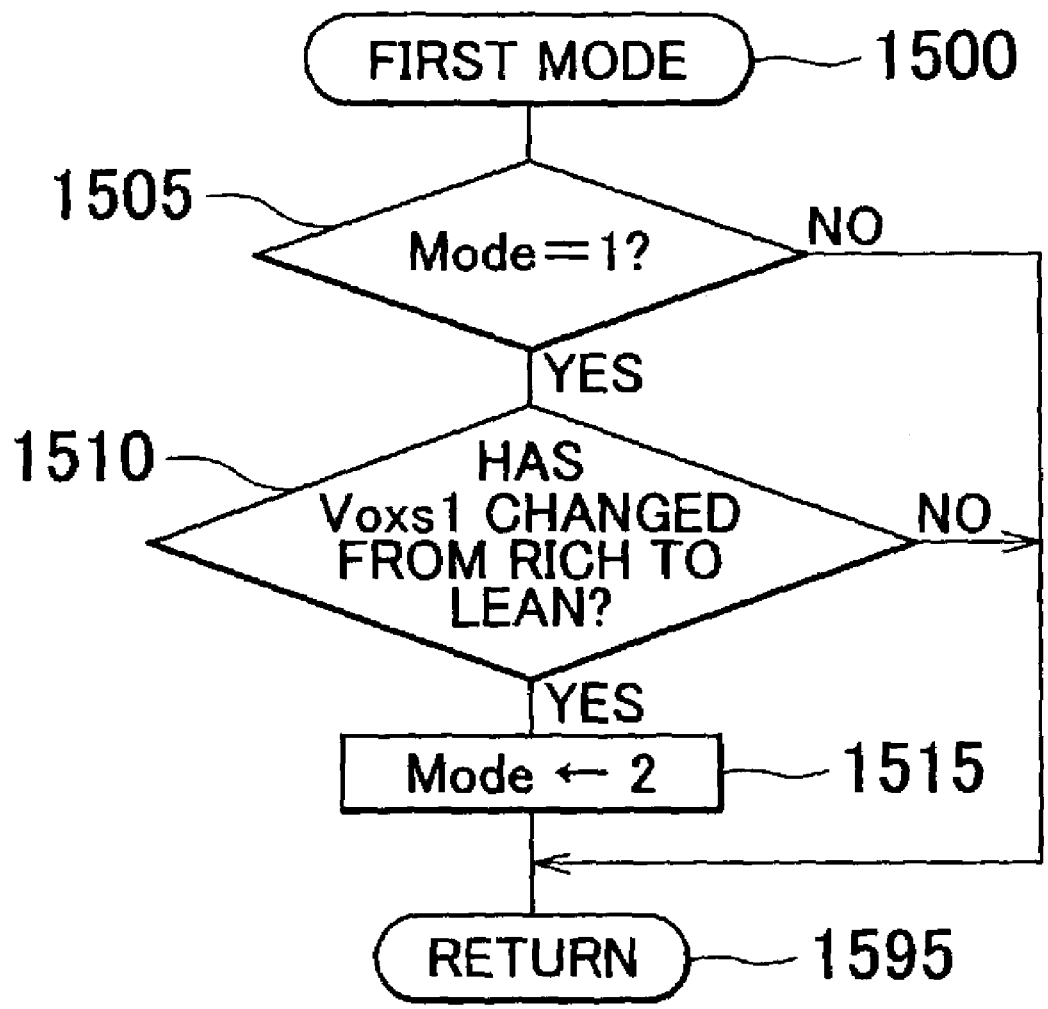
FIG. 15 is a flowchart showing a routine of a first mode, which is executed by the CPU shown in FIG. 1.
Figure 16:
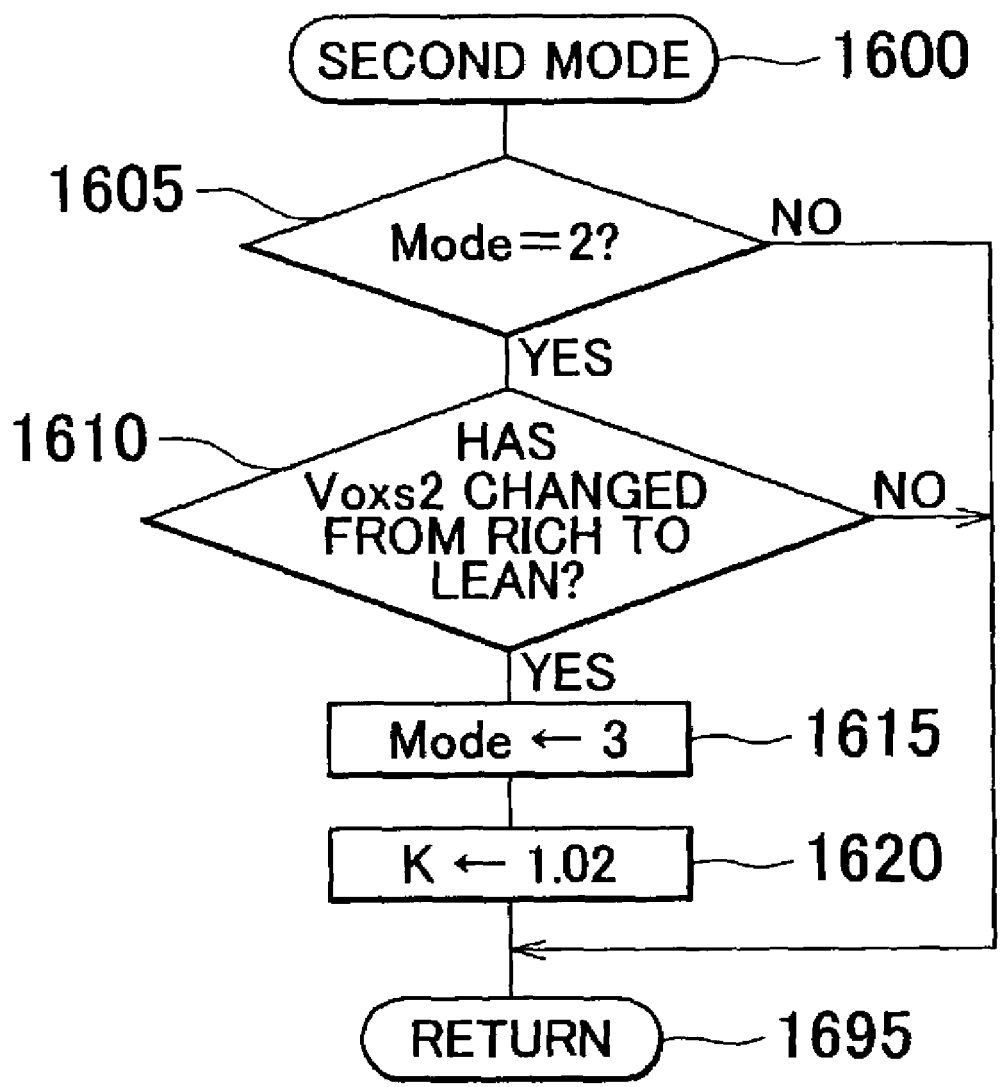
FIG. 16 is a flowchart showing a routine of a second mode, which is executed by the CPU shown in FIG. 1.

Meanwhile, the CPU 71 repeatedly executes the first mode control routine shown in FIG. 15 at predetermined intervals of time. Accordingly, at a predetermined timing, the CPU 71 starts the routine from step 1500 and proceeds onto step 1505, where it determines whether the value of the mode is "1". In this case, because the value of the mode became "1" from the process in step 1425 in FIG. 14, the CPU 71 makes a determination of "YES" in step 1505 and proceeds on to step 1510, where it determines whether the output Voxs1 of the exhaust side midstream air-fuel ratio sensor 67 has changed from a value indicating an air-fuel ratio that is richer than the stoichiometric air-fuel ratio to a value indicating an air-fuel ratio that is leaner than the stoichiometric air-fuel ratio. At this point, because the air-fuel ratio of the internal combustion engine has just changed to the predetermined lean air-fuel ratio, the output Voxs1 from the exhaust side midstream air-fuel ratio sensor 67 indicates a richer air-fuel ratio than the stoichiometric air-fuel ratio. Accordingly, the CPU 71 makes a determination of "NO" in step 1510 and proceeds on to step 1595 where the routine ends.

Thereafter, the CPU 71 repeatedly executes steps 1500 to 1510. Also, because the air-fuel ratio is maintained at a predetermined lean air-fuel ratio, when a predetermined period of time has elapsed, the output Voxs1 from the exhaust side midstream air-fuel ratio sensor 67 changes from a rich value to a lean value, as shown at time t2 in FIG. 9. As a result, the CPU 71 proceeds on to step 1510, where it makes a determination of "YES". The CPU 71 then proceeds on to step 1515, where it sets the value of the mode to "2", after which it proceeds on to step 1595 where the routine ends.

As a result, the value of the coefficient K is maintained at 0.98, so by executing the process in step 1110 in FIG. 11, the value which is 0.98 times the base fuel injection quantity Fbase is maintained and calculated as the final fuel injection quantity Fi. Fuel of this final fuel injection quantity Fi is then injected so the air-fuel ratio of the internal combustion engine is controlled to the predetermined lean air-fuel ratio following the first mode.

In the second mode (i.e., Mode=2), the CPU 71 executes similar mode control and successively switches the mode from the third mode to the fourth mode, while executing the control according to each mode. Described simply, in the second mode, the routine of which is shown by the flowchart in FIG. 16, after step 1600, the CPU 71 determines in step 1605 whether the value of the mode is "2". If the value of the mode is "2", the CPU 71 moves on from step 1605 to step 1610, where it monitors whether the output Voxs2 from the exhaust side downstream air-fuel ratio sensor 68 has changed from a value indicating a richer air-fuel ratio than the stoichiometric air-fuel ratio to a value indicating a leaner air-fuel ratio than the stoichiometric air-fuel ratio.

Then, when the output Voxs2 from the exhaust side downstream air-fuel ratio sensor 68 has changed from a value indicating a richer air-fuel ratio than the stoichiometric air-fuel ratio to a value indicating a leaner air-fuel ratio than the stoichiometric air-fuel ratio, as shown at time t3 in FIG. 9, the CPU 71 proceeds on to step 1615, where it sets the value of the mode, which should be shifted to the third mode, to "3". Continuing, the CPU 71 sets the value of the coefficient K to "1.02" in step 1620. As a result, the air-fuel ratio of the internal combustion engine is controlled to an air-fuel ratio that is richer, by a predetermined amount, than the stoichiometric air-fuel ratio. The routine ends at step 1695.

Figure 17:
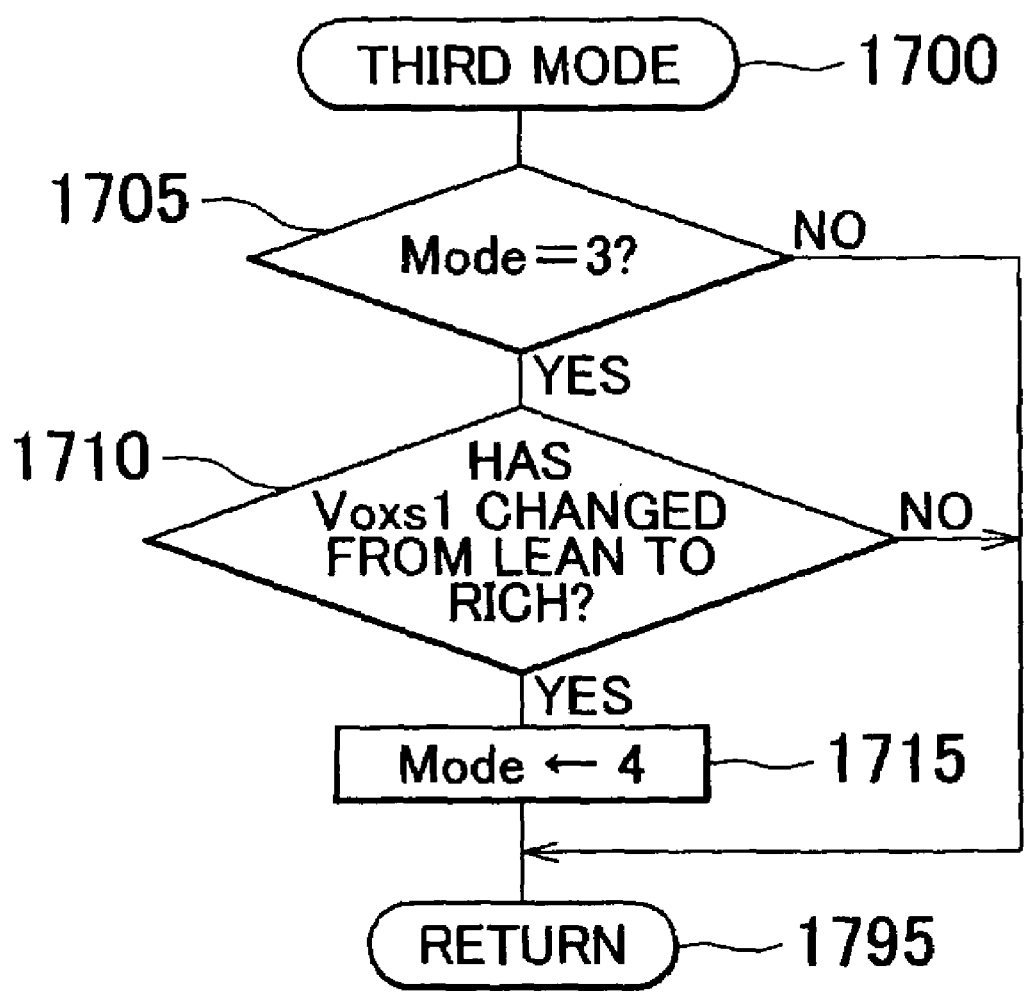
FIG. 17 is a flowchart showing a routine of a third mode, which is executed by the CPU shown in FIG. 1.

Similarly, in the third mode, the routine of which starts at step 1700 and is shown by the flowchart in FIG. 17, the CPU 71 determines in step 1705 whether the value of the mode is "3". If the value of the mode is "3", the CPU 71 proceeds from step 1705 to step 1710, where it monitors whether the output Voxs1 from the exhaust side midstream air-fuel ratio sensor 67 has changed from a value indicating a leaner air-fuel ratio than the stoichiometric air-fuel ratio to a value indicating a richer air-fuel ratio than the stoichiometric air-fuel ratio.

Then, when the output Voxs1 from the exhaust side midstream air-fuel ratio sensor 67 has changed from a value indicating a leaner air-fuel ratio than the stoichiometric air-fuel ratio to a value indicating a richer air-fuel ratio than the stoichiometric air-fuel ratio, as shown at time t4 in FIG. 9, the CPU 71 proceeds from step 1710 to step 1715, where it sets the value of the mode, which should be shifted to the fourth mode, to "4". As a result, the value of the coefficient K is maintained at "1.02" so air-fuel ratio of the internal combustion engine is controlled to an air-fuel ratio that is richer, by a predetermined amount, than the stoichiometric air-fuel ratio following the third mode. The routine ends at step 1795.

Figure 18:
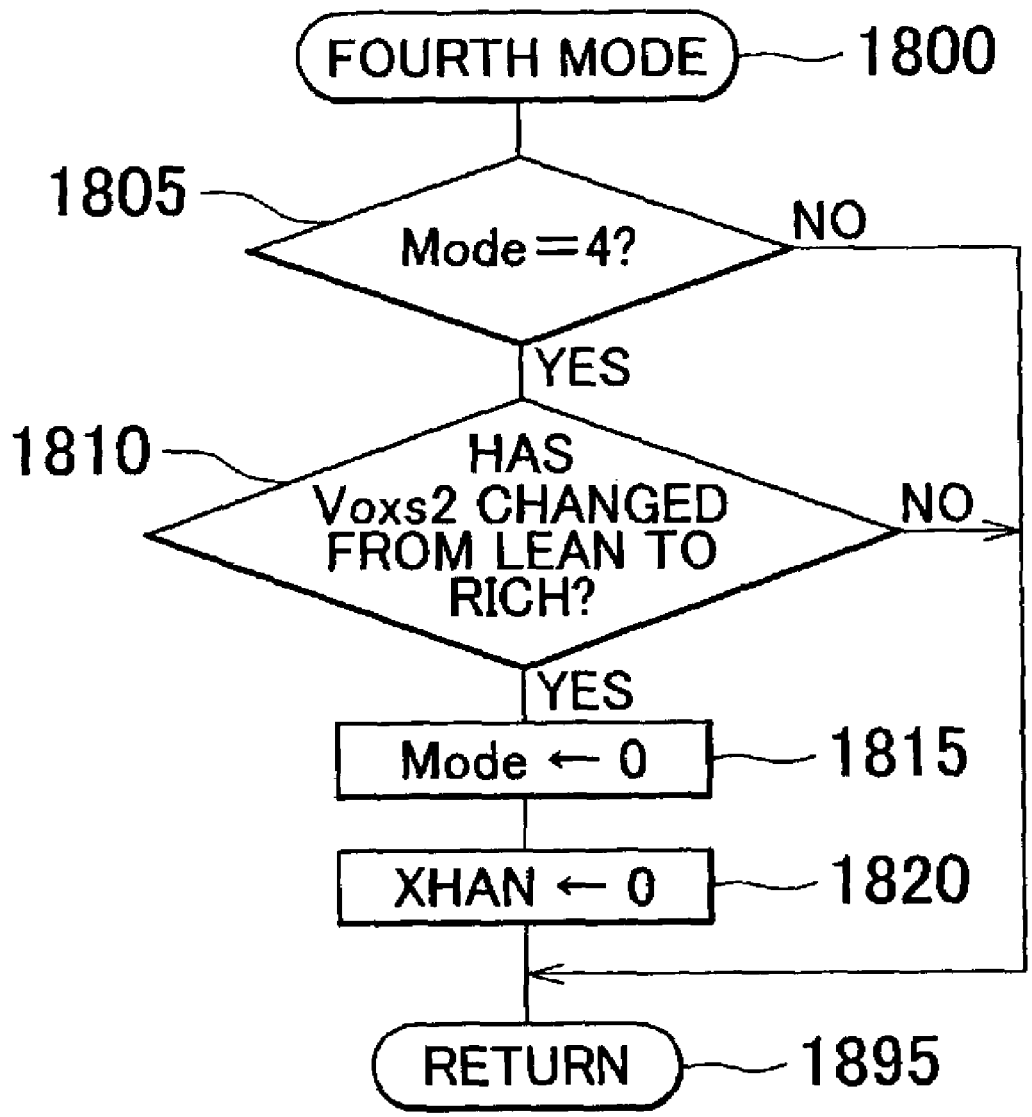
FIG. 18 is a flowchart showing a routine of a fourth mode, which is executed by the CPU shown in FIG. 1.

Similarly, in the fourth mode, the routine of which starts at step 1800, and is shown by the flowchart in FIG. 18, the CPU 71 determines in step 1805 whether the value of the mode is "4". If the value of the mode is "4", the CPU 71 proceeds from step 1805 to step 1810, where it monitors whether the output Voxs2 from the exhaust side downstream air-fuel ratio sensor 68 has changed from a value indicating a leaner air-fuel ratio than the stoichiometric air-fuel ratio to a value indicating a richer air-fuel ratio than the stoichiometric air-fuel ratio.

Then, when the output Voxs2 from the exhaust side downstream air-fuel ratio sensor 68 has changed from a value indicating a leaner air-fuel ratio than the stoichiometric air-fuel ratio to a value indicating a richer air-fuel ratio than the stoichiometric air-fuel ratio, as shown at time t5 in FIG. 9, the CPU 71 proceeds from step 1810 to step 1815, where it sets the value of the mode to "0" again. The CPU 71 then sets the control flag XHAN to "0" in step 1820, after which it proceeds on to step 1895 where the routine ends. As a result, when the CPU 71 executes the routine shown in FIG. 14, the determination in step 1405 is "YES" so the CPU 71 proceeds on to step 1410, where the value of the coefficient K is again set to "1.00". Also, if the air-fuel ratio feedback control conditions are fulfilled, the CPU 71 makes a determination of "YES" in step 1205 such that the air-fuel ratio feedback control based on the routines in FIGS. 12 and 13 is executed again.

As described above, if the determining conditions for starting the maximum amount obtaining control are fulfilled, the air-fuel ratio of the internal combustion engine is forcibly controlled once to become a predetermined lean air-fuel ratio and then forcibly controlled once to become a predetermined rich air-fuel ratio.

Next, the operations in calculating the amount of absorbed oxygen for obtaining the overall maximum storable amount of oxygen will be described. The CPU 71 executes the routine shown by the flowchart in FIG. 19 at predetermined intervals of time.

Figure 19:
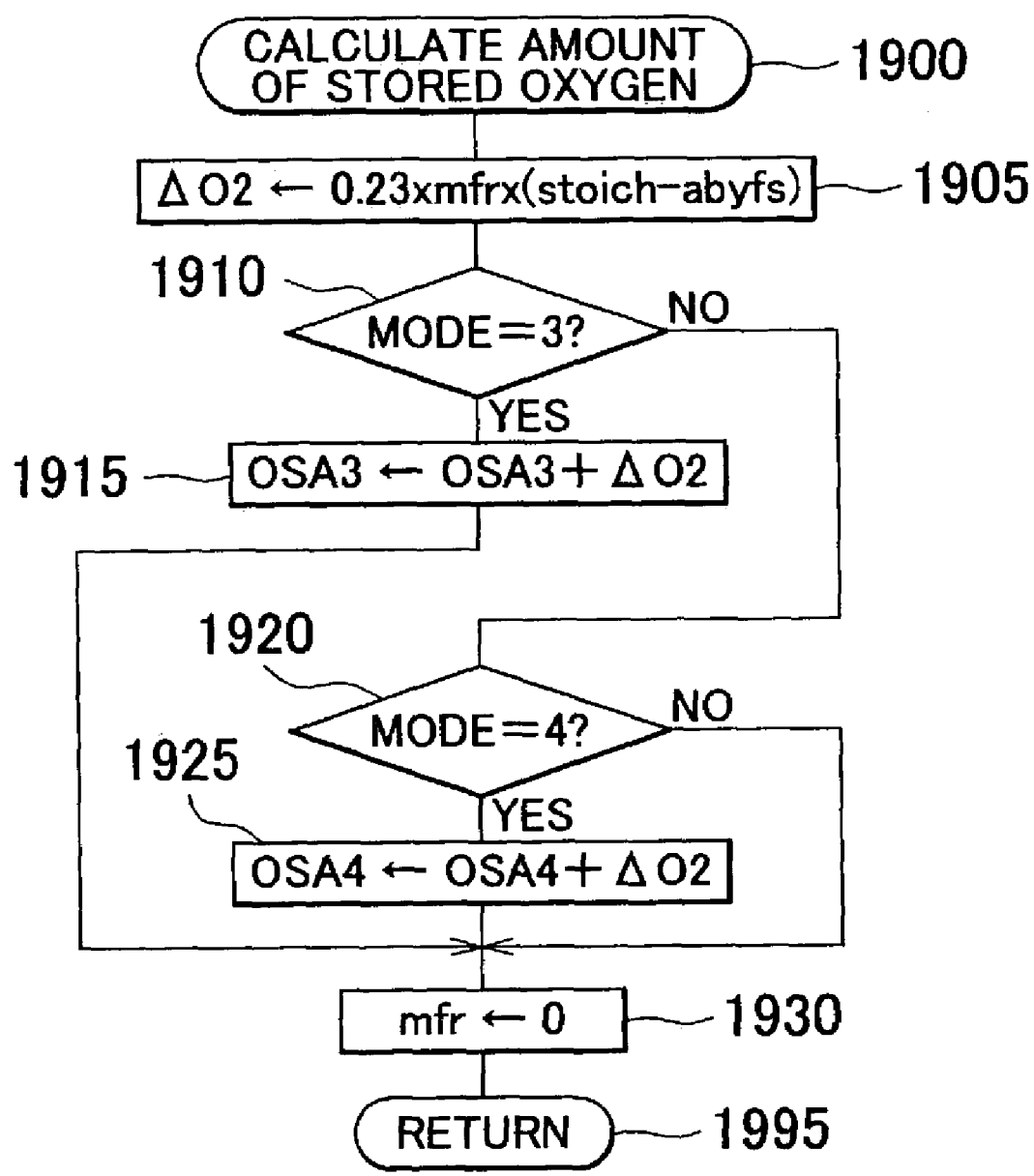
FIG. 19 is a flowchart showing a routine for calculating the amount of stored oxygen, which is executed by the CPU shown in FIG. 1.

Accordingly, at a predetermined timing, the CPU 71 starts the routine with step 1900 in FIG. 19 and proceeds on to step 1905, where it obtains the amount of change in the amount of oxygen stored $\Delta O2$ according to Expression 23 below.

$$\Delta O2 = 0.23 \times mfr \times (stoich - abyfs) \qquad [\text{Expression 23}]$$

Next, the CPU 71 determines in step 1910 whether the value of the mode is "3". If the value of the mode is "3", the CPU 71 makes a determination of "YES" in step 1910 and then proceeds on to step 1915, where it sets the sum of the amount of change in the amount of oxygen stored $\Delta O2$ and an amount of stored oxygen OSA3 of the third mode at that point, as the new amount of stored oxygen OSA3. The CPU 71 then proceeds on to step 1930.

These steps (i.e., steps 1900 to 1915) are repeated by the CPU 71 as long as the value of the mode is "3". As a result, in the third mode (i.e., Mode=3), in which the air-fuel ratio upstream of the first catalyst 53 is a predetermined rich air-fuel ratio, the amount of stored oxygen OSA3 of the first catalyst 53 is calculated. If the determination in step 1910 is "NO", however, the CPU 71 proceeds directly from step 1910 to step 1920.

In step 1920, the CPU 71 determines whether the value of the mode is "4". If the value of the mode is "4", the CPU 71 makes a determination of "YES" in step 1920 and proceeds on to step 1925, where it sets the sum of the amount of change in the amount of oxygen stored ΔO2 and an amount of stored oxygen OSA4 of the fourth mode at that point, as the new amount of stored oxygen OSA4. The CPU 71 then proceeds on to step 1930.

These steps (i.e., steps 1900, 1905, 1910, 1920, 1925) are repeated by the CPU 71 as long as the value of the mode is "4". As a result, in the fourth mode (i.e., Mode=4), in which the air-fuel ratio upstream of the first catalyst 53 is a predetermined rich air-fuel ratio, the amount of stored oxygen OSA4 of the second catalyst 54 is calculated. When the determination in step 1920 is "NO", however, the CPU 71 proceeds directly from step 1920 to step 1930.

In step 1930, the CPU 71 sets the sum mfr of the final fuel injection quantity Fi to "0" and then proceeds on to step 1995 where the routine ends.

Next, the operations in calculating the overall maximum storable amount of oxygen will be described. The CPU 71 executes the routine shown by the flowchart in FIG. 20 at predetermined intervals of time.

Figure 20:
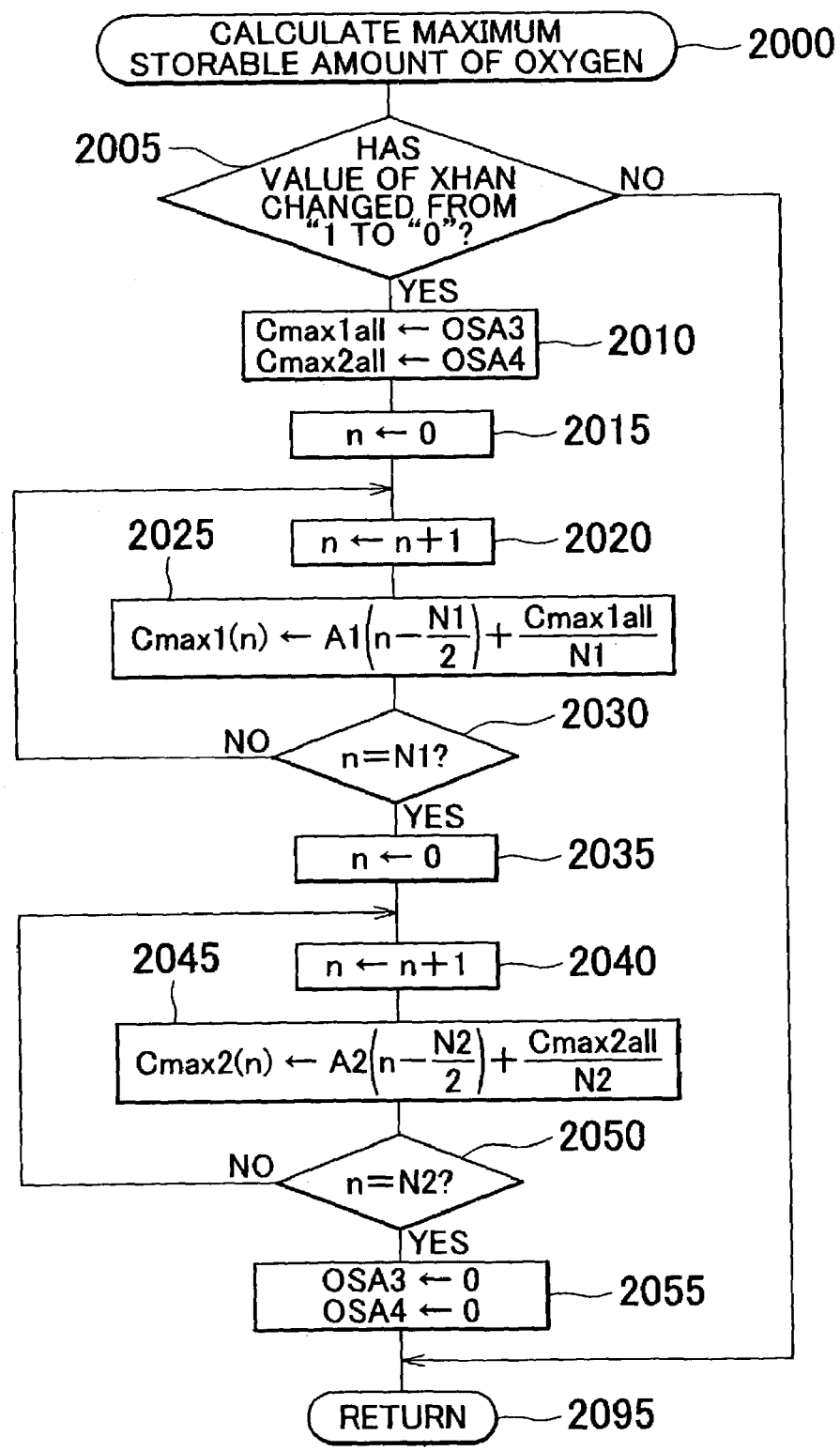
FIG. 20 is a flowchart showing a routine for calculating the maximum storable amount of oxygen, which is executed by the CPU shown in FIG. 1.

Accordingly, at a predetermined timing, the CPU 71 starts the routine with step 2000 in FIG. 20 and proceeds on to step 2005, where it monitors whether the value of the control flag XHAN has changed from "1" to "0". At this time, if the fourth mode has ended and the value of the control flag XHAN has been changed to "0" in step 1820 in FIG. 18 described above, the CPU 71 makes a determination of "YES" in step 2005 and proceeds on to step 2010. Here, unless the value of the control flag XHAN has changed to "0", the CPU 71 will proceed directly from step 2005 to step 2095 where the routine ends.

Now, assuming that the fourth mode has just ended, because the value of the control flag XHAN has just changed from "1" to "0", the CPU 71 proceeds from step 2005 to step 2010, where it stores the amount of stored oxygen OSA3 as the overall maximum storable amount of oxygen Cmax1all of the entire first catalyst 53 and stores the amount of stored oxygen OSA4 as the overall maximum storable amount of oxygen Cmax2all of the entire second catalyst 54. This step performs the functions of the first catalyst portion maximum oxygen storage amount obtaining means and the second catalyst portion maximum oxygen storage amount obtaining means.

Next, the CPU 71 proceeds on to step 2015, where it sets the value of a counter value n to "0", after which it proceeds on to step 2020, where it starts the process of calculating the maximum storable amount of oxygen in each block 1 of the first catalyst 53. First, the CPU 71 increases the counter value n by "1", thus setting it to "1" in step 2020. The CPU 71 then proceeds on to step 2025, where it calculates a maximum storable amount of oxygen Cmax1(n) in block 1(n) of the first catalyst 53 based on the value of the overall maximum storable amount of oxygen Cmax1all of the entire first catalyst 53 obtained in step 2010, the value of the counter value n, and the expression in step 2025 which is based on (the right side of) Expression 19. At this point, because the value of the counter value n is "1", the maximum storable amount of oxygen Cmax1(1) in the block 1(1) can be calculated.

Then, the CPU 71 proceeds on to step 2030, where it determines whether the value of the counter value n is equal to the number of blocks N1 of the first catalyst 53. At this point, because the value of the counter value n is "1", the CPU 71 makes a determination of "NO" in step 2030 and returns to step 2020, where it increases the value of the counter value n by "1", and then executes the processes in steps 2025 and 2030. That is, the processes in steps 2020 and 2025 are repeatedly executed until the value of the counter value n equals the number of blocks N1 of the first catalyst 53. Accordingly, the value of the maximum storable amount of oxygen Cmax1(n) of each block 1(n) is calculated sequentially from block 1(1) that is farthest upstream in the first catalyst 53 to block 1(N1) that is farthest downstream in the first catalyst 53.

When the value of the counter value n becomes equal to the number of blocks N1 of the first catalyst 53 by repeating the process in step 2020, the CPU 71 makes a determination of "YES" in step 2030 and proceeds on to step 2035, where it sets the value of the counter value n to "0". Then the CPU 71 proceeds on to step 2040, where it starts the process to calculate the maximum storable amount of oxygen of each block 2 of the second catalyst 54.

The process to calculate the maximum storable amount of oxygen of each block 2 in the second catalyst 54 is done by repeatedly executing the processes in steps 2040 to 2050, which are processes similar to those in steps 2020 to 2030 described above, for the total number of blocks N2 in the second catalyst 54. The calculation of the maximum storable amount of oxygen $Cmax2(n)$ in step 2045 is performed based on the value of the overall maximum storable amount of oxygen Cmax2all of the entire second catalyst 54 obtained in step 2010, the value of the counter value n, and the expression in step 2045 which is based on (the right side of) Expression 20. Accordingly, the value of the maximum storable amount of oxygen $Cmax2(n)$ of each block $2(n)$ is calculated sequentially from block 2(1) that is farthest upstream in the second catalyst 54 to block 2(N2) that is farthest downstream in the second catalyst 54.

When the value of the counter value n becomes equal to the number of blocks N2 in the second catalyst 54 by repeating the process in step 2040, the CPU 71 makes a determination of "YES" in step 2050 and proceeds on to step 2055, where it sets the values of both the amount of stored oxygen OSA3 and the amount of stored oxygen OSA4 to "0". Then the CPU 71 proceeds on to step 2095, where the routine ends.

Next, the operations in calculating the amount of outflowing oxygen and the amount of stored oxygen and the like for each block of the first and second catalysts 53 and 54, as well as the operations in calculating the target amount of oxygen stored in the first catalyst, will be described. The CPU 71 executes the routines shown in the series of flowcharts in FIGS. 21 to 24 in order from the routine in FIG. 21 at predetermined intervals of time.

Figure 21:
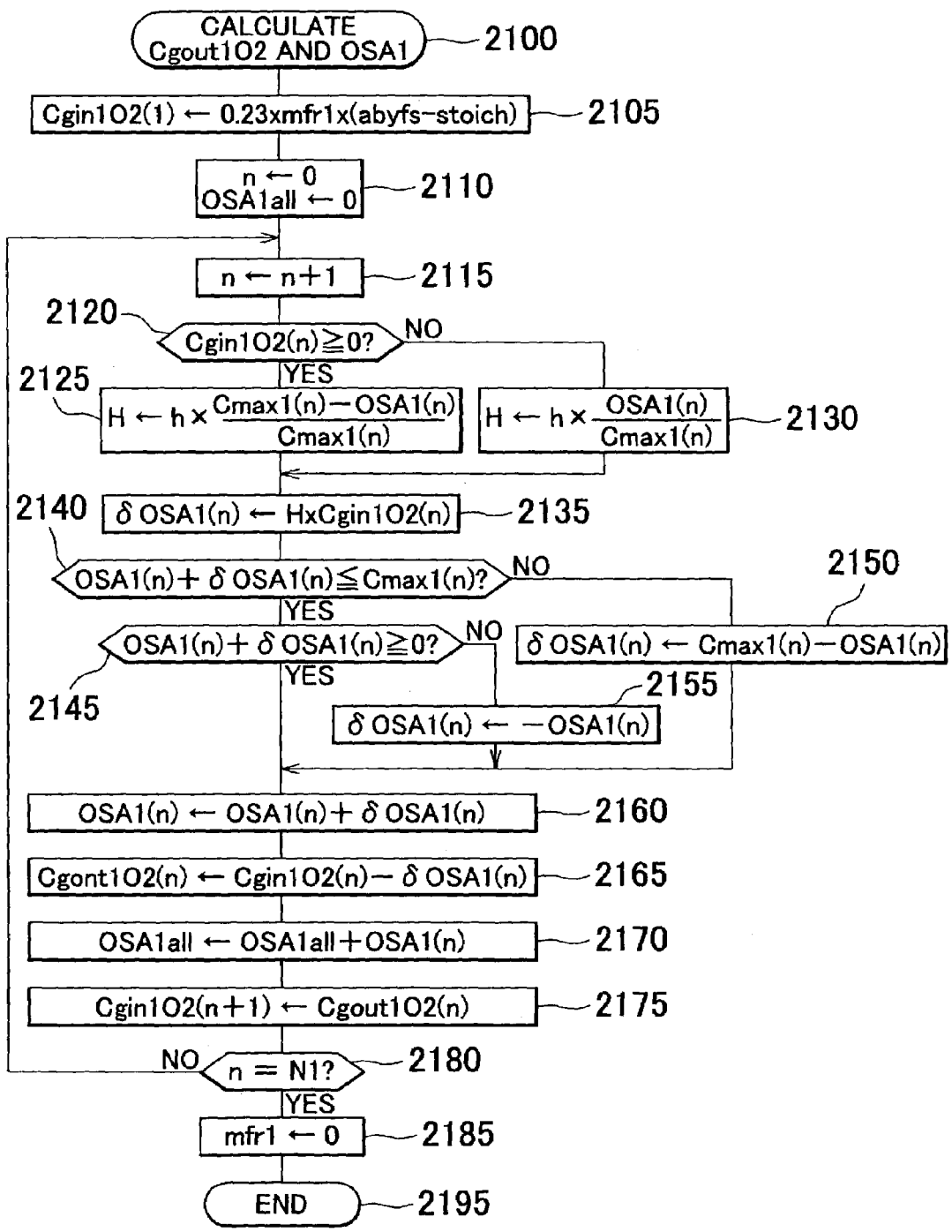
FIG. 21 is a flowchart showing a routine for calculating amounts of outflowing oxygen and amounts of stored oxygen and the like in each block of the first catalyst, which is executed by the CPU shown in FIG. 1.

Accordingly, at a predetermined timing, the CPU 71 starts the process from step 2100 in the routine shown in FIG. 21 for calculating the amount of outflowing oxygen and the amount of stored oxygen and the like for each block in the first catalyst 53. The CPU 71 then proceeds on to step 2105, where it calculates the amount of inflowing oxygen Cgin1O2(1) in the block 1(1) of the first catalyst 53 which is the boundary condition, as described above. This calculation is performed based on the fuel injection quantity sum value mfr1 that is successively updated in step 1125 in FIG. 11, the air-fuel ratio abyfs detected by the exhaust side upstream air-fuel ratio sensor 66, and the expression in step 2105 that is based on (the right side of) Expression 14.

Next, the CPU 71 proceeds to step 2110, where it sets both the value of the counter value n and the value of the total amount of oxygen stored OSA1all of the entire catalyst 53 to "0". The CPU 71 then proceeds on to step 2115, where it starts the process for calculating the amount of outflowing oxygen and the amount of stored oxygen and the like for each block 1 of the first catalyst 53. First, the CPU 71 increases the value of the counter value n by "1", thereby setting it to "1", in step 2115. The counter value n indicates the number of the block 1 of the first catalyst 53. Because the value of the counter value n is "1" at this point and the value of the counter value n is maintained at "1" in the processes in steps 2120 to 2175, the processes in these steps are performed at this time for the calculations for the block 1(1) that is farthest upstream.

First, the CPU 71 proceeds to step 2120, where it determines whether the value of the amount of inflowing oxygen Cgin1O2(1) is equal to, or greater than, "0". If the value of the amount of inflowing oxygen Cgin1O2(1) is equal to, or greater than, "0", the CPU 71 makes a determination of "YES" in step 2120 and proceeds on to step 2125, where it calculates a reaction rate H in the block 1(1). This calculation is performed based on the value of the maximum storable amount of oxygen Cmax1(1) of the block 1(1) calculated previously in step 2025 in FIG. 20, the value of the amount of stored oxygen OSA1(1) of the block 1(1) calculated (updated) when the routine was executed last in step 2160, to be described later, and the expression in step 2125 that is based on (the right side of) Expression 3.

Also, in the determination in step 2120, if the value of the amount of inflowing oxygen Cgin1O2(1) is not equal to, or greater than, "0", the determination in step 2120 is "NO" and the CPU 71 proceeds on to step 2130, where it calculates the reaction rate H in the block 1(1) based on the value of the maximum storable amount of oxygen Cmax1(1), the value of the amount of stored oxygen OSA1(1), and the expression in step 2130 that is based on (the right side of) Expression 5.

Next, the CPU 71 proceeds on to step 2135, where it calculates an amount of change in the amount of stored oxygen δOSA1(1) in the block 1 based on the value of the reaction rate H calculated in step 2125 or step 2130, the value of the amount of inflowing oxygen Cgin1O2(1) in the block 1(1) in the first catalyst 53, which was calculated in step 2105, and the expression in step 2135 that is based on (the right side of) Expression 2 or (the right side of) Expression 4.

Next, the CPU 71 proceeds on to step 2140, where it determines whether the sum of the value of the amount of stored oxygen OSA1(1) of the block 1(1) calculated when the routine was last executed in step 2160, to be described later, and the value of the amount of change in the amount of stored oxygen δOSA1(1) of the block 1(1) calculated this time in step 2135, is equal to, or less than, the value of the maximum storable amount of oxygen Cmax1(1) in the block 1(1).

Here, if that sum is equal to, or less than, the value of the maximum storable amount of oxygen Cmax1(1), the CPU 71 makes a determination of "YES" in step 2140 and proceeds on to step 2145, where it determines whether that sum is equal to, or greater than, "0". If that sum is equal to, or greater than, "0", the CPU 71 makes a determination of "YES" in step 2145 and proceeds on to step 2160, where it sets that sum as the new amount of stored oxygen OSA1(1). In this way, if the sum is equal to, or greater than, "0" and equal to, or less than, the maximum storable amount of oxygen Cmax1(1), the value of the amount of change in the amount of stored oxygen δOSA1(1) calculated in step 2135 is used as it is as the amount of change in the amount of oxygen stored in the block 1(1).

On the other hand, in the determination in step 2140, if that sum is greater than the value of the maximum storable amount of oxygen Cmax1(1), the CPU 71 makes a determination of "NO" in step 2140 and proceeds on to step 2150, where it stores the difference between the value of the maximum storable amount of oxygen Cmax1(1) and the value of the amount of stored oxygen OSA1(1) calculated the last time as the amount of change in the amount of stored oxygen δOSA1(1). The CPU 71 then proceeds on to step 2160. In this way, if that sum value exceeds the maximum storable amount of oxygen Cmax1(1) in the block 1(1), it means that the value of the amount of stored oxygen OSA1(1) in the block 1(1) calculated in step 2160 this time exceeds the maximum storable amount of oxygen Cmax1(1). Therefore, the amount of change in the amount of stored oxygen δOSA1(1) is adjusted so that the value of the amount of stored oxygen OSA1(1) calculated this time in step 2160 becomes equal to the value of the maximum storable amount of oxygen Cmax1.

Similarly, in the determination in step 2145, if the sum is less than "0" (i.e., a negative value), the CPU 71 makes a determination of "NO" in step 2145 and proceeds on to step 2155, where it stores a value having a sign that is the reverse of the sign of the value of the amount of stored oxygen OSA1(1) calculated the last time, as the amount of change in the amount of stored oxygen δOSA1(1). The CPU 71 then proceeds on to step 2160. In this way, if the sum is less than "0", it means that the value of the amount of stored oxygen OSA1(1) in the block 1(1) calculated in step 2160 is less than "0" (i.e., is a negative value). Therefore, the amount of change in the amount of stored oxygen δOSA1(1) is adjusted so that the value of the amount of stored oxygen OSA1(1) calculated this time in step 2160 becomes "0".

After calculating the amount of stored oxygen OSA1(1) this time in the block 1(1) in step 2160, the CPU 71 proceeds on to step 2165. In step 2165, the CPU 71 calculates the amount of outflowing oxygen Cgout1O2(1) in the block 1(1) based on the value of the amount of inflowing oxygen Cgin1O2(1) in the block 1(1) calculated in step 2105, the value of the amount of change in the amount of stored oxygen δOSA1(1) in the block 1(1) after the aforementioned adjustment, and the expression in step 2165 that is based on (the right side of) Expression 1.

Next, the CPU 71 proceeds on to step 2170, where it stores the sum of the value of the total amount of oxygen stored OSA1all of the entire first catalyst 53 at the current point (at the current point, it is "0" from the execution of the process in step 2110) and the value of the amount of stored oxygen OSA1(1) of this time in the block 1(1) calculated in step 2160, as the new total amount of stored oxygen OSA1(1) of the entire first catalyst 53. Then the CPU 71 proceeds on to step 2175, where it calculates the amount of inflowing oxygen Cgin1O2(2) in block 1(2) on the downstream side, adjacent to the block 1(1) based on the value of the amount of outflowing oxygen Cgout1O2(1) in the block 1(1) calculated in step 2165 and Expression 7.

Then, the CPU 71 proceeds on to step 2180, where it determines whether the value of the counter value n is equal to the number of blocks N1 in the first catalyst 53. Because the value of the counter value n is "1" at the current point, the CPU 71 makes a determination of "NO" in step 2180 and returns again to step 2115, where it increases the value of the counter value n by "1" so that it is set to "2". Then, the CPU 71 performs the calculations in the block 1(2), which is the next block, by performing the processes in steps 2120 to 2175. At this time, the value of the amount of inflowing oxygen Cgin1O2(2) calculated previously in step 2175 is used as the value of the amount of inflowing oxygen Cgin1O2(2) in step 2165.

In this way, the processes in steps 2120 to 2175 are repeatedly executed until the value of the counter value n equals the number of blocks N1 in the first catalyst 53. As a result, the values of the amount of inflowing oxygen Cgin1O2(n), the amount of outflowing oxygen Cgout1O2(n), the amount of change in the amount of stored oxygen δOSA1(n), and the amount of stored oxygen OSA1(n) of each block 1(n), from the block 1(1) that is farthest upstream in the first catalyst 53 to the block 1(N1) that is farthest downstream in the first catalyst 53, are calculated successively. Also, by repeatedly executing the process in step 2170, the total amount of oxygen stored OSA1all of the entire first catalyst 53 is also calculated. Here, step 2170 functions as a first catalyst portion obtained value obtaining means.

When the value of the counter value n becomes equal to the number of blocks N1 of the first catalyst 53 by repeating the process in step 2115, the CPU 71 makes a determination of "YES" in step 2180 and proceeds on to step 2185, where it sets the value of the fuel injection quantity sum value mfr1 to "0". Then, the CPU 71 proceeds through step 2195 on to step 2200 in the routine for calculating the amount of outflowing oxygen and the amount of stored oxygen and the like for each block 2 in the second catalyst 54, shown in FIG. 22.

Figure 22:
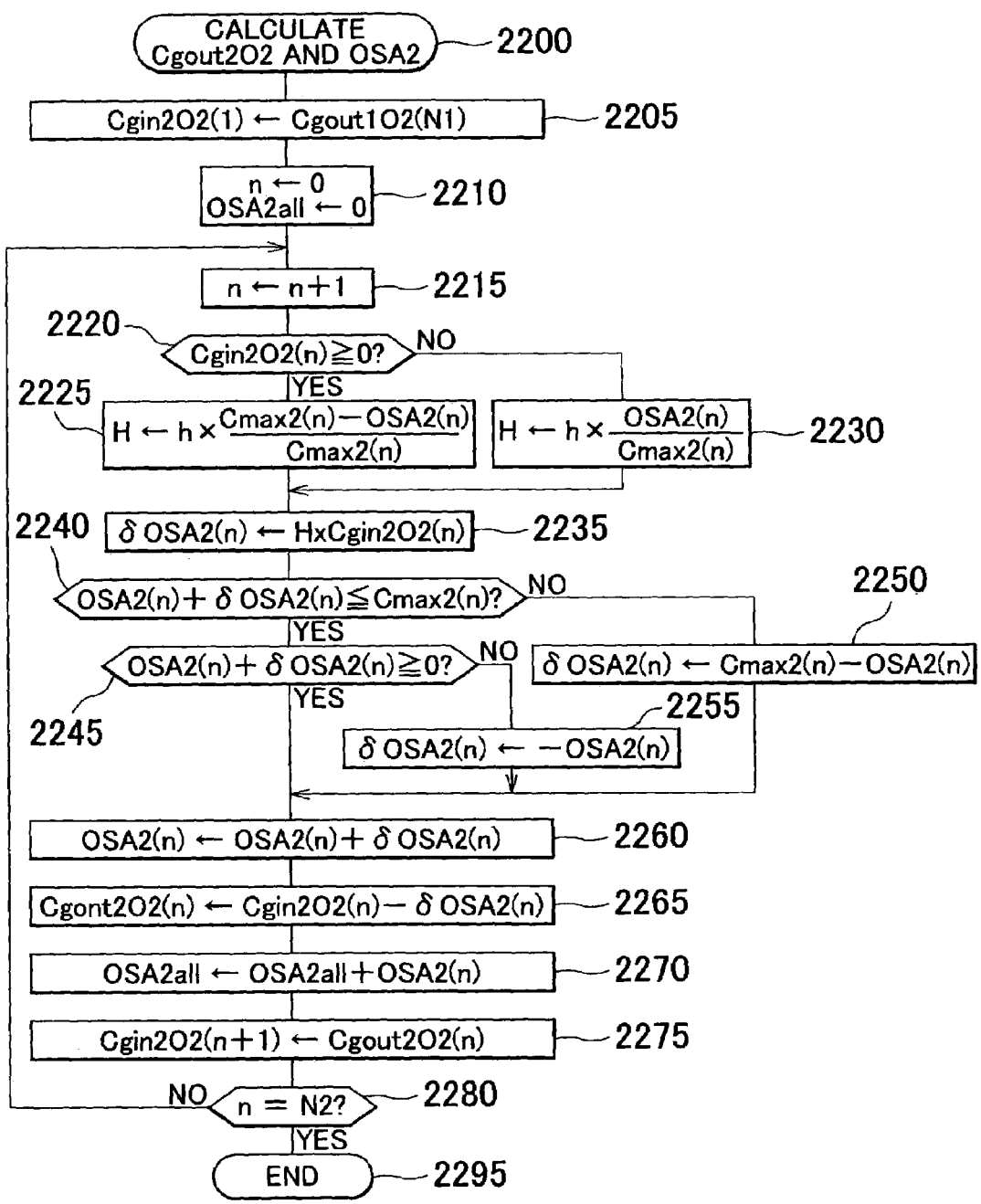
FIG. 22 is a flowchart showing a routine for calculating amounts of outflowing oxygen and amounts of stored oxygen and the like in each block of the second catalyst, which is executed by the CPU shown in FIG. 1.

The routine in FIG. 22 is similar to the routine in FIG. 21 except that in step 2205 the amount of outflowing oxygen Cgout1O2(N1) in the block 1(N1) that is farthest downstream in the first catalyst 53, which has already been calculated in step 2165 in FIG. 21, is used as the amount of inflowing oxygen Cgin2O2(1) in the block 2(1) of the second catalyst 54, which is the boundary condition. Therefore, a detailed description of the routine in FIG. 22 will be omitted. Step 2270 functions as a second catalyst portion obtained value obtaining means.

Figure 23:
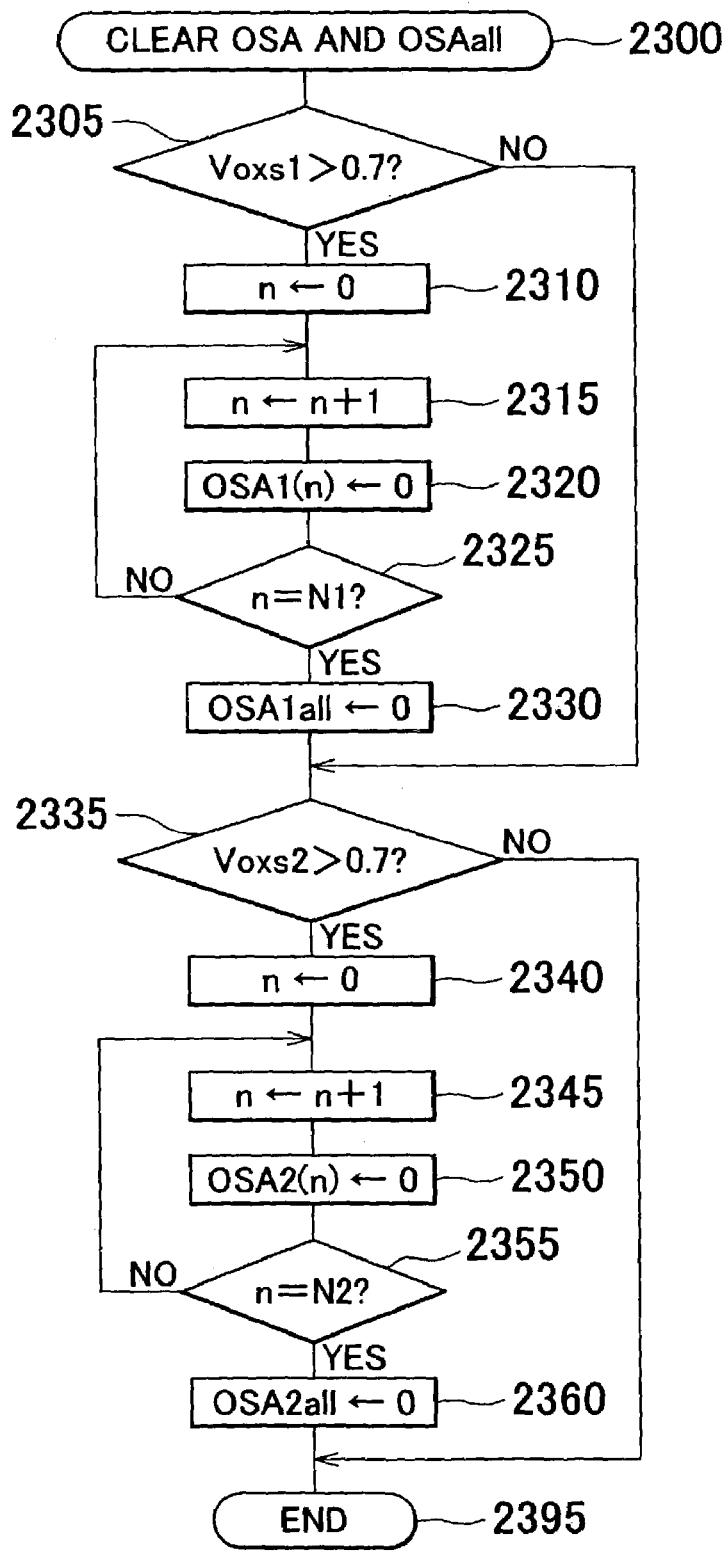
FIG. 23 is a flowchart showing a routine for clearing the amounts of stored oxygen in each block of the first and second catalysts, which is executed by the CPU shown in FIG. 1.

Next, the CPU 71 proceeds through step 2295 in FIG. 22 on to step 2300 in the routine for initializing (i.e., clearing) the value of the amount of oxygen stored in each block of the first and second catalysts 53 and 54 shown in FIG. 23, together with the value of the overall amount of oxygen stored in the entire first catalyst 53 and the value of the overall amount of oxygen stored in the entire second catalyst 54.

Next, the CPU 71 proceeds on to step 2305, where it monitors whether the value of the output Voxs1 of the exhaust side midstream air-fuel ratio sensor 67 is greater than 0.7(V). At this time, if the value of the output Voxs1 of the exhaust side midstream air-fuel ratio sensor 67 is greater than 0.7(V), i.e., if the air-fuel ratio downstream of the first catalyst 53 is rich, it means that the amount of oxygen stored in the entire first catalyst 53 is "0". Therefore, the CPU 71 proceeds on to step 2310, where it starts a process to set both the value of the amount of stored oxygen in each block 1 of the first catalyst 53 and value of the total amount of oxygen stored in the entire first catalyst 53 to "0".

On the other hand, in the determination in step 2305, if the value of the output Voxs1 of the exhaust side midstream air-fuel ratio sensor 67 is equal to, or less than, 0.7(V), the CPU 71 proceeds directly from step 2305 to step 2335, where it starts the process on the second catalyst 54 side.

Now, in the determination in step 2305, if the value of the output Voxs1 of the exhaust side midstream air-fuel ratio sensor 67 is greater than 0.7(V), the CPU 71 proceeds directly to step 2310, where it sets the value of the counter value n to "0". The CPU 71 then proceeds on to step 2315, where it increases the value of the counter value n by "1" so as to set that counter value n to "1". Next, the CPU 71 proceeds on to step 2320, where it sets the value of the amount of stored oxygen OSA1(n) in the block 1(n) of the first catalyst 53 to "0". At this point, because the value of the counter value n is "1", the value of the amount of stored oxygen OSA1(n) in the block 1(1) that is farthest upstream is set to "0".

Then, the CPU 71 proceeds on to step 2325, where it determines whether the value of the counter value n is equal to the number of blocks N1 in the first catalyst 53. At this point, because the counter value n is set to "1", the CPU 71 makes a determination of "NO" in step 2325 and returns to step 2315, where it increases the value of the counter value n by "1" again. Then the CPU 71 executes the processes in steps 2320 and 2325. That is, the processes in steps 2320 and 2325 are repeatedly executed until the value of the counter value n becomes equal to the number of blocks N1 of the first catalyst 53. As a result, the value of the amount of stored oxygen OSA1(n) in each block 1(n), from the block 1(1) that is farthest upstream in the first catalyst 53 to the block 1(N1) that is farthest downstream in the first catalyst 53, is cleared to "0".

When the value of the counter value n equals the number of blocks N1 in the first catalyst 53 by repeating the process in step 2315, the CPU 71 makes a determination of "YES" in step 2325 and proceeds on to step 2330, where it sets the value of the total amount of oxygen stored OSA1all of the entire first catalyst 53 to "0". Then the CPU 71 proceeds on to step 2335, where it starts the process on the second catalyst 54 side.

The process on the second catalyst 54 side is performed by executing the processes in steps 2335 to 2360, which are similar to the processes in steps 2305 to 2330 described above. As a result, the value of the amount of stored oxygen OSA2(n) in each block 2(n), from the block 2(1) that is farthest upstream in the second catalyst 54 to the block 2(N2) that is farthest downstream in the second catalyst 54, is cleared to "0". When the process on the second catalyst 54 side ends, the CPU 71 proceeds through step 2395 to step 2400 in the routine for calculating the target oxygen storage amount of the first catalyst 53 shown in FIG. 24.

Next, the CPU 71 proceeds on to step 2405, where it determines whether the value of the total amount of oxygen stored OSA2all of the entire second catalyst 54 calculated in step 2270 in FIG. 22 is equal to, or less than, the product of the coefficient α1 (e.g., 0.7) multiplied by the value of the total amount of oxygen stored OSA2all of the entire second catalyst 54 calculated in step 2010 in FIG. 20. When the determination in step 2405 is "YES", the CPU 71 proceeds on to step 2410, where it determines whether the value of the total amount of oxygen stored OSA2all of the entire second catalyst 54 is equal to, or greater than, the product of the coefficient β1 (e.g., 0.3) multiplied by the value of the overall maximum storable amount of oxygen Cmax2all of the entire second catalyst 54. When the determination in step 2410 is "YES", the CPU 71 proceeds on to step 2415, where it sets the product of the coefficient C (0.5) multiplied by the value of the overall maximum storable amount of oxygen Cmax1all of the entire first catalyst 53 calculated in step 2010 in FIG. 20 as the target oxygen storage amount OSA1allref of the first catalyst 53.

On the other hand, when the determination is "NO" in step 2405, the CPU 71 proceeds on to step 2420, where it sets the product of the coefficient A (0.3) multiplied by the value of the overall maximum storable amount of oxygen Cmax1all of the entire first catalyst 53 calculated in step 2010 in FIG. 20 as the target oxygen storage amount OSA1allref of the first catalyst 53.

Also, if the determination is "NO" in step 2410, the CPU 71 proceeds on to step 2425, where it sets the product of the coefficient B (0.7) multiplied by the value of the overall maximum storable amount of oxygen Cmax1all of the entire first catalyst 53 calculated in step 2010 in FIG. 20, as the target oxygen storage amount OSA1allref of the first catalyst 53. Then after setting the target oxygen storage amount OSA1allref of the first catalyst 53, the CPU 71 proceeds on to step 2495 where the series of routines shown in FIGS. 21 to 24 ends. The routine shown in FIG. 24 functions as a target value changing means.

In this way, under normal conditions when the value of the total amount of oxygen stored OSA2all of the second catalyst 54 is a value that is equal to, or greater than, the coefficient $\beta 1$ times the value of the total amount of oxygen stored OSA2all of the second catalyst 54 and equal to, or less than, the coefficient $\alpha 1$ times the value of the total amount of oxygen stored OSA2all of the second catalyst 54 (i.e., is a value that is within a predetermined range that includes a value which is half the value of the overall maximum storable amount of oxygen Cmax2all), the value of the target oxygen storage amount OSA1allref of the entire first catalyst 53 is set to a value that is half the value of the overall maximum storable amount of oxygen Cmax1all of the first catalyst 53, as shown by time t0 to t1 in FIG. 8 described above. Also, when the value of the total amount of oxygen stored OSA2all of the entire second catalyst 54 exceeds the product of the coefficient $\alpha 1$ multiplied by the value of the overall maximum storable amount of oxygen Cmax2all of the entire second catalyst 54, the value of the target oxygen storage amount OSA1allref of the entire first catalyst 53 is set to a value that is smaller, by a predetermined amount, than a value that is half the value of the overall maximum storable amount of oxygen Cmax1all of the first catalyst 53, as shown by time t1 to t2 in FIG. 8 described above. Further, when the value of the total amount of oxygen stored OSA2all of the entire second catalyst 54 is smaller than the product of the coefficient $\beta 1$ multiplied by the value of the overall maximum storable amount of oxygen Cmax2all of the entire second catalyst 54, the value of the target oxygen storage amount OSA1allref of the entire first catalyst 53 is set to a value that is larger, by a predetermined amount, than a value that is half the value of the overall maximum storable amount of oxygen Cmax1all of the first catalyst 53, as shown by time t3 to t4 in FIG. 8 described above.

Figure 13:
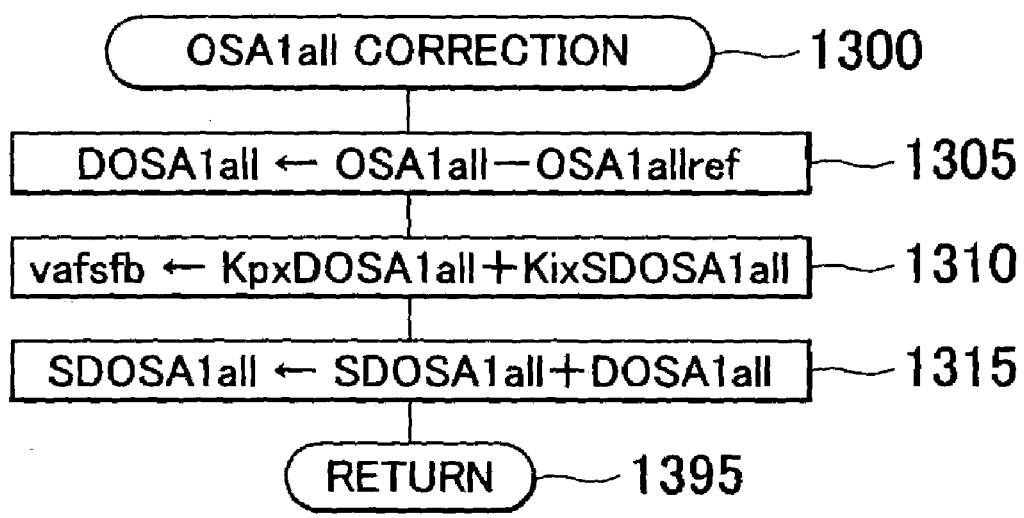
FIG. 13 is a flowchart showing a routine for calculating a correction quantity for the amount of stored oxygen, which is executed by the CPU shown in FIG. 1.

As a result, by executing the processes of the routines in FIGS. 11 to 13, the value of the air-fuel ratio feedback correction quantity DFi is successively adjusted such that the value of the total amount of oxygen stored OSA1all of the entire first catalyst 53 calculated in step 2170 in FIG. 21 comes closer to the value of the target oxygen storage amount OSA1allref of the entire first catalyst 53 selectively set as described above. In addition, fuel of the final fuel injection quantity Fi that corresponds to the adjusted air-fuel ratio feedback correction quantity DFi set in steps 1110 and 1115 in FIG. 11 is injected. In this way, the total amount of oxygen stored OSA1all of the entire first catalyst 53 is controlled by performing feedback control on the air-fuel ratio of the internal combustion engine.

As described above, according to the first exemplary embodiment of the invention, the value of the target oxygen storage amount OSA1allref of the entire first catalyst 53 is able to change immediately according to the change in the "total amount of oxygen stored OSA2all of the entire second catalyst 54" which indicates the state inside the second catalyst 54 obtained by calculation. As a result, even if the air-fuel ratio of the internal combustion engine changes abruptly, a delay is less apt to occur in the air-fuel ratio control of the internal combustion engine for controlling the total amount of oxygen stored OSA1all of the entire first catalyst 53, and the catalyst apparatus, when regarded as including both the first catalyst 53 and the second catalyst 54, is able to stably maintain both enough room for oxygen to be stored and enough oxygen so that some can be released. Accordingly, the catalyst apparatus is able to reliably purify harmful components such as unburned components and oxides of nitrogen.

Also, the target oxygen storage amount OSA1allref of the first catalyst 53 is set by changing the ratio of the target oxygen storage amount OSA1allref of the entire first catalyst 53 to the overall maximum storable amount of oxygen Cmax1all of the entire first catalyst 53, according to the ratio of the total amount of oxygen stored OSA2all of the entire second catalyst 54 to the total amount of oxygen stored OSA2all of the entire second catalyst 54. Accordingly, even if the degradation of the first and second catalysts 53 and 54 increases such that the overall maximum storable amounts of oxygen Cmax1all and Cmax2all decrease, it is possible to make the amount of room for oxygen to be stored equivalent to the amount of surplus oxygen that can be released in the catalyst apparatus when that catalyst apparatus is regarded as including both the first catalyst 53 and the second catalyst 54.

(Second Exemplary Embodiment)

Next, an exhaust gas control apparatus for an internal combustion engine according to a second exemplary embodiment of the invention will be described. The second exemplary embodiment is essentially the same as the foregoing first exemplary embodiment except for the method of setting the target oxygen storage amount OSA1allref of the first catalyst 53. Therefore, the description of the second exemplary embodiment will only deal with this method.

Figure 24:
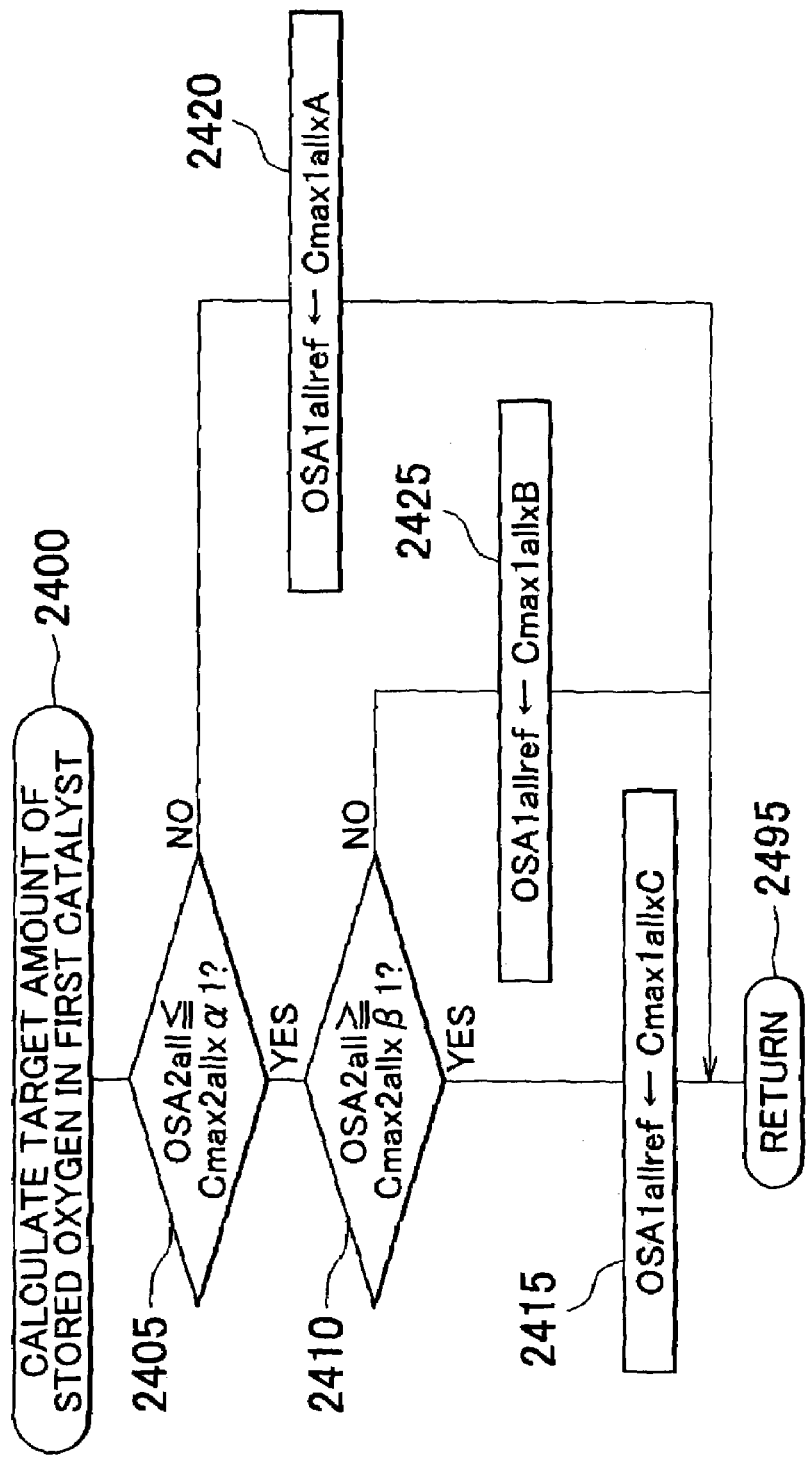
FIG. 24 is a flowchart showing a routine for calculating the target amount of oxygen stored in the first catalyst, which is executed by the CPU shown in FIG. 1.

In the first exemplary embodiment, the target oxygen storage amount OSA1allref of the entire first catalyst 53 is set by changing the ratio of the target oxygen storage amount OSA1allref of the entire first catalyst 53 to the overall maximum storable amount of oxygen Cmax1all of the entire first catalyst 53, according to the ratio of the total amount of oxygen stored OSA2all of the entire second catalyst 54 to the total amount of oxygen stored OSA2all of the entire second catalyst 54, as shown in FIG. 24. According to the second exemplary embodiment, however, the target oxygen storage amount OSA1allref of the entire first catalyst 53 is set by changing the ratio of the target oxygen storage amount OSA1allref of the entire first catalyst 53 to the overall maximum storable amount of oxygen Cmax1all of the entire first catalyst 53, according to the value of the amount of outflowing oxygen Cgout2O2(N2) flowing out from the block 2(N2) that is farthest downstream in the second catalyst 54.

Figure 25:
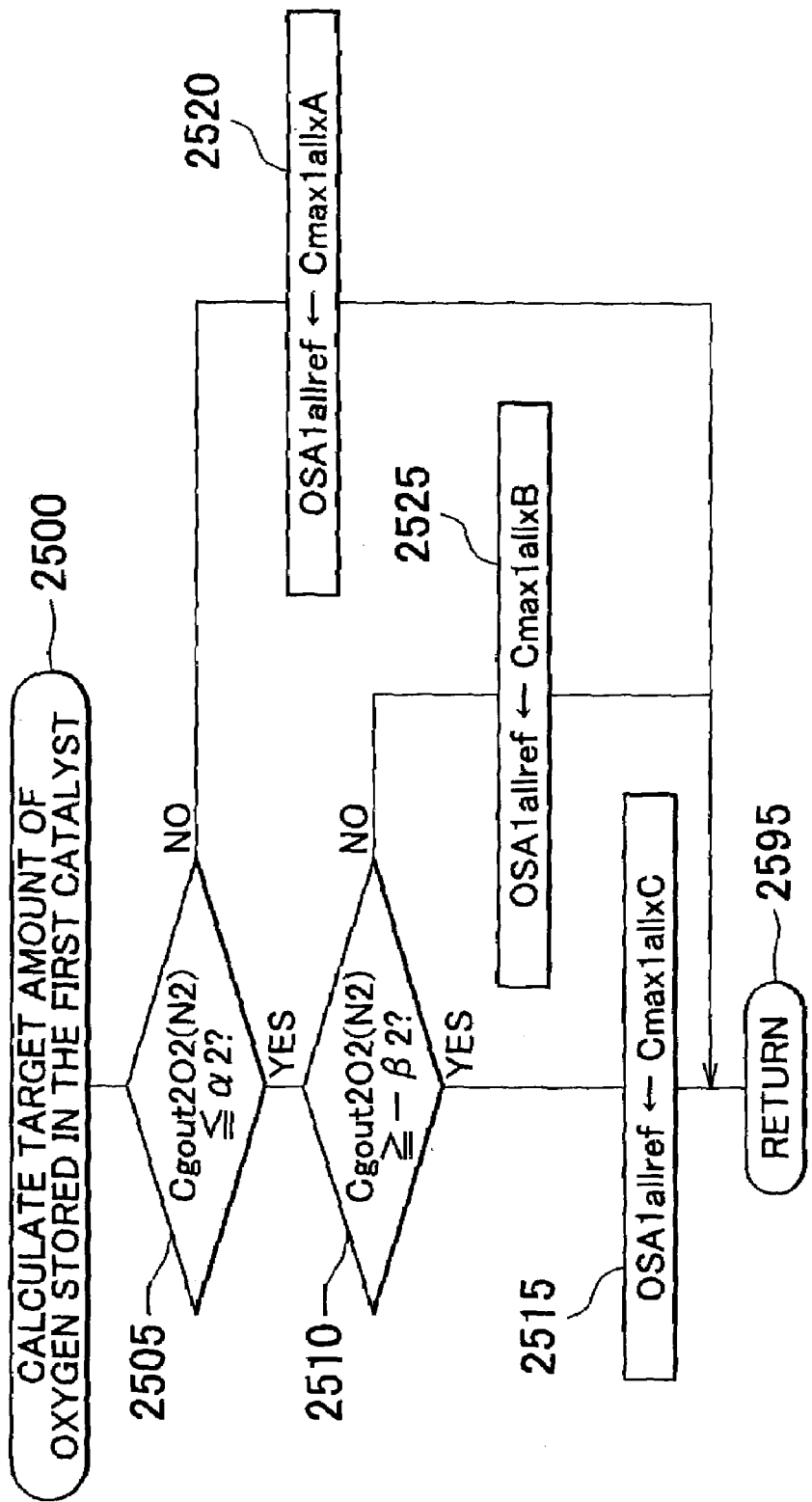
FIG. 25 is a flowchart showing a routine for calculating the target amount of oxygen stored in the first catalyst, as a second exemplary embodiment of the invention.

More specifically, in the second exemplary embodiment, the CPU 71 executes the routine shown in FIG. 25 instead of the routine shown in FIG. 24, starting with step 2500 and proceeding on to step 2505, where it determines whether the value of the amount of outflowing oxygen Cgout2O2(N2) flowing out from the block 2(N2) that is farthest downstream in the second catalyst 54, which was calculated in step 2265 in FIG. 22, is equal to, or less than, than a value $\alpha 2$ ($\alpha 2$ is a predetermined positive constant). When the determination in step 2505 is "YES", the CPU 71 proceeds on to step 2510, where it determines whether the value of the amount of outflowing oxygen Cgout2O2(N2) is equal to, or greater than, a value $-\beta 2$ ($\beta 2$ is a predetermined positive constant). When the determination in step 2510 is "YES", the product of the coefficient C (0.5) multiplied by the value of the overall maximum storable amount of oxygen Cmax1all of the entire first catalyst 53 calculated in step 2010 in FIG. 20 is set as the target oxygen storage amount OSA1allref of the first catalyst 53.

On the other hand, when the determination in step 2505 is "NO", the CPU 71 proceeds on to step 2520, where it sets the product of the coefficient A (0.3) multiplied by the value of the overall maximum storable amount of oxygen Cmax1all of the entire first catalyst 53 calculated in step 2010 in FIG. 20 as the target oxygen storage amount OSA1allref of the first catalyst 53.

Also, when a determination of "NO" is made in step 2510, the CPU 71 proceeds on to step 2525, where it sets the product of the coefficient B (0.7) multiplied by the value of the overall maximum storable amount of oxygen Cmax1all of the entire first catalyst 53 calculated in step 2010 in FIG. 20 as the target oxygen storage amount OSA1allref of the first catalyst 53. Then, after setting the target oxygen storage amount OSA1allref of the first catalyst 53, the CPU 71 proceeds on to step 2595, where the series of routines in FIGS. 21 through 23 and FIG. 25 ends.

In this way, when the value of the amount of outflowing oxygen Cgout2O2(N2) flowing out from the block 2(N2) that is farthest downstream in the second catalyst 54 is a value that is equal to, or greater than, the value $-\beta 2$ (i.e., a negative value) and equal to, or less than, the value $\alpha 2$ (i.e., a positive value), the value of the target oxygen storage amount OSA1allref of the entire first catalyst 53 is set to a value that is half of the value of the total amount of oxygen stored OSA1all of the first catalyst 53. Also, when the value of the amount of outflowing oxygen Cgout2O2(N2) exceeds the value $\alpha 2$, the value of the target oxygen storage amount OSA1allref of the entire first catalyst 53 is set to a value that is less, by a predetermined amount, than the value of half the value of the overall maximum storable amount of oxygen Cmax1all of the first catalyst 53. Further, when the value of the amount of outflowing oxygen Cgout2O2(N2) is a value that is less than the value $-\beta 2$ (i.e., a negative value), the value of the target oxygen storage amount OSA1allref of the entire first catalyst 53 is set to a value that is greater, by a predetermined amount, than the value of half the value of the overall maximum storable amount of oxygen Cmax1all of the first catalyst 53.

Here, as is evident from Expressions 1 through 13 (and more particularly, Expressions 3 and 5) described above, the value of the amount of outflowing oxygen Cgout2O2(N2) that flows out from the block 2(N2) that is farthest downstream in the second catalyst 54 relies on the value of the amount of stored oxygen OSA2(n) in each block 2(n) of the second catalyst 54 (i.e., the value of the total amount of oxygen stored OSA2all of the entire second catalyst 54). Accordingly, the value of the amount of outflowing oxygen Cgout2O2(N2) in the block 2(N2) that is farthest downstream in the second catalyst 54 is a value (i.e., a calculated value) that changes according to at least the amount of oxygen stored in the second catalyst 54 (i.e., the second catalyst portion).

More specifically, when the value of the amount of inflowing oxygen Cgin2O2(1) in the block 2(1) that is farthest upstream in the second catalyst 54 is a positive value (i.e., when there is a surplus of oxygen), as the value of the amount of stored oxygen OSA2(n) in each block 2(n) becomes larger, the reaction rate H(n) in each block 2(n) calculated in Expression 3 becomes smaller such that the value (a positive value) of an amount of change in the amount of stored oxygen $\delta$OSA2(n) in each block 2(n) calculated in Expression 2 also becomes smaller. Therefore, the value (a positive value) of the amount of outflowing oxygen Cgout2O2(n) in each block 2(n) calculated using Expression 1 becomes larger such that the value (a positive value) of the amount of outflowing oxygen Cgout2O2(N2) in the block 2(N2) that is farthest downstream also become larger.

Also, when the value of the amount of inflowing oxygen Cgin2O2(1) in the block 2(1) that is farthest upstream in the second catalyst 54 is a negative value (i.e., when there is a shortage of oxygen), as the value of the amount of stored oxygen OSA2(n) in each block 2(n) becomes smaller, the reaction rate H(n) in each block 2(n) calculated in Expression 5 becomes smaller such that the absolute value of the value (a negative value) of an amount of change in the amount of stored oxygen $\delta$OSA2(n) in each block 2(n) calculated in Expression 4 also becomes smaller. Therefore, the value (a negative value) of the amount of outflowing oxygen Cgout2O2(n) in each block 2(n) calculated in Expression 1 becomes larger such that the absolute value of the value (a negative value) of the amount of outflowing oxygen Cgout2O2(N2) in the block 2(N2) that is farthest downstream also becomes larger.

Accordingly, there is both a tendency for the value (a positive value) of the amount of outflowing oxygen Cgout2O2(N2) in the block 2(N2) that is farthest downstream in the second catalyst 54 to increase as the value of the total amount of oxygen stored OSA2all of the entire second catalyst 54 becomes larger, and a tendency for the absolute value of the value (a negative value) of the amount of outflowing oxygen Cgout2O2(N2) to increase as the value of the total amount of oxygen stored OSA2all becomes larger. As a result, similar effects can be obtained when the target amount of oxygen stored in the first catalyst OSA1allref is set according to the value of the amount of outflowing oxygen Cgout2O2(N2) that flows out from the block 2(N2) that is farthest downstream in the second catalyst 54, as in the second exemplary embodiment shown in FIG. 25, as are obtained when the target oxygen storage amount OSA1allref of the first catalyst 53 is set according to the ratio of the total amount of oxygen stored OSA2all of the entire second catalyst 54 to the overall maximum storable amount of oxygen Cmax2all of the entire second catalyst 54, as in the first exemplary embodiment shown in FIG. 24.

Although the invention has been described herein with reference to specific embodiments, many modifications and variations therein will readily occur to those skilled in the art. Accordingly, all such variations and modifications are included within the intended scope of the invention. For example, in the foregoing first and second exemplary embodiments, the second catalyst portion corresponds to the entire second catalyst 54. Alternatively, however, the second catalyst portion may correspond to a portion that extends from the farthest upstream point of the second catalyst 54 to an arbitrary point that is upstream from the farthest downstream point (e.g., block 2(1) to block 2(n), ($1 \leq n < N2$)) of the second catalyst 54. In this case, the calculated value, which is a value that changes depending on at least the amount of oxygen stored in the second catalyst portion, becomes the amount of oxygen stored in the second catalyst portion (i.e., the sum of OSA2(1) to OSA2(n)) or the amount of outflowing oxygen Cgout2O2(n), which is the amount of oxygen that flows out from the second catalyst portion. Accordingly, because the tendency of the amount of oxygen stored in the second catalyst portion to change can be known at an extremely early stage, it is possible to execute feedback control for the air-fuel ratio of the internal combustion engine, which is done to bring the amount (i.e., a value that changes according to the amount) of oxygen stored in the first catalyst portion closer to the target value, with even less of a control delay.

Further, in the foregoing exemplary embodiments, the first catalyst portion corresponds to the entire first catalyst 53. Alternatively, however, the first catalyst portion may correspond to a portion that extends from the farthest upstream point of the first catalyst 53 to an arbitrary point that is upstream from the farthest downstream point (e.g., block 1(1) to block 1($n$), (1≦n<N1)) of the first catalyst 53. In this case, the obtained value, which is a value that changes depending on at least the amount of oxygen stored in the first catalyst portion, becomes the amount of oxygen stored in the first catalyst portion (i.e., the sum of OSA1(1) to OSA1($n$)), for example.

Also in the foregoing exemplary embodiments, feedback control is performed on the air-fuel ratio of the internal combustion engine in order to bring the amount of oxygen stored in the first catalyst portion closer to the target value. Alternatively, however, feedback control may be performed on the air-fuel ratio of the internal combustion engine in order to bring a value corresponding to an amount of a specific component, which is included in the exhaust gas flowing out from the first catalyst portion and which relates to the oxygen storage and release reaction, flowing out from the first catalyst portion (e.g., amount of outflowing oxygen Cgout1O2(N1) flowing out from the first catalyst portion), closer to a target value. That is, the obtained value, which is a value that changes depending on at least the amount of oxygen stored in the first catalyst portion, may also be a value according to the amount of specific component that flows out.

Further, feedback control may also be performed on the air-fuel ratio of the internal combustion engine in order to bring an output value from the air-fuel ratio sensor disposed in an exhaust passage downstream of the first catalyst portion and upstream of the second catalyst portion (i.e., the output value Voxs1 of the exhaust side midstream air-fuel ratio sensor 67). That is, the obtained value, which is a value that changes depending on at least the amount of oxygen stored in the first catalyst portion, may be the output value of the air-fuel ratio sensor disposed in the exhaust passage downstream of the first catalyst portion and upstream of the second catalyst portion.

Also, in the foregoing exemplary embodiments, when the conditions for starting the control for obtaining the overall maximum storable amount of oxygen in step 1415 in FIG. 14 are fulfilled, the control starts from the first mode in FIG. 9 regardless of the output Voxs1 from the exhaust side midstream air-fuel ratio sensor or the output Voxs2 from the exhaust side downstream air-fuel ratio sensor at that time. However, it is preferable that the exhaust side upstream air-fuel ratio, which is initially set to detect the amount of stored oxygen, be set to a different air-fuel ratio (i.e., it is preferable to change the mode executed first) after the engine speed has been reduced.

More specifically, when both the output Voxs1 from the exhaust side midstream air-fuel ratio sensor and the output Voxs2 from the exhaust side downstream air-fuel ratio sensor indicate a rich air-fuel ratio when the conditions for starting the control for obtaining the overall maximum storable amount of oxygen are fulfilled, control of the exhaust side upstream air-fuel ratio starts from the first mode, just as in the foregoing exemplary embodiments. That is, the exhaust side upstream air-fuel ratio is made a predetermined lean air-fuel ratio.

On the other hand, when the output Voxs1 from the exhaust side midstream air-fuel ratio sensor indicates a lean air-fuel ratio and the output Voxs2 from the exhaust side downstream air-fuel ratio sensor indicates a rich air-fuel ratio when the conditions for starting the control for obtaining the overall maximum storable amount of oxygen are fulfilled, control starts from the second mode which makes the exhaust side upstream air-fuel ratio a predetermined lean air-fuel ratio, just like the first mode.

Further, when both the output Voxs1 from the exhaust side midstream air-fuel ratio sensor and the output Voxs2 from the exhaust side downstream air-fuel ratio sensor indicate a lean air-fuel ratio when the conditions for starting the control for obtaining the overall maximum storable amount of oxygen are fulfilled, control starts from the third mode which makes the exhaust side upstream air-fuel ratio a predetermined rich air-fuel ratio. In this case, because the maximum storable amounts of oxygen detected in the third mode, executed first, and the fourth mode, executed next, are not accurate, it is preferable not to use those maximum storable amounts of oxygen in various other calculations. Instead, it is preferable to use the maximum storable amounts of oxygen detected in the fifth and sixth modes in various other calculations by executing the controls of the fifth and sixth modes, to be described later, as shown by the broken lines in FIG. 9, successively after executing the fourth mode.

Further, when the output Voxs1 from the exhaust side midstream air-fuel ratio sensor indicates a rich air-fuel ratio and the output Voxs2 from the exhaust side downstream air-fuel ratio sensor indicates a lean air-fuel ratio when the conditions for starting the control for obtaining the overall maximum storable amount of oxygen are fulfilled, control starts from the fourth mode which makes the exhaust side upstream air-fuel ratio a predetermined rich air-fuel ratio just like the third mode. In this case as well, because the maximum storable amount of oxygen detected in the fourth mode, executed first, is not accurate, it is preferable not to use that maximum storable amount of oxygen in various other calculations. Instead, it is preferable to use the maximum storable amounts of oxygen detected in the fifth and sixth modes in various other calculations by executing the control of the fifth and sixth modes, as shown by the broken lines in FIG. 9, successively after executing the fourth mode.

More specifically, when executing the fifth and sixth modes successively after the fourth mode, the CPU 71 controls the exhaust side upstream air-fuel ratio again to the predetermined lean air-fuel ratio, as shown by the broken line in FIG. 9($a$), when the output Voxs2 from the exhaust side downstream air-fuel ratio sensor 68 changes from a lean value to a rich value, as shown at time t5 in FIG. 9. Accordingly, gas having a lean air-fuel ratio flows into the first catalyst 53. Also at time t5, the amount of oxygen stored in the first catalyst 53 becomes "0". Accordingly, after time t5 the amount of oxygen stored in the first catalyst 53 continues to increase from "0" until it reaches the overall maximum storable amount of oxygen Cmax1all at time t6, as shown by the broken line in FIG. 9($c$). As a result, at time t6, gas that includes oxygen starts to flow out from the first catalyst 53 such that the output Voxs1 from the exhaust side midstream air-fuel ratio sensor 67 changes from a rich value to a lean value, as shown by the broken line in FIG. 9($b$). The operation between times t5 and t6 is referred to as an operation in the fifth mode (i.e., Mode=5).

Between times t5 and t6, the CPU 71 detects the overall maximum storable amount of oxygen Cmax1all of the entire first catalyst 53 as follows. That is, at time t6, at which time the output Voxs1 from the exhaust side midstream air-fuel ratio sensor 67 has become a value indicative of a lean air-fuel ratio, the amount of oxygen stored in the first catalyst 53 has reached the overall maximum storable amount of oxygen Cmax1all. Therefore, between times t5 and t6, the amount of change in the amount of oxygen stored ΔO2 is calculated and the total amount of the change over that time is obtained based on Expressions 24 and 25 below. That sum is calculated as the new overall maximum storable amount of oxygen Cmax1all.

$$\Delta O2=0.23 \times mfr \times (abyfs-stoich) \quad \text{[Expression 24]}$$

$$Cmax1all=\Sigma\Delta O2 \text{ (interval t=t5 to t6)} \quad \text{[Expression 25]}$$

As shown in Expression 24, by multiplying the difference between the air-fuel ratio A/F and the stoichiometric air-fuel ratio (i.e., abyfs−stoich) by the sum mfr of the fuel injection quantity in the predetermined period of time tsample, the amount of surplus air in the predetermined period of time tsample can be obtained. Further, by multiplying the weighted ratio of the oxygen by this amount of surplus air, the amount of change in the amount of oxygen stored (i.e., the amount of oxygen stored) ΔO2 in the predetermined period of time tsample can be obtained. Then, as shown in Expression 25, by adding up the amounts of change in the amount of oxygen stored ΔO2 over the times t5 to t6, the amount of oxygen from when the amount of oxygen stored in the first catalyst 53 is "0" until the first catalyst 53 is completely saturated, i.e., the overall maximum storable amount of oxygen Cmax1all, can be calculated.

At time t6, the CPU 71 continues to control the exhaust side upstream air-fuel ratio to the predetermined lean air-fuel ratio even after the output Voxs1 of the exhaust side midstream air-fuel ratio sensor 67 has changed from a rich value to a lean value. In this case, the amount of oxygen stored in the first catalyst 53 has reached the overall maximum storable amount of oxygen Cmax1all. Accordingly, gas having a lean air-fuel ratio flows out from the first catalyst 53 and into the second catalyst 54. On the other hand, at time t6, the amount of oxygen stored in the second catalyst 54 is "0". Accordingly, after time t6 the amount of oxygen stored in the second catalyst 54 continues to increase from "0" until it reaches the overall maximum storable amount of oxygen Cmax2all at time t7, as shown by the broken line in FIG. 9(e). As a result, at time t7, gas that includes oxygen starts to flow out from the second catalyst 54 such that the output Voxs2 from the exhaust side downstream air-fuel ratio sensor 68 changes from a rich value to a lean value, as shown by the broken line in FIG. 9(d). The operation between times t6 and t7 is referred to as an operation in the sixth mode (i.e., Mode=6).

Between times t6 and t7 as well, the CPU 71 detects the overall maximum storable amount of oxygen Cmax2all of the entire second catalyst 54 as follows. That is, the amount of change in the amount of oxygen stored ΔO2 is calculated and the total amount of the change over that time is obtained based on Expressions 26 and 27 below. The sum at time t7 is then calculated as the new overall maximum storable amount of oxygen Cmax2all.

$$\Delta O2=0.23 \times mfr \times (abyfs-stoich) \quad \text{[Expression 26]}$$

$$Cmax2all=\Sigma\Delta O2 \text{ (interval t=t6 to t7)} \quad \text{[Expression 27]}$$

Then at time t7, the CPU 71 returns the air-fuel ratio of the air-fuel mixture that flows into the combustion chamber to the stoichiometric air-fuel ratio. In this way, the overall maximum storable amount of oxygen Cmax1all of the entire first catalyst 53 is detected in the fifth mode and the overall maximum storable amount of oxygen Cmax2all of the entire second catalyst 54 is detected in the sixth mode.

Figure 26:
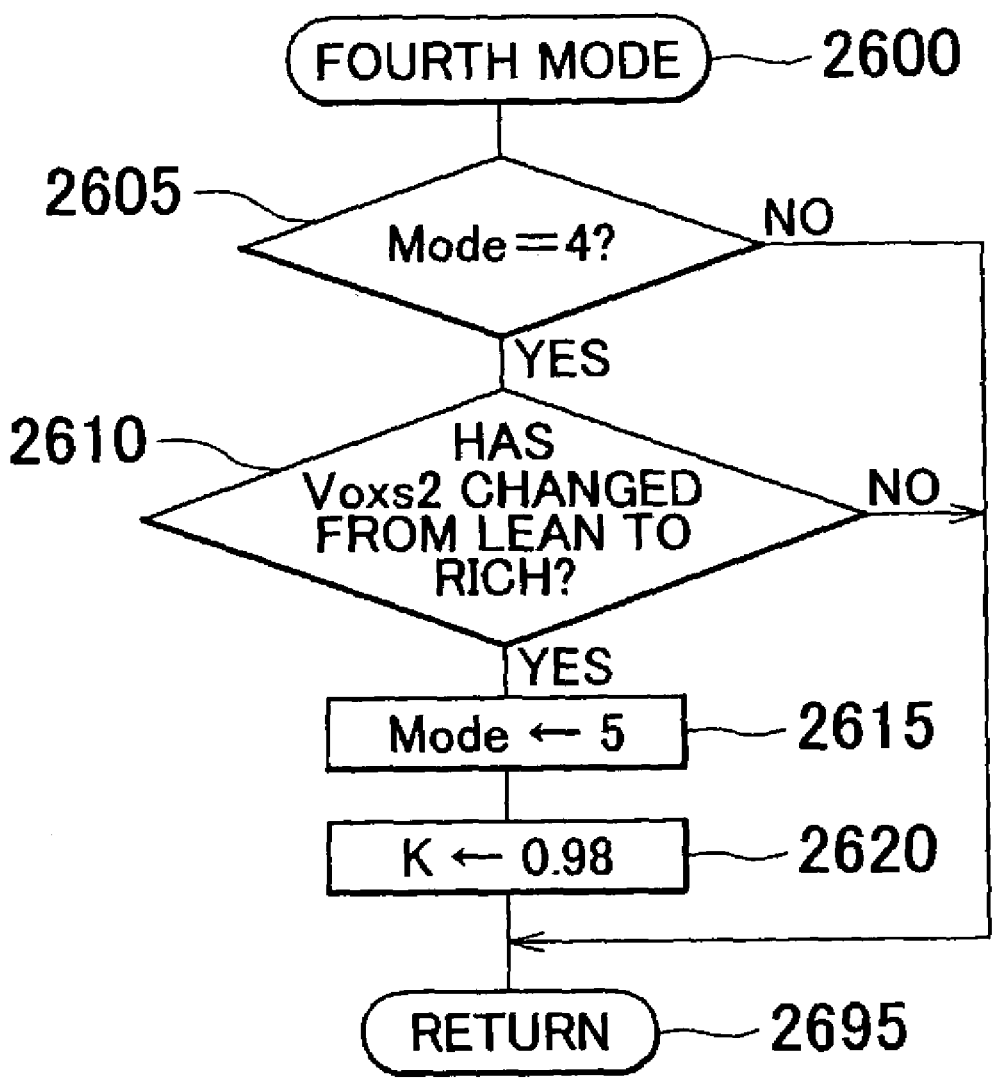
FIG. 26 is a flowchart showing a routine of the fourth mode executed by the CPU shown in FIG. 1 when fifth and sixth modes are executed successively after the fourth mode.
Figure 27:
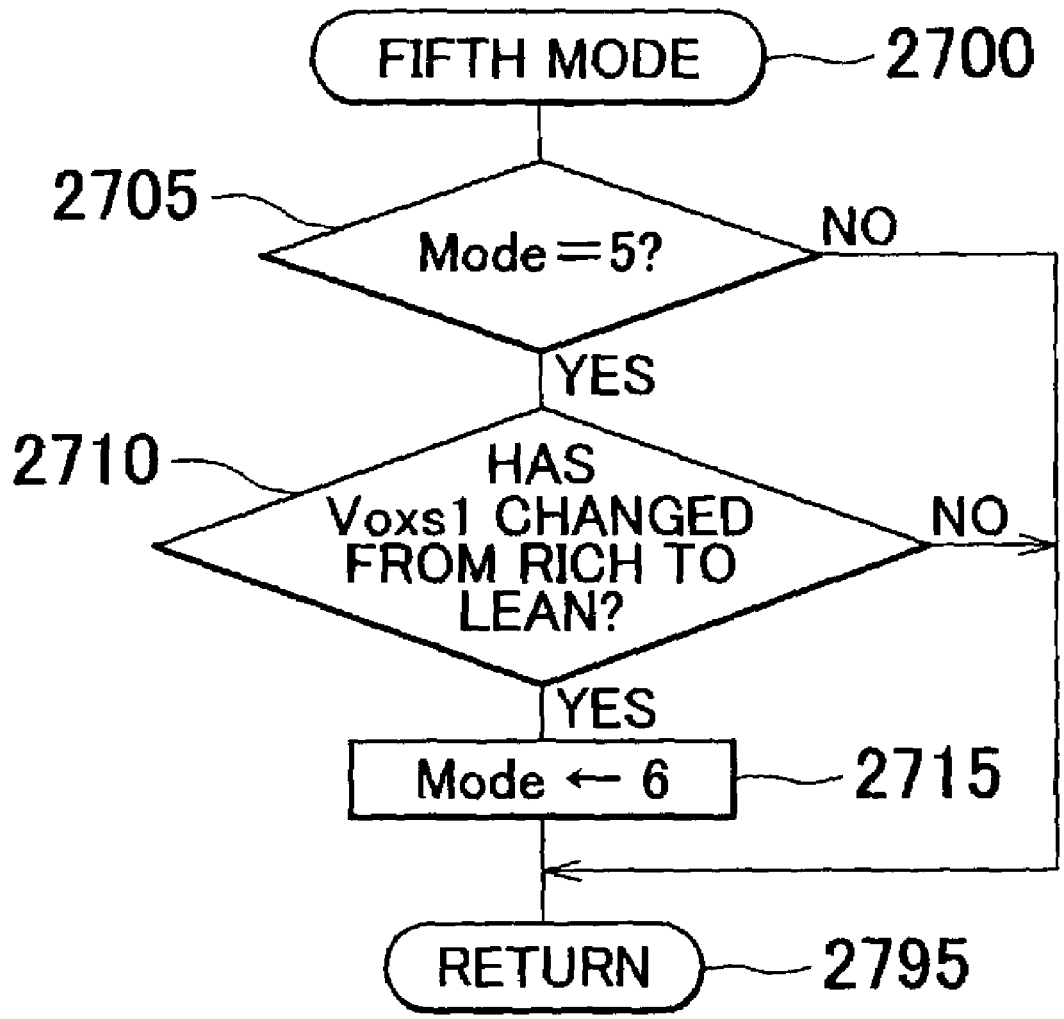
FIG. 27 is a flowchart showing a routine of the fifth mode executed by the CPU shown in FIG. 1 when the fifth and sixth modes are executed successively after the fourth mode.
Figure 28:
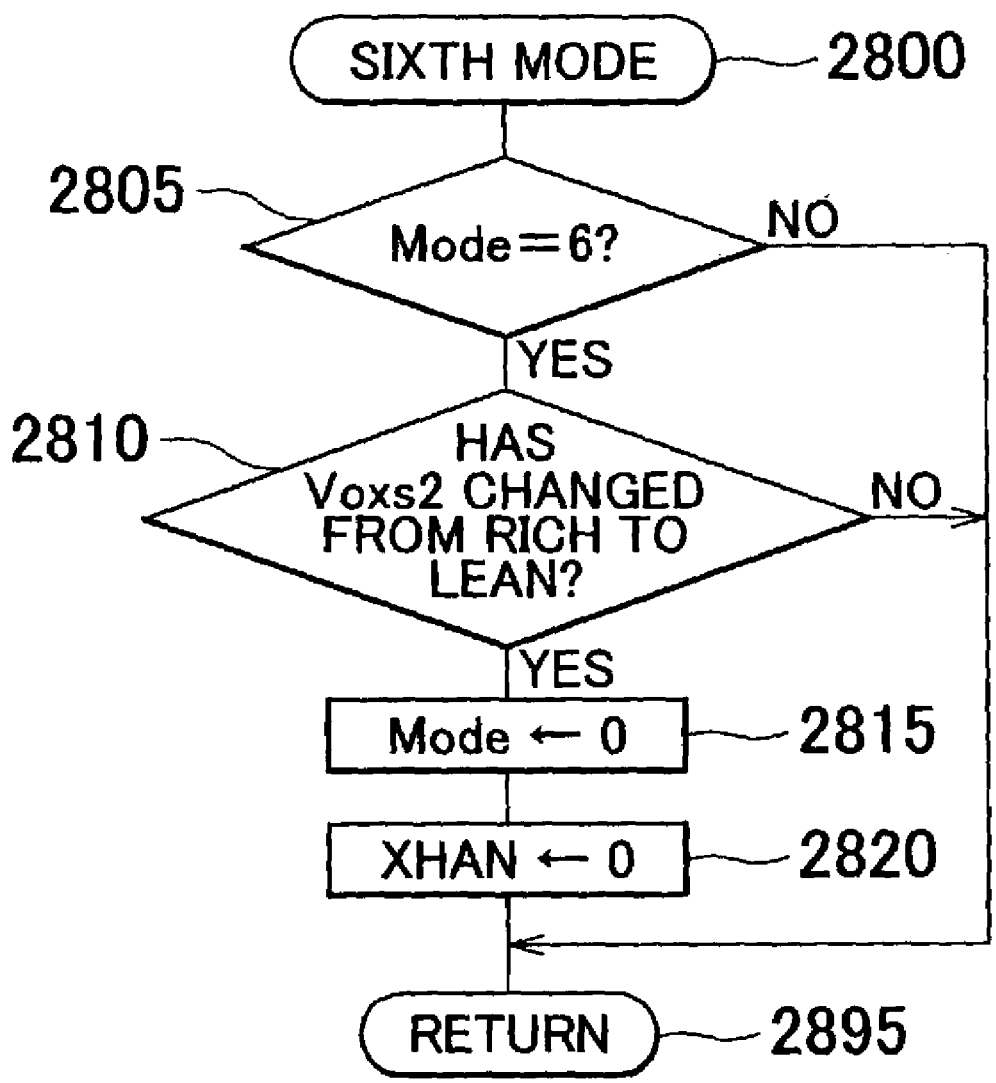
FIG. 28 is a flowchart showing a routine of the sixth mode executed by the CPU shown in FIG. 1 when the fifth and sixth modes are executed successively after the fourth mode.

Also, when the fifth and sixth modes are executed in succession after the fourth mode is executed, the CPU 71 must repeatedly execute the fourth mode control routine shown in FIG. 26, instead of the fourth mode control routine described above shown in FIG. 18, at predetermined intervals of time. In addition, CPU 71 must also repeatedly execute the fifth mode control routine shown in FIG. 27 and the sixth mode control routine shown in FIG. 28 at predetermined intervals of time. The operations in the fourth mode control routine shown in FIG. 26, the fifth mode control routine shown in FIG. 27, and the sixth mode control routine shown in FIG. 28 are similar to the operations in the first through the fourth modes shown in FIGS. 15 through 18 described above, so detailed descriptions thereof will be omitted.

The controller (e.g., the ECU 70) of the illustrated exemplary embodiments is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An exhaust gas control apparatus for an internal combustion engine, comprising:

a first catalyst portion disposed in an exhaust passage of the internal combustion engine;

a second catalyst portion disposed in the exhaust passage downstream of the first catalyst portion; and a controller which performs stoichiometric feedback control by: (i) obtaining a value that changes according to at least an amount of oxygen stored in the first catalyst portion, as an obtained value; (ii) controlling a stoichiometric air-fuel ratio of the internal combustion engine such that the obtained value substantially matches a feedback target value; (iii) calculating a value that changes according to at least an amount of oxygen stored in the second catalyst portion, as a calculated value, based on at least a state of exhaust gas flowing into the second catalyst portion; and (iv) changing the feedback target value according to the calculated value such that a relationship between the feedback target value and a maximum amount of oxygen able to be stored in the first catalyst portion changes with changes in a relationship between the calculated value and a maximum amount of oxygen able to be stored in the second catalyst portion.

2. The exhaust gas control apparatus according to claim 1, wherein the first catalyst portion is an entire first catalyst disposed in the exhaust passage, and the second catalyst portion is an entire second catalyst disposed in the exhaust passage downstream of the first catalyst.

3. The exhaust gas control apparatus according to claim 2, further comprising:
an exhaust side midstream air-fuel ratio sensor disposed in the exhaust passage downstream of the first catalyst portion and upstream of the second catalyst portion; and
an exhaust side downstream air-fuel ratio sensor disposed in the exhaust passage downstream of the second catalyst portion,
wherein the controller: (a) obtains a first maximum storable amount of oxygen, which is the maximum amount of oxygen able to be stored in the first catalyst portion, based on at least a change in an output from the exhaust side midstream air-fuel ratio sensor; (b) obtains a second maximum storable amount of oxygen, which is the maximum amount of oxygen able to be stored in the second catalyst portion, based on at least a change in an output from the exhaust side downstream air-fuel ratio sensor; (c) obtains an amount of oxygen stored in the first catalyst portion as the obtained value; (d) calculates an amount of oxygen stored in the second catalyst portion as the calculated value; and (e) sets the feedback target value by changing a ratio of a target amount of stored oxygen indicated by the feedback target value to the first maximum storable amount of oxygen according to a ratio of the amount of oxygen stored in the second catalyst portion indicated by the calculated value to the second maximum storable amount of oxygen.

4. The exhaust gas control apparatus according to claim 2, wherein the controller calculates, as the calculated value, a value according to an amount of a specific component, which is included in exhaust gas flowing out from the second catalyst portion and is related to an oxygen storage and release reaction that occurs in the second catalyst portion, flowing out from the second catalyst portion using a model that calculates the amount of oxygen to be stored in the second catalyst portion from exhaust gas flowing into the second catalyst portion and an amount of oxygen to be released from the oxygen stored in the second catalyst portion, based on at least the amount of oxygen stored in the second catalyst portion.

5. The exhaust gas control apparatus according to claim 1, further comprising:
an exhaust side midstream air-fuel ratio sensor disposed in the exhaust passage downstream of the first catalyst portion and upstream of the second catalyst portion; and
an exhaust side downstream air-fuel ratio sensor disposed in the exhaust passage downstream of the second catalyst portion,
wherein the controller: (a) obtains a first maximum storable amount of oxygen, which is the maximum amount of oxygen able to be stored in the first catalyst portion, based on at least a change in an output from the exhaust side midstream air-fuel ratio sensor; (b) obtains a second maximum storable amount of oxygen, which is the maximum amount of oxygen able to be stored in the second catalyst portion, based on at least a change in an output from the exhaust side downstream air-fuel ratio sensor; (c) obtains an amount of oxygen stored in the first catalyst portion as the obtained value; (d) calculates an amount of oxygen stored in the second catalyst portion as the calculated value; and (e) sets the feedback target value by changing a ratio of a target amount of stored oxygen indicated by the feedback target value to the first maximum storable amount of oxygen according to a ratio of the amount of oxygen stored in the second catalyst portion indicated by the calculated value to the second maximum storable amount of oxygen.

6. The exhaust gas control apparatus according to claim 1, wherein the controller calculates, as the calculated value, a value according to an amount of a specific component, which is included in exhaust gas flowing out from the second catalyst portion and is related to an oxygen storage and release reaction that occurs in the second catalyst portion, flowing out from the second catalyst portion using a model that calculates the amount of oxygen to be stored in the second catalyst portion from exhaust gas flowing into the second catalyst portion and an amount of oxygen to be released from the oxygen stored in the second catalyst portion, based on at least the amount of oxygen stored in the second catalyst portion.

7. An exhaust gas control apparatus for an internal combustion engine, comprising:
a first catalyst portion disposed in an exhaust passage of the internal combustion engine;
a second catalyst portion disposed in the exhaust passage downstream of the first catalyst portion;
obtaining means for obtaining a value that changes according to at least an amount of oxygen stored in the first catalyst portion as an obtained value;
air-fuel ratio controlling means for controlling a stoichiometric air-fuel ratio of the internal combustion engine such that the obtained value substantially matches a feedback target value;
calculating means for calculating a value that changes according to at least an amount of oxygen stored in the second catalyst portion as a calculated value, based on at least a state of exhaust gas flowing into the second catalyst portion; and
feedback target value changing means for changing the feedback target value according to the calculated value such that a relationship between the feedback target value and a maximum amount of oxygen able to be stored in the first catalyst portion changes with changes in a relationship between the calculated value and a maximum amount of oxygen able to be stored in the second catalyst portion.

8. The exhaust gas control apparatus according to claim 7, wherein the first catalyst portion is an entire first catalyst disposed in the exhaust passage, and the second catalyst portion is an entire second catalyst disposed in the exhaust passage downstream of the first catalyst.

9. The exhaust gas control apparatus according to claim 7, further comprising:

an exhaust side midstream air-fuel ratio sensor disposed in the exhaust passage downstream of the first catalyst portion and upstream of the second catalyst portion;

an exhaust side downstream air-fuel ratio sensor disposed in the exhaust passage downstream of the second catalyst portion;

first catalyst portion maximum oxygen storage amount obtaining means for obtaining a first maximum storable amount of oxygen, which is the maximum amount of oxygen able to be stored in the first catalyst portion, based on at least a change in an output from the exhaust side midstream air-fuel ratio sensor; and second catalyst portion maximum oxygen storage amount obtaining means for obtaining a second maximum storable amount of oxygen, which is the maximum amount of oxygen able to be stored in the second catalyst portion, based on at least a change in an output from the exhaust side downstream air-fuel ratio sensor, wherein the obtaining means obtains an amount of oxygen stored in the first catalyst portion as the obtained value; the calculating means calculates an amount of oxygen stored in the second catalyst portion as the calculated value; and the feedback target value changing means sets the feedback target value by changing a ratio of a target amount of stored oxygen indicated by the feedback target value to the first maximum storable amount of oxygen according to a ratio of the amount of oxygen stored in the second catalyst portion indicated by the calculated value to the second maximum storable amount of oxygen.

10. The exhaust gas control apparatus according to claim 7, wherein the calculating means calculates, as the calculated value, a value according to an amount of a specific component, which is included in exhaust gas flowing out from the second catalyst portion and is related to an oxygen storage and release reaction that occurs in the second catalyst portion, flowing out from the second catalyst portion using a model that calculates the amount of oxygen to be stored in the second catalyst portion from exhaust gas flowing into the second catalyst portion and an amount of oxygen to be released from the oxygen stored in the second catalyst portion, based on at least the amount of oxygen stored in the second catalyst portion.

11. An exhaust gas control apparatus for an internal combustion engine, comprising:

a first catalyst portion disposed in an exhaust passage of the internal combustion engine;

a second catalyst portion disposed in the exhaust passage downstream of the first catalyst portion; and a controller which performs stoichiometric feedback control by: (i) obtaining a value that changes according to at least an amount of oxygen stored in the first catalyst portion as an obtained value; (ii) controlling a stoichiometric air-fuel ratio of the internal combustion engine such that the obtained value substantially matches a feedback target value; (iii) calculating a value that changes according to at least an amount of outflowing oxygen that flows out from the second catalyst portion as a calculated value, based on at least a state of exhaust gas flowing into the second catalyst portion; and (iv) changing the feedback target value according to the calculated value such that a relationship between the feedback target value and a maximum amount of oxygen able to be stored in the first catalyst portion changes with changes in a relationship between the calculated value and a maximum amount of oxygen able to be stored in the second catalyst portion.

12. The exhaust gas control apparatus according to claim 11, wherein the first catalyst portion is an entire first catalyst disposed in the exhaust passage, and the second catalyst portion is an entire second catalyst disposed in the exhaust passage downstream of the first catalyst.

13. The exhaust gas control apparatus according to claim 11, further comprising:

an exhaust side midstream air-fuel ratio sensor disposed in the exhaust passage downstream of the first catalyst portion and upstream of the second catalyst portion; and an exhaust side downstream air-fuel ratio sensor disposed in the exhaust passage downstream of the second catalyst portion, wherein the controller: (a) obtains a first maximum storable amount of oxygen, which is the maximum amount of oxygen able to be stored in the first catalyst portion, based on at least a change in an output from the exhaust side midstream air-fuel ratio sensor; (b) obtains a second maximum storable amount of oxygen, which is the maximum amount of oxygen able to be stored in the second catalyst portion, based on at least a change in an output from the exhaust side downstream air-fuel ratio sensor; (c) obtains an amount of oxygen stored in the first catalyst portion as the obtained value; (d) calculates an amount of oxygen stored in the second catalyst portion as the calculated value; and (e) sets the feedback target value by changing a ratio of a target amount of stored oxygen indicated by the feedback target value to the first maximum storable amount of oxygen according to a ratio of the amount of oxygen stored in the second catalyst portion indicated by the calculated value to the second maximum storable amount of oxygen.

14. The exhaust gas control apparatus according to claim 11, wherein the controller calculates, as the calculated value, a value according to an amount of a specific component, which is included in exhaust gas flowing out from the second catalyst portion and is related to an oxygen storage and release reaction that occurs in the second catalyst portion, flowing out from the second catalyst portion using a model that calculates the amount of oxygen to be stored in the second catalyst portion from exhaust gas flowing into the second catalyst portion and an amount of oxygen to be released from the oxygen stored in the second catalyst portion, based on at least the amount of oxygen stored in the second catalyst portion.

15. An exhaust gas purification method for an internal combustion engine provided with a first catalyst portion disposed in an exhaust passage of the internal combustion engine and a second catalyst portion disposed in the exhaust passage downstream of the first catalyst portion, the exhaust gas purification method comprising the steps of:

obtaining a value that changes according to at least an amount of oxygen stored in the first catalyst portion as an obtained value;

controlling a stoichiometric air-fuel ratio of the internal combustion engine such that the obtained value substantially matches a feedback target value;

calculating a value that changes according to at least an amount of oxygen stored in the second catalyst portion as a calculated value, based on at least a state of exhaust gas flowing into the second catalyst portion; and changing the feedback target value according to the calculated value such that a relationship between the feedback target value and a maximum amount of oxygen able to be stored in the first catalyst portion changes with changes in a relationship between the calculated value and a maximum amount of oxygen able to be stored in the second catalyst portion.

16. The exhaust gas purification method according to claim 15, further comprising the steps of:

obtaining a first maximum storable amount of oxygen, which is the maximum amount of oxygen able to be stored in the first catalyst portion, based on at least a change in an output from an exhaust side midstream air-fuel ratio sensor located in the exhaust passage between the first and second catalyst portions;

obtaining a second maximum storable amount of oxygen, which is the maximum amount of oxygen able to be stored in the second catalyst portion, based on at least a change in an output from an exhaust side downstream air-fuel ratio sensor located in the exhaust passage downstream of the second catalyst portion;

obtaining an amount of oxygen stored in the first catalyst portion as the obtained value;

calculating an amount of oxygen stored in the second catalyst portion as the calculated value; and setting the feedback target value by changing a ratio of a target amount of stored oxygen indicated by the feedback target value to the first maximum storable amount of oxygen according to a ratio of the amount of oxygen stored in the second catalyst portion indicated by the calculated value to the second maximum storable amount of oxygen.

17. The exhaust gas purification method according to claim 15, wherein an oxygen storage and release reaction occurs in the second catalyst portion, and a value according to the amount of a specific component, which is included in exhaust gas flowing out from the second catalyst portion and is related to the oxygen storage and release reaction, flowing out from the second catalyst portion, is calculated as the calculated value using a model that calculates the amount of oxygen to be stored in the second catalyst portion from exhaust gas flowing into the second catalyst portion and an amount of oxygen to be released from the oxygen stored in the second catalyst portion, based on at least the amount of oxygen stored in the second catalyst portion.

* * * * *